(12) United States Patent
Olmstead

(10) Patent No.: US 8,353,457 B2
(45) Date of Patent: Jan. 15, 2013

(54) SYSTEMS AND METHODS FOR FORMING A COMPOSITE IMAGE OF MULTIPLE PORTIONS OF AN OBJECT FROM MULTIPLE PERSPECTIVES

(75) Inventor: Bryan L. Olmstead, Eugene, OR (US)

(73) Assignee: Datalogic ADC, Inc., Eugene, OR (US)

(*) Notice: Subject to any disclaimer, the term of this patent is extended or adjusted under 35 U.S.C. 154(b) by 758 days.

(21) Appl. No.: 12/370,497

(22) Filed: Feb. 12, 2009

(65) Prior Publication Data

US 2009/0206161 A1 Aug. 20, 2009

Related U.S. Application Data

(60) Provisional application No. 61/028,164, filed on Feb. 12, 2008, provisional application No. 61/140,930, filed on Dec. 26, 2008.

(51) Int. Cl.
*G06K 7/10* (2006.01)
*G06K 15/12* (2006.01)

(52) U.S. Cl. .................................. 235/462.41

(58) Field of Classification Search ............. 235/462.24, 235/462.41
See application file for complete search history.

(56) References Cited

U.S. PATENT DOCUMENTS

| | | | |
|---|---|---|---|
| 3,826,562 A | 7/1974 | Baumgardner et al. | |
| 5,019,714 A | 5/1991 | Knowles | |
| 5,073,702 A | 12/1991 | Schuhmacher | |
| 5,308,966 A * | 5/1994 | Danielson et al. | 235/462.23 |
| 5,446,271 A | 8/1995 | Cherry et al. | |
| 5,469,294 A | 11/1995 | Wilt et al. | |
| 5,493,108 A | 2/1996 | Cherry et al. | |
| 5,572,008 A * | 11/1996 | Sakai et al. | 235/462.4 |
| 5,627,366 A | 5/1997 | Katz | |

(Continued)

FOREIGN PATENT DOCUMENTS

CA    2 457 022 A1    10/2003

(Continued)

OTHER PUBLICATIONS

Putting the "world" in Wincor World, http://www.retailcustomerexperience.com/article/4371/Putting-the-world-in-Wincor-World, visited Sep. 15, 2011, 3 pages.

(Continued)

*Primary Examiner* — Thien M Le
*Assistant Examiner* — Toan Ly
(74) *Attorney, Agent, or Firm* — Stoel Rives LLP

(57) ABSTRACT

Various improved imager-based optical code readers and associated methods are disclosed herein. According to one embodiment, an imager-based method reads an optical code (which may be, for example, a linear optical code such as a bar code) on an object in a viewing volume. The method comprises dividing an image plane into a plurality of strip-shaped sections, viewing the object in the viewing volume from a plurality of perspectives, forming a plurality of strip-shaped images corresponding to the plurality of perspectives, respectively, thereby creating a composite image containing data from a plurality of perspectives, and processing at least a portion of the composite image so as to ascertain the information encoded in the optical code on the object in the viewing volume. Certain embodiments can mimic the performance of a laser-based scanner without a laser or moving parts but instead utilizing an electronic imaging device such as an imager.

20 Claims, 39 Drawing Sheets

U.S. PATENT DOCUMENTS

| | | | |
|---|---|---|---|
| 5,646,390 | A | 7/1997 | Wang et al. |
| 5,677,522 | A | 10/1997 | Rice et al. |
| 5,682,030 | A | 10/1997 | Kubon |
| 5,717,195 | A | 2/1998 | Feng et al. |
| 5,723,852 | A | 3/1998 | Rando et al. |
| 5,737,122 | A | 4/1998 | Wilt et al. |
| 5,801,370 | A | 9/1998 | Katoh et al. |
| 5,804,805 | A | 9/1998 | Koenck et al. |
| 5,814,803 | A | 9/1998 | Olmstead et al. |
| 5,886,336 | A | 3/1999 | Tang et al. |
| 5,894,530 | A | 4/1999 | Wilt |
| 5,909,276 | A | 6/1999 | Kinney et al. |
| 5,936,218 | A | 8/1999 | Ohkawa et al. |
| 5,984,186 | A | 11/1999 | Tafoya |
| 6,000,619 | A | 12/1999 | Reddersen et al. |
| 6,019,286 | A | 2/2000 | Li et al. |
| 6,053,408 | A | 4/2000 | Stoner |
| 6,061,091 | A | 5/2000 | Van de Poel et al. |
| 6,076,735 | A | 6/2000 | Saegusa |
| 6,142,376 | A | 11/2000 | Cherry et al. |
| 6,257,490 | B1 | 7/2001 | Tafoya |
| 6,273,336 | B1 | 8/2001 | Rudeen et al. |
| 6,295,077 | B1 | 9/2001 | Suzuki |
| 6,296,187 | B1 | 10/2001 | Shearer |
| 6,318,635 | B1 | 11/2001 | Stoner |
| 6,336,587 | B1 | 1/2002 | He et al. |
| 6,365,907 | B1 | 4/2002 | Staub et al. |
| 6,518,997 | B1 | 2/2003 | Chow et al. |
| 6,559,448 | B1 * | 5/2003 | Muller et al. .................. 250/342 |
| 6,609,660 | B1 | 8/2003 | Stoner |
| 6,705,528 | B2 | 3/2004 | Good et al. |
| 6,899,272 | B2 | 5/2005 | Krichever et al. |
| 6,963,074 | B2 | 11/2005 | McQueen |
| 6,971,580 | B2 * | 12/2005 | Zhu et al. .................. 235/472.01 |
| 6,991,169 | B2 | 1/2006 | Bobba et al. |
| 7,014,113 | B1 | 3/2006 | Powell et al. |
| 7,128,266 | B2 | 10/2006 | Zhu et al. |
| 7,188,770 | B2 | 3/2007 | Zhu et al. |
| 7,198,195 | B2 | 4/2007 | Bobba et al. |
| 7,201,322 | B2 | 4/2007 | Olmstead et al. |
| 7,204,420 | B2 * | 4/2007 | Barkan et al. ............ 235/462.01 |
| 7,213,762 | B2 | 5/2007 | Zhu et al. |
| 7,234,641 | B2 | 6/2007 | Olmstead |
| 7,273,180 | B2 | 9/2007 | Zhu et al. |
| 7,296,744 | B2 | 11/2007 | He et al. |
| 7,398,927 | B2 | 7/2008 | Olmstead et al. |
| 7,490,770 | B2 | 2/2009 | Shearin |
| 7,499,090 | B2 | 3/2009 | Olmstead |
| 7,533,819 | B2 | 5/2009 | Barkan et al. |
| 7,757,955 | B2 | 7/2010 | Barkan |
| 7,780,086 | B2 | 8/2010 | Barkan et al. |
| 2001/0009508 | A1 | 7/2001 | Umemoto et al. |
| 2001/0032884 | A1 | 10/2001 | Ring et al. |
| 2001/0042789 | A1 | 11/2001 | Krichever et al. |
| 2002/0043561 | A1 | 4/2002 | Tsikos et al. |
| 2002/0088859 | A1 | 7/2002 | Bengala |
| 2004/0031851 | A1 | 2/2004 | Bianculli et al. |
| 2004/0051062 | A1 | 3/2004 | Gehring et al. |
| 2004/0175038 | A1 | 9/2004 | Bonner et al. |
| 2004/0223202 | A1 | 11/2004 | Lippert et al. |
| 2005/0103857 | A1 * | 5/2005 | Zhu et al. .................. 235/462.22 |
| 2006/0022051 | A1 | 2/2006 | Patel et al. |
| 2006/0032919 | A1 | 2/2006 | Shearin |
| 2006/0151604 | A1 | 7/2006 | Zhu et al. |
| 2006/0163355 | A1 | 7/2006 | Olmstead et al. |
| 2006/0202036 | A1 | 9/2006 | Wang et al. |
| 2006/0278708 | A1 | 12/2006 | Olmstead |
| 2007/0175996 | A1 * | 8/2007 | Barkan et al. .................. 235/454 |
| 2007/0201009 | A1 * | 8/2007 | Suzuki et al. .................. 353/78 |
| 2007/0278309 | A1 | 12/2007 | Knowles et al. |
| 2007/0297021 | A1 * | 12/2007 | Smith .................. 358/474 |
| 2008/0017715 | A1 | 1/2008 | Knowles et al. |
| 2008/0017716 | A1 | 1/2008 | Knowles et al. |
| 2008/0023558 | A1 | 1/2008 | Knowles et al. |
| 2008/0029605 | A1 | 2/2008 | Knowles et al. |
| 2008/0041954 | A1 | 2/2008 | Gannon et al. |
| 2008/0110992 | A1 | 5/2008 | Knowles et al. |
| 2008/0110994 | A1 | 5/2008 | Knowles et al. |
| 2008/0128509 | A1 | 6/2008 | Knowles et al. |
| 2008/0135619 | A1 * | 6/2008 | Kwan .................. 235/462.39 |
| 2008/0142596 | A1 | 6/2008 | Knowles et al. |
| 2008/0217201 | A1 | 9/2008 | Keller et al. |
| 2009/0001166 | A1 | 1/2009 | Barkan et al. |
| 2009/0020612 | A1 | 1/2009 | Drzymala et al. |
| 2009/0084847 | A1 | 4/2009 | He et al. |
| 2009/0084854 | A1 | 4/2009 | Carlson et al. |
| 2009/0206161 | A1 | 8/2009 | Olmstead |
| 2010/0001075 | A1 | 1/2010 | Barkan |
| 2010/0051695 | A1 | 3/2010 | Yepez et al. |
| 2010/0147953 | A1 | 6/2010 | Barkan |
| 2010/0163622 | A1 | 7/2010 | Olmstead |
| 2010/0163626 | A1 | 7/2010 | Olmstead |
| 2010/0163627 | A1 | 7/2010 | Olmstead |
| 2010/0163628 | A1 | 7/2010 | Olmstead |
| 2010/0165160 | A1 | 7/2010 | Olmstead et al. |
| 2010/0219249 | A1 | 9/2010 | Barkan et al. |
| 2010/0252633 | A1 | 10/2010 | Barkan et al. |
| 2011/0127333 | A1 | 6/2011 | Veksland et al. |

FOREIGN PATENT DOCUMENTS

| | | |
|---|---|---|
| CN | 1511298 A | 7/2004 |
| EP | 1020810 | 7/2000 |
| EP | 1380983 | 1/2004 |
| EP | 1933254 | 6/2008 |
| JP | 4251992 A | 9/1992 |
| JP | 07-168905 | 7/1995 |
| JP | 2005521164 | 7/2005 |
| JP | 2007-521575 A | 8/2007 |
| KR | 10-2001-0005875 | 1/2001 |
| WO | WO 98/44330 | 10/1998 |
| WO | WO 03/081521 A1 | 10/2003 |
| WO | WO 2007/149876 | 12/2007 |

OTHER PUBLICATIONS

Wincor World: 360-degree scanning will speed check-out, http://www.retailcustomerexperience.com/article/4374/WINCOR-WORLD-360-degree-scanning-will-speed-check-out, visited Aug. 24, 2011, 1 page.

Wincor World focuses on service, automated checkout, http://www.retailcustomerexperience.com/article/3626/Wincor-World-focuses-on-service-automated-checkout?rc_id=16, visited Sep. 15, 2011, 3 pages.

Why Retailers Invest in Self-Service in 2009, http://www.kioskeurope.com/print/1726, visited Sep. 15, 2011, 3 pages.

International Search Report for PCT/US20009/033237, Jul. 31, 2009.

Website—http://www.e2v.com/news/e2v-introduces-new-high-spec-1-3mp-cmos-image-sensor--with-embedded-features--for-industrial-imaging-/ (Sep. 14, 2009).

"Enhanced Laser Shutter Using a Hard Disk Drive Rotary Voice-Coil Actuator," http://rsi.aip.org/resource/1/rsinak/v78/i2/p026101_s1?isAuthorized=no See also http://scitation.aip.org/getabs/servelt/GetabsServlet?prod=normal&id=RSINAK00 . . . , published Feb. 9, 2007.

International Search Report and Written Opinion, PCT/US/2009/068680, Aug. 17, 2010.

Smith, U.S. Appl. No. 11/765,345, filed Jun. 19, 2007.

PCT Publication No. WO 2007/149876, issued Dec. 27, 2007.

International Search Report for PCT Patent Application No. PCT/US2007/071590, issued Dec. 26, 2007.

European Search Report dated Feb. 15, 2010 for European Application No. 07798775.8.

International Search Report and Written Opinion for PCT Patent Application No. PCT/US2009/069536, issued Jul. 30, 2010.

International Search Report and Written Opinion for PCT Patent Application No. PCT/US2009/069537, issued Jul. 30, 2010.

International Search Report and Written Opinion for PCT Patent Application No. PCT/US2009/069530, issued Aug. 16, 2010.

Srinivasan, "A New Class of Mirrors for Wide-Angle Imaging," Centre for Visual Sciences, Research School of Biological Sciences, Australian National University, (Jun. 2003).

"e2v Introduces New High Spec 1.3 MP CMOS Image Sensor" http://www.e2v.com/news/e2v-introduces-new-high-spec-1-3mp-cmos-image-sensor--with-embedded-features--for-industrial-imaging-/ (Sep. 14, 2009).

Search Report and Written Opinion dated Jun. 18, 2012 in corresponding EP application 09709958.4.

* cited by examiner

US 8,353,457 B2

SYSTEMS AND METHODS FOR FORMING A COMPOSITE IMAGE OF MULTIPLE PORTIONS OF AN OBJECT FROM MULTIPLE PERSPECTIVES

RELATED APPLICATIONS

Priority is claimed under 35 U.S.C. §119 to (1) U.S. provisional application No. 61/028,164, filed Feb. 12, 2008, entitled "Systems and Methods for Forming a Composite Image of Multiple Portions of an Object form Multiple Perspectives" and (2) U.S. provisional application No. 61/140,930, filed Dec. 26, 2008, entitled "Optical Code Reader Having Compact Arrangement for Acquisition of Multiple Views of an Object." Both of the foregoing applications are incorporated by reference herein in their entireties.

TECHNICAL FIELD

The field of this disclosure relates generally but not exclusively to reading of optical codes (e.g., bar codes), and more particularly to code readers utilizing an imager or camera.

BACKGROUND INFORMATION

Optical codes encode useful, optically-readable information about the items to which they are attached or otherwise associated. Perhaps the best example of an optical code is the bar code. Bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., containers of milk) or a unique item (e.g., U.S. Pat. No. 7,201,322). Bar codes consist of alternating bars (i.e., relatively dark areas) and spaces (i.e., relatively light areas). The pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a bar code reader must be able to reliably discern the pattern of bars and spaces, such as by determining the locations of edges demarking adjacent bars and spaces from one another, across the entire length of the bar code.

Bar codes are just one example of the many types of optical codes in use today. Bar codes are an example of a one-dimensional or linear optical code, as the information is encoded in one direction—the direction perpendicular to the bars and spaces. Higher-dimensional optical codes, such as, two-dimensional matrix codes (e.g., MaxiCode) or stacked codes (e.g., PDF 417), which are also sometimes referred to as "bar codes," are also used for various purposes.

Two of the more important types of devices that read optical codes are (1) flying-spot scanning readers and (2) imager-based readers. The first of these types historically has been the laser-based bar code reader (also called a "scanner"), which generates a spot from a laser beam and sweeps or scans the spot across a bar code label. A laser-based bar code reader detects reflected and/or refracted laser light from the bars and spaces in a bar code as the laser spot moves across the bar code. An optical detector measures the intensity of the returned light as a function of time or position and generates an electrical signal having an amplitude determined by the intensity of the detected light. As the bar code is scanned, positive-going transitions and negative-going transitions in the electrical signal occur, signifying transitions between bars and spaces in the bar code. The electrical signal can be processed to determine the arrangement of bars and spaces of the scanned bar code. The bar and space information can be provided to a decoding unit to determine whether the bar code is recognized and, if so, to decode the information contained in the bar code.

To move the laser beam spot across a bar code or other optical code, various mechanisms have been utilized, including a rotating mirror with multiple facets, a dithering single-facet mirror, and a dithering light source. All of those mechanisms rely on moving parts to scan the laser beam or other light source. One example of a laser-based scanner of the first type is the Magellan®-2200VS scanner made by Datalogic Scanning (formerly known as PSC), Eugene, Oreg. FIGS. 1 and 2 are simplified drawings representative of a laser-scanning mirror arrangement of this type of scanner 100. FIG. 1 is a view directly facing the scanner window 110, and FIG. 2 is a cut-away side view. A laser 115 generates a laser beam 120 that propagates toward a facet wheel or polygon mirror 125 having four outer surface side mirrors 130A, 130B, 130C, and 130D. The polygon mirror 125 is powered to rotate about its axis (facing generally into the page in FIG. 1) by a motor 128. Assuming for the sake of discussion that the polygon mirror 125 spins counterclockwise as viewed in FIG. 1, then as the side mirror 130A rotates completely past the incoming laser beam 120, the beam is reflected toward mirrors 135, 140, 145, 150, and 155 along the trajectory 160A shown. The reflected beam first traverses across the mirror 135, from left to right as shown, then mirror 140, then the other mirrors 145, 150, and 155 in that order. This process results in five scan lines 165A, 170A, 175A, 180A, and 185A, as shown in FIG. 3.

Each of the side mirrors 130 is tilted at a different angle with respect to the axis of rotation of the polygon mirror 125. Thus, as the next side mirror 130B spins into and across the laser beam 120, the reflected laser beam traverses the trajectory 160B—which is offset from the trajectory 160A due to the different tilt angle of the side mirrors 130A and 130B—across the mirrors 135-155, producing the scan lines 165B-185B shown in FIG. 3. This process repeats as side mirrors 130C and 130D spin across the laser beam 120, producing reflected beam trajectories 160C and 160D, respectively, and scan lines 165C-185C and then scan lines 165D-185D, respectively. Thus, in one complete revolution of the polygon mirror 125, the scanner 100 generates scan lines 165A-185A, 165B-185B, 165C-185C, and 165D-185D in that order. The set of those scan lines together constitutes a scan line pattern 190.

The scan line pattern 190 shown in FIG. 3 is a planar representation of moving laser beams in three dimensions. To be precise, a scan line is the intersection of a plane of light projected out through the scanner's window with a surface. The scan line pattern 190 depicted in FIG. 3 can be visualized as the pattern left by the scanning laser beams on the scanner window 110 or on a planar surface disposed at some distance above and typically parallel to the scanner window 110. As such, the scan line pattern 190 captures the spatial and angular separation among the individual scan lines but it does not capture any information about the direction from which the laser beam emanates from the scanner window 110 for the various scan lines. All three factors—spatial separation, angular separation or diversity within a plane, and directional diversity—can enhance the ability of the scanner 100 to read optical codes in different locations and orientations (i.e., pitch, roll, and yaw) within the scanner's viewing or scan volume, which is generally the space above the scanner window 110, including, typically, some space forward of and to the sides of the space directly above the scanner window 110. For example, a bar code lying generally in a plane parallel to the window 110 can be offset forward or backward, offset left or right, and/or oriented at variety of angles within the plane while being successfully scanned by at least one of the scan lines. Moreover, the same bar code may not be lying flat in a plane parallel to the window 110. For example, the bar code may be tilted forward or left or right somewhat and still be scanned successfully. The mirror 145 is useful for scanning forward-facing codes, for example, while the mirrors 135 and 155 are useful for scanning sideways-facing codes.

Other examples of laser-based scanners are disclosed in U.S. Pat. No. 7,198,195, assigned to the assignee of the present application.

While scanning laser-based bar code readers have become the standard for many applications, particularly fixed scanners such as those found at high-volume retail checkout registers, laser-based scanners do have some disadvantages. In particular, with reference to FIGS. 1-2, the laser 115 and motor 128 add to the complexity, cost, bulk, power consumption, and start-up time of the overall system, while decreasing reliability. In fact, the motor 128 used for sweeping the laser spot tends to be one of the least reliable components of a scanner, followed by the laser illumination source 115.

Imager-based readers operate according to a different principle, compared to laser-based scanners. An imager-based reader utilizes a camera or imager to generate electronic image data (typically in digital form) of an optical code. The image data is then processed to find and decode the optical code. For example, virtual scan line techniques are known techniques for digitally processing an image containing a bar code by looking across an image along a plurality of lines, typically spaced apart and at various angles, somewhat like a laser beam's scan pattern in a laser-based scanner.

Imager-based readers typically can only form images from one perspective—usually that of a normal vector out of the face of the imager. However, a few imager-based readers that generate multiple perspectives are known. One such reader is disclosed in the present assignee's U.S. Patent Application Publication No. 2006/0163355, published Jul. 27, 2006, in the names of inventors Olmstead et al., which discloses an embodiment having two cameras to collect two images from two different perspectives for the purpose of mitigating specular reflection. Similarly, U.S. Pat. No. 6,899,272, issued to Krichever et al. on May 31, 2005, discloses one embodiment that utilizes two independent sensor arrays pointed in different directions to collect two image data from two different perspectives. Another embodiment according to the '272 patent utilizes a single camera pointed at a moveable mirror that can switch between two positions to select one of two different imaging directions. Additionally, the present assignee's U.S. Pat. No. 5,814,803, issued to Olmstead et al. on Sep. 29, 1998, depicts in its FIG. 62 a kaleidoscope tunnel formed from two mirrored surfaces, resulting in eight different, rotated versions of the same object (bar code) on a single imager.

DETAILED DESCRIPTION OF EMBODIMENTS

With reference to the above-listed drawings, this section describes particular embodiments and their detailed construction and operation. The embodiments described herein are set forth by way of illustration only and not limitation. Those skilled in the art will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments. For example, while the example embodiments described herein are principally fixed scanners, the teachings herein are equally applicable to presentation or handheld scanners.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

I. Overview

Various imager-based optical code readers and associated methods are described herein.

Figure 1:
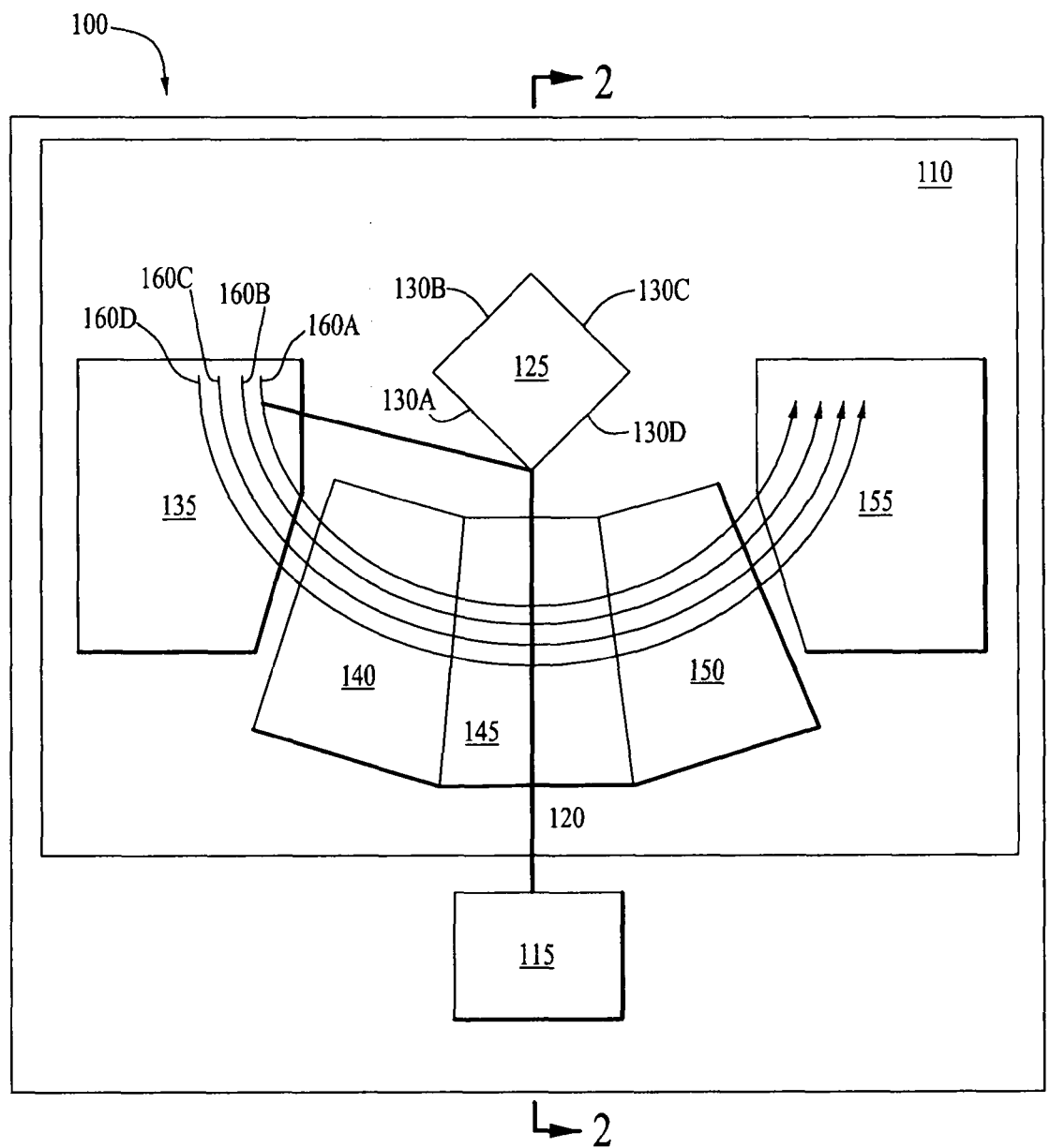
FIG. 1 is a simplified front-face view of a laser-based scanner.

Certain embodiments of the optical code readers described herein attempt to mimic the performance of a laser-based scanner (e.g., the scanner 100 in FIG. 1) without a laser (e.g., the laser 115) or moving parts (e.g., the motor 128 and the polygon mirror 125), but instead utilize an electronic imaging device such as a camera. This goal can be accomplished, for example, by taking several different thin strip-shaped views looking into the viewing volume from different perspectives, such as having a different view for each of the scan lines 165A-185D (or a subset thereof), and directing or projecting those views onto different sections of the imaging device's imaging face. The result of this multi-perspective imaging is a composite image of several different sections, such as the strips illustrated by way of example in FIG. 4.

Figure 4:
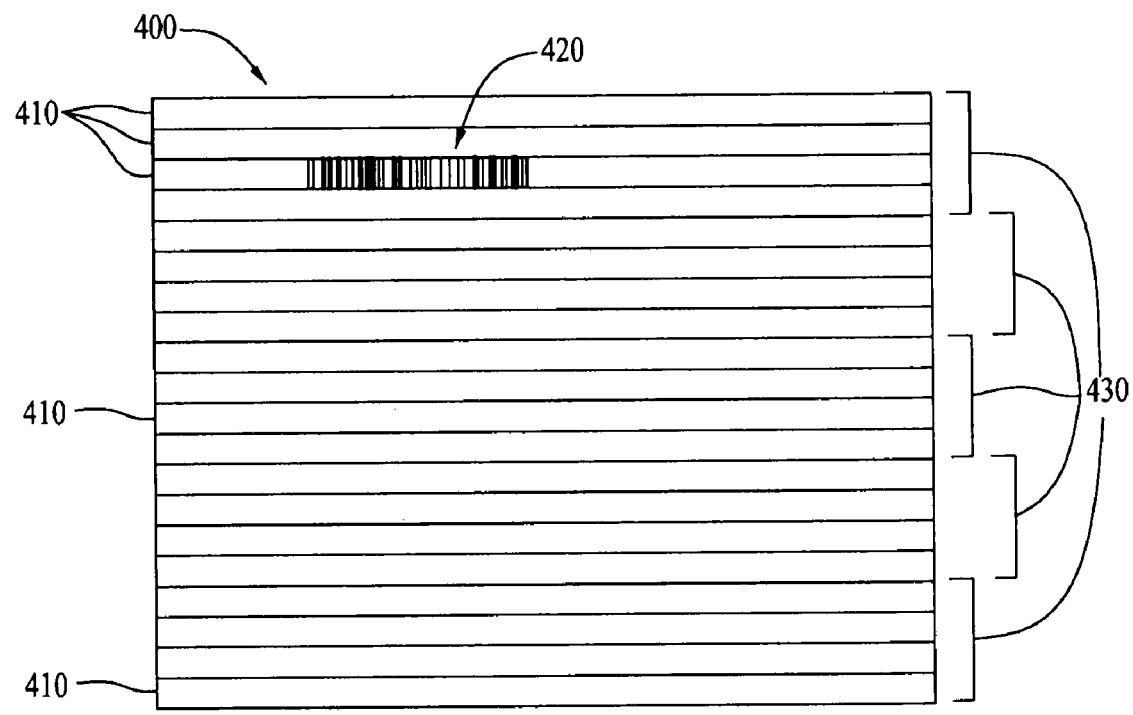
FIG. 4 is a plan view of the face of an imager or an image generated by an imager, according to one embodiment.

FIG. 4 shows a composite image 400 made up of a number of stacked regions, which are horizontal image slices or strips 410 across the image. Each strip 410 corresponds to a different view into the viewing volume. One or more of the image strips 410 ideally is capable of traversing at least a portion of an optical code, such as a bar code image 420, thus providing an image of at least a portion of the code sufficient to decode, as illustrated by way of example in the third image strip 410 down from the top of the image 400. Depending on the location and angular orientation of the bar code in the viewing volume, one or more of the image strips 410 should contain a decodable image. The composite image 400 in FIG. 4 contains twenty image strips 410, by way of illustration only. More or less image strips are possible, and the image strips may be taller or shorter than shown. The image strips need not be all of a uniform height or width but are generally sized to fit the optical code to be read. The image strips may be oriented in a direction different from horizontal, such as vertically or at some other angle. It is not necessary that all image strips be oriented in the same direction, although that is preferable for simplicity of processing. The strips need not be strip shaped, but may have other shapes, although a strip-like shape naturally suits linear optical codes. The strips 410 are grouped together into five different zones 430 of four strips 410 each, according to this example. Other groupings are possible.

Figure 2:
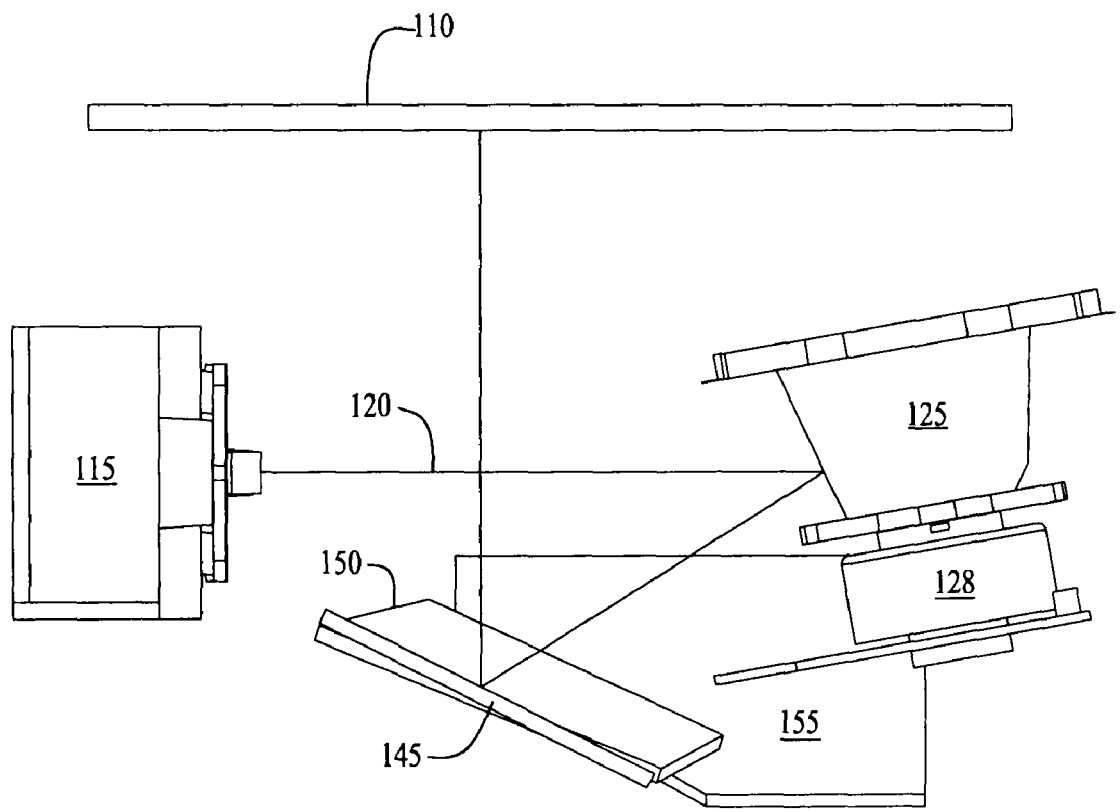
FIG. 2 is a simplified side cut-away view of the laser-based scanner of FIG. 1.
Figure 5:
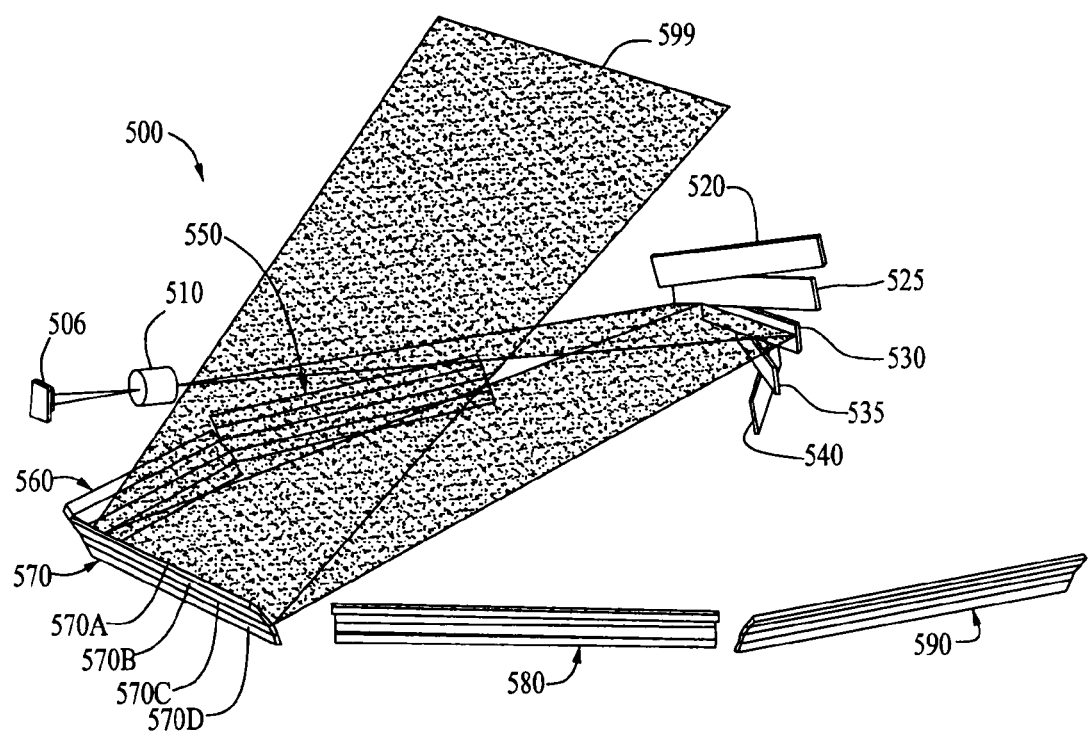
FIG. 5 is a perspective view of an imaging system, according to one embodiment.
Figure 6:
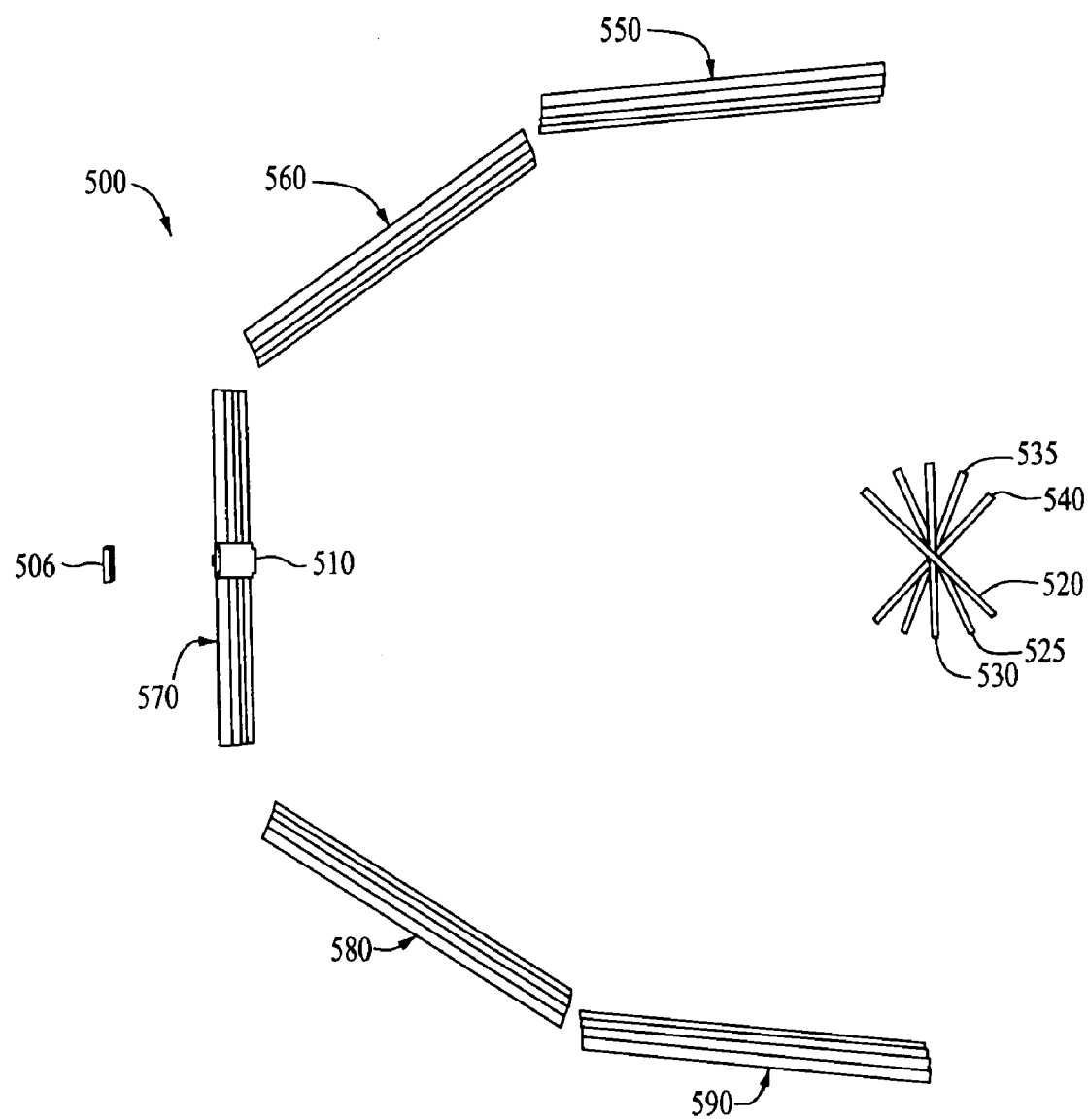
FIG. 6 is a plan view of the imaging system shown in FIG. 5.

One example of a device that can generate the composite image 400 can be derived from the laser-based scanner 100 (FIGS. 1-2) as follows: An imager is placed approximately where the laser light source (e.g., the laser 115) or light collection system in a laser-based scanner would be located, and a set of mirrors is placed approximately where the spinning polygon mirror (e.g., the polygon mirror 125) would be located. In addition, other mirrors, such as pattern mirrors, can be placed in areas such as where the mirrors 135-155 are located in the scanner 100. More specifically, with reference to FIGS. 5 (perspective view) and 6 (top view), an imager 508 looks through a lens 510 at a set of "signpost" or redirection mirrors 520-540, which redirect the field of view of horizontal slices from the imager's field of view toward several sets 550-590 of pattern mirrors, in a fashion analogous to the facet wheel. However, the redirection mirrors 520-540 separate the field of view spatially (all at once), instead of temporally (one at a time) as with a facet wheel. In FIGS. 5-6, there are five redirection mirrors 520-540 to separate the field of view into five different gross or large-scale angles, and there are four parallel pattern mirrors per angle to set what would be called "line separation" in laser scanners. For example, the pattern mirror set 570 contains mirrors 570A, 570B, 570C and 570D—each facing a slightly different direction to create the offset between generally parallel viewing strips. The overall result is five families of four parallel viewing strips (analogous to a laser-based scanner's scan lines) into the viewing volume. At the imager 508, the result is that the imager's field of view is split into a stack of twenty horizontal slices or strips 410, each corresponding to where a scan line in a laser scanner would have been aimed, as shown in FIG. 4, for example. The redirection mirrors 520-540 split the imager 508's field of view into five different zones, and the pattern mirrors split each zone into four strips.

Stated differently, the mirrors 520-590 break up, split, partition or fragment a camera's field of view into multiple discontinuous or disjoint pieces, sections or parts to provide different views, vantages or perspectives into the viewing volume. Put another way, the mirrors 520-590 create a kaleidoscope, projecting a plurality of diverse views (e.g., twenty slices or strips) together onto the same imager. This kaleidoscope view into the viewing volume may be configured to have the same or comparable perspective diversity as a laser-based scanner (e.g., the ability to see more sides of an object) while allowing use of an imager, with its attendant advantages. This type of multi-perspective or kaleidoscope scheme can achieve perspective diversity with a single imager, and therefore at less expense and complexity than if several imagers were utilized.

Figure 3:
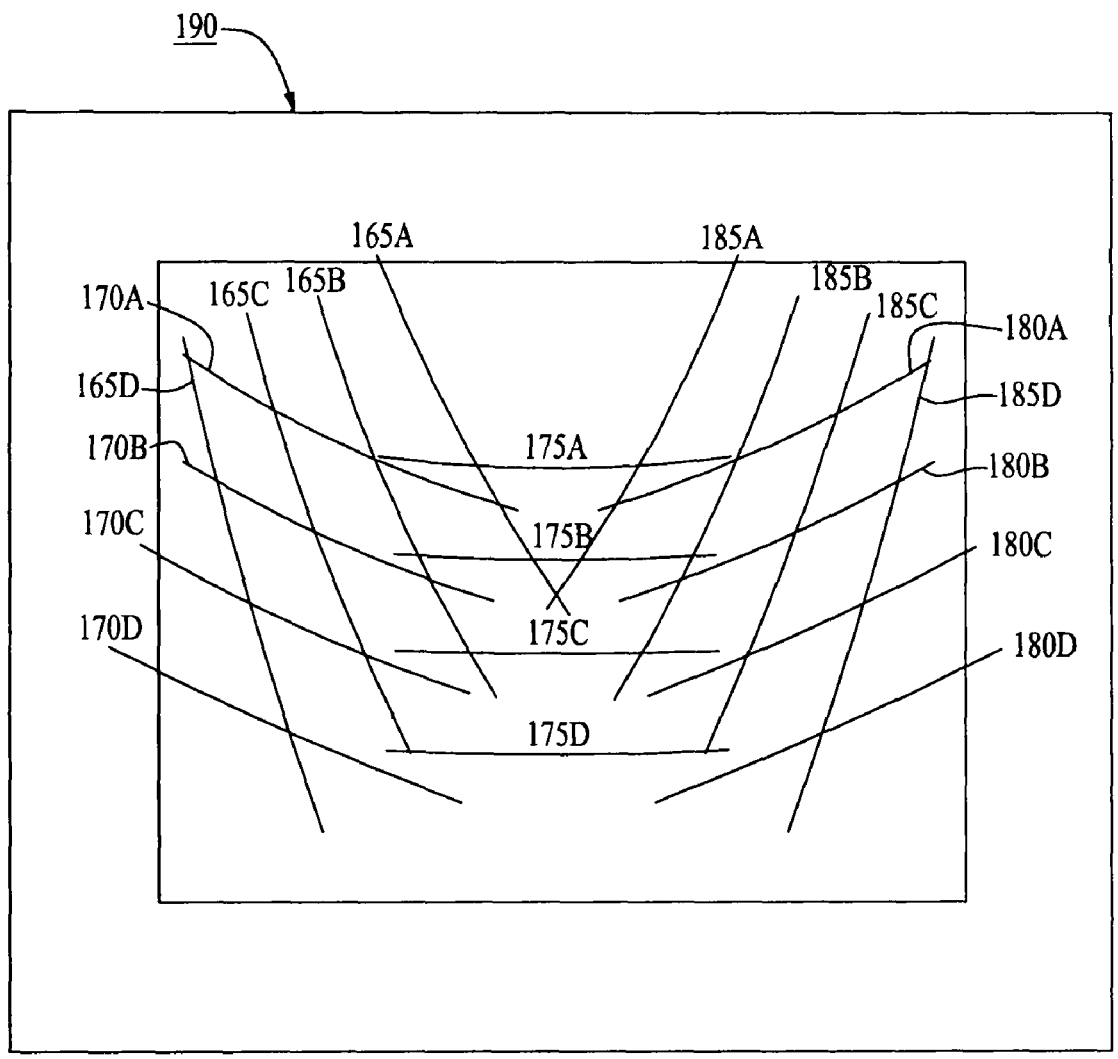
FIG. 3 is a laser scan line pattern produced by the laser-based scanner of FIGS. 1 and 2.
Figure 7:
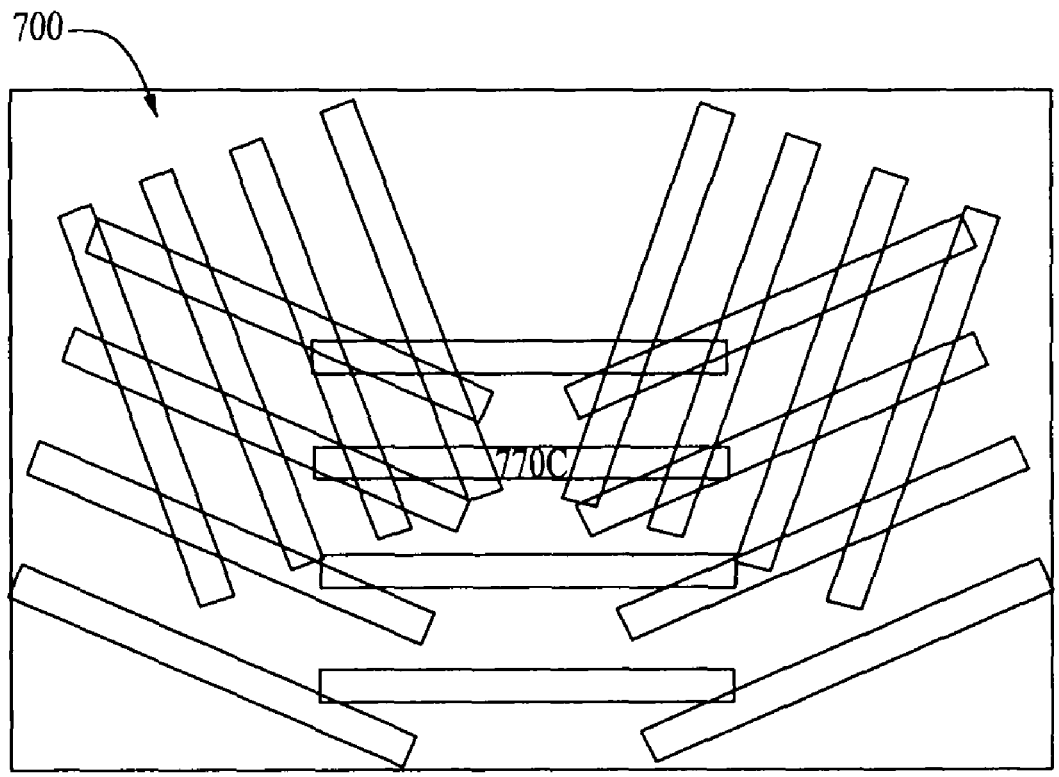
FIG. 7 depicts a "pseudo scan line pattern" or pattern of viewing strips, according to one embodiment.

FIG. 7 depicts one conceptual example of a "pseudo scan line pattern" 700, which is a pattern of viewing strips, according to the embodiment illustrated in FIGS. 5-6. The pseudo scan line pattern 700 is the imaging analogy of a laser-based scanner's scan lines (e.g., as shown in FIG. 3) for purposes of coverage analysis within the viewing volume. The labeled viewing strip 770C in FIG. 7 corresponds to the folded plane 599 off the pattern mirror 570C illustrated in FIG. 5. The scene in the viewing volume along that strip 770C is collected as image data in the middle labeled image strip 410 (eleventh strip down from the top) in FIG. 4.

A designer can select a desirable layout for a pseudo scan line pattern using the same principles used with laser-based scanners. For example, the spacing between adjacent scan or pseudo scan lines can be set based on an assumed height of the optical code. Thus, as a code's position is translated in a plane parallel to the reader's window, the code will move into one view to a sufficient degree for reading before or as it moves out of another view to the extent that it is not readable. As another example, the angles between different sets of scan lines can be set to give acceptable readability coverage in terms of angular orientation in a plane parallel to the reader's window, and the directions from which the scan or pseudo scan lines emanate can be chosen to give desired multi-side visibility of an object in the viewing volume. Thus, as a code is rotated, it will become readable in one view before or as it becomes unreadable in another view. Based on a desired pseudo scan line pattern, a designer can place mirrors appropriately to achieve that desired pattern.

Illumination can optionally be provided to facilitate imaging, if ambient lighting is not adequate. Added illumination can be synchronized with imaging, if desired. Added illumination may be broad field within much or all of the viewing volume, or the illumination may be directed to just the sections where the views are taken for imaging. For example, additional illumination can be provided with light sources positioned near the lens 510, aimed toward the redirection mirrors 520-540 and covering the imager's field of view. In that example, the action of the redirection mirrors 520-540 separates the illumination into thin strips, which resemble laser lines to an observer. In other words, the same mirror(s) in the reader can be used both to direct scene(s) into the imager and also to direct illumination onto the scene. This illumination creates a visible (assuming the illumination is in the visible spectrum) pseudo scan line pattern, much like shown in FIG. 7, and is the illumination analogy of a laser-based scanner's scan lines from an observer's perspective.

The imager 508 may be, for example, a rolling-reset CMOS (complementary metal oxide semiconductor) type imager, which is typically inexpensive, a global-shutter imager, a CCD (charge-coupled device) imager, or another type of camera. An imager-based reader as described herein may be completely solid state with no moving parts and can eliminate the disadvantages associated with a motor and a laser, while achieving performance comparable to a laser-based scanner in terms of perspective diversity, although not all embodiments necessarily achieve all of these benefits.

According to one embodiment, an imager-based method reads an optical code on an object in a viewing volume. The method divides an image plane into a plurality of strip-shaped sections and views the object in the viewing volume from a plurality of perspectives. The method forms a plurality of strip-shaped images corresponding to the plurality of perspectives, respectively, wherein the strip-shaped images are in the strip-shaped sections of the image plane, thereby creating a composite image containing data from the plurality of perspectives. The method processes at least a portion of the composite image so as to ascertain the information encoded in the optical code on the object in the viewing volume.

According to another embodiment, an imaging system forms image data from an object bearing an optical code in a viewing volume. The imaging system comprises a camera, a first set of a plurality of fixed mirrors, a second set of at least one fixed mirror, and a decoder. The camera comprises an imager and a lens. The imager comprises a set of pixel imaging elements arranged in a two-dimensional imaging plane. The lens is positioned in front of the imager so as to focus a field of view onto substantially all of the pixel imaging elements of the imager. The first set of a plurality of fixed mirrors is placed in the field of view. The mirrors in the first set split the field of view into plural portions and redirect said portions in different directions away from first set of mirrors. The second set of at least one fixed mirror is placed in a portion of the field of view as redirected by one of the first set of mirrors and positioned to redirect said potion of the field of view into the viewing volume from one or more perspectives. The system thereby provides an image of at least a portion of the object from said perspectives on a portion of the pixel imaging elements of the imager. The decoder interfaces to the camera and is configured to decode the optical code imaged by the imager.

According to another embodiment, an imaging system forms image data from an object bearing an optical code in a viewing volume. The imaging system comprises an imager and a set of non-moving mirrors. The imager comprises a set of pixel imaging elements arranged in a two-dimensional imaging plane. The set of non-moving mirrors are arranged to collect N views of the viewing volume from different perspectives and to reflect the N views onto N distinct portions/regions of the imaging plane. Preferably, N is greater than eight. Optionally, at least three of the portions are oriented in a common direction across the imaging plane regardless of the perspective from which the corresponding view is taken.

According to another embodiment, a method generates useful image data for an optical code on an object in a viewing volume using an imager and a set of fixed mirrors. The method comprises projecting onto a first portion of the imager a first partial view of the object from a first perspective into the viewing volume, projecting onto a second portion of the imager a second partial view of the object from a second perspective into the viewing volume, and projecting onto a third portion of the imager a third partial view of the object from a third perspective into the viewing volume. The second perspective is different from the first perspective in at least one of viewing position and viewing angle. The third perspective is different from both the first perspective and the second perspective in at least one of viewing position and viewing angle. At the imager, the second portion of the imager is different from the first portion of the imager, and the third portion of the imager is different from both the first portion and the second portion of the imager. The first, second and third portions of the imager are preferably substantially aligned in a common direction across the imager.

According to another embodiment, an illumination method can be used with a solid state imager comprising a surface having many closely spaced pixel imaging elements that together form a two-dimensional image of a field of view that spans a viewing area at a given distance from the imager. The method provides illumination and directing said illumination to less than all of the viewing area. The method forms a partial image, by use of the imager, of no more than the portion of the viewing area to which said illumination is directed.

According to yet another embodiment, an imager-based reader has illumination capability for machine vision of an object in a viewing volume. The reader comprises a solid state imager, a set of fixed mirrors, and an illumination source. The solid state imager comprises a surface having many closely spaced pixel imaging elements that together form a two-dimensional image of a field of view. The set of fixed mirrors are positioned in the imager's field of view and arranged to divide the imager's field of view into multiple pieces and to direct the multiple pieces to portions of the viewing volume, the imager acquiring, onto corresponding different regions of the imager, two-dimensional images of the multiple pieces. The illumination source is configured to shine light into the viewing volume by way of reflection via at least one mirror in the set of fixed mirrors.

As used herein, the term "perspective" encompasses a location, direction, angle, or the like—or any combination of the foregoing—that characterize a vantage or point of view for seeing, imaging, visualizing via machine vision, or illuminating an object or a part of an object.

As one skilled in the art will appreciate in light of this disclosure, certain embodiments may be capable of achieving certain advantages, including some or all of the following: (1) perspective diversity approaching or even matching that of laser-scanning readers, including the ability to robustly scan codes at a variety of locations and angular orientations (pitch, roll, and yaw) in the viewing volume, with concomitant advantages in terms of (a) usability, (b) successful scan rate, and (c) throughput for repeat-use applications such as retail checkout; (2) elimination of moving parts; (3) improved reliability; (4) longer product life; (5) decreased expense; (6) more rapid start-up; (7) simplified digital processing compared to single-perspective imager-based code readers; and (8) decreased power consumption and heat generation; (9) less noise generation; (10) decreased eye safety concerns; and (11) scalability and flexibility to add and/or change features and/or operational modes. These and other advantages of various embodiments will be apparent upon reading this document.

Additional details concerning the construction and operation of particular embodiments are set forth in the following subsections with reference to the above-listed drawings.

II. Composite Imaging

Figure 8:
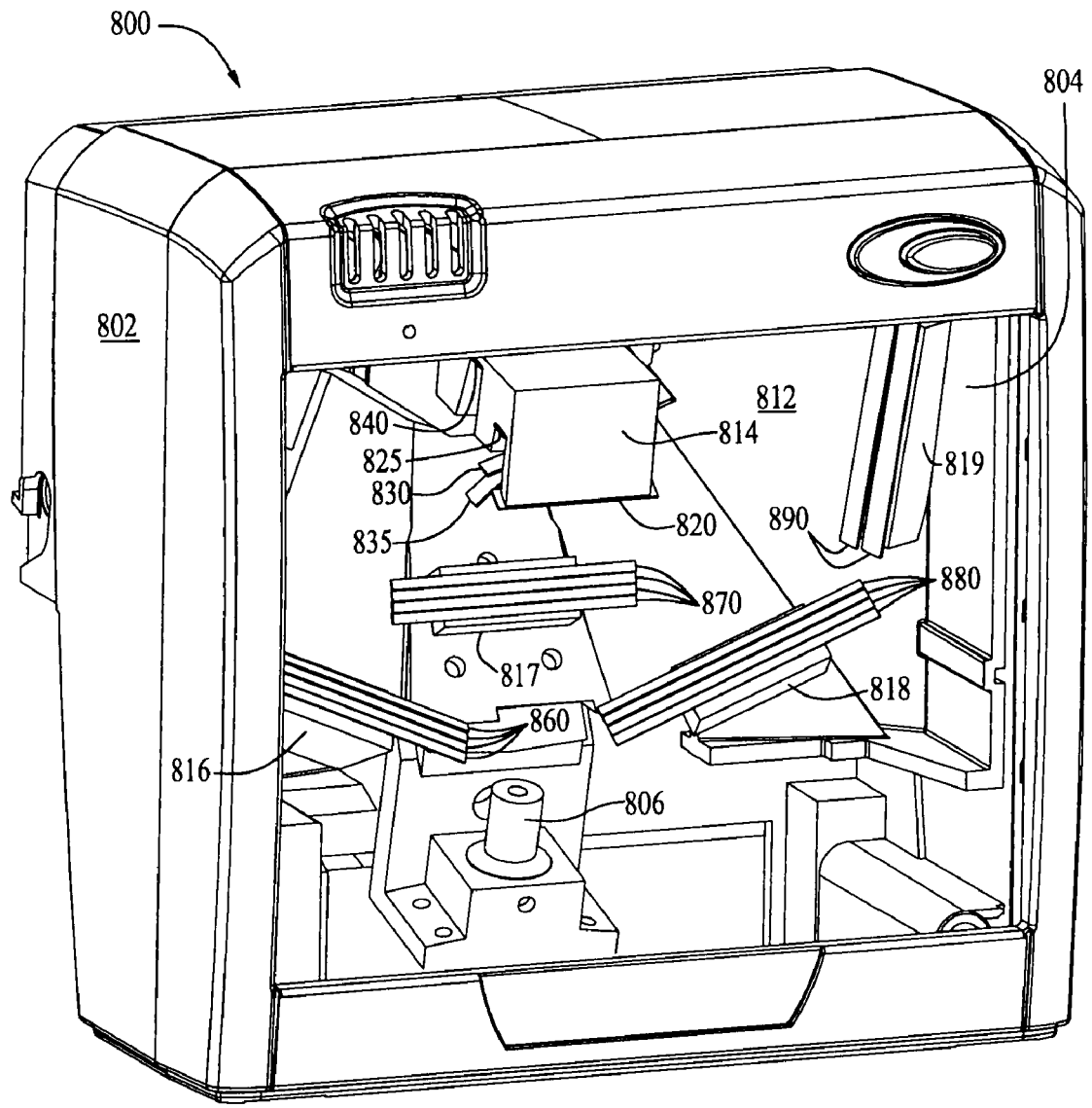
FIG. 8 is an isometric view of an imager-based reader, illustrating an optical layout within an enclosure, according to one embodiment.

This subsection describes, by way of example, details of one design of an imager-based reader 800. That design is generally illustrated in FIGS. 8-13. FIG. 8 is an isometric view of the imager-based reader 800 in an enclosure 802, which may be, for example, formed of plastic, metal, and/or any other suitable materials. The enclosure 802 comprises a transparent window 804, which may be, for example, glass. The window 804 may have light filtering properties so as to filter out certain light wavelengths from entering the system. A viewing volume (which may also be called a scanning or pseudo-scanning volume) is outside of the reader 800 and bounded on one side by the window 804. When an object bearing an optical code is in the viewing volume and the optical code is generally facing toward the window 804 to a sufficient degree, the reader 800 "sees" the object and ideally can decode an optical code thereon. The reader 800 may be conveniently positioned so that the window 804 is oriented vertically, horizontally, or in another orientation.

Behind the window 804, the reader 800 comprises a number of components, including a camera 806, which typically comprises an imager 808 and a lens 810. The camera 806 is described in greater detail later in this document.

Figure 9:
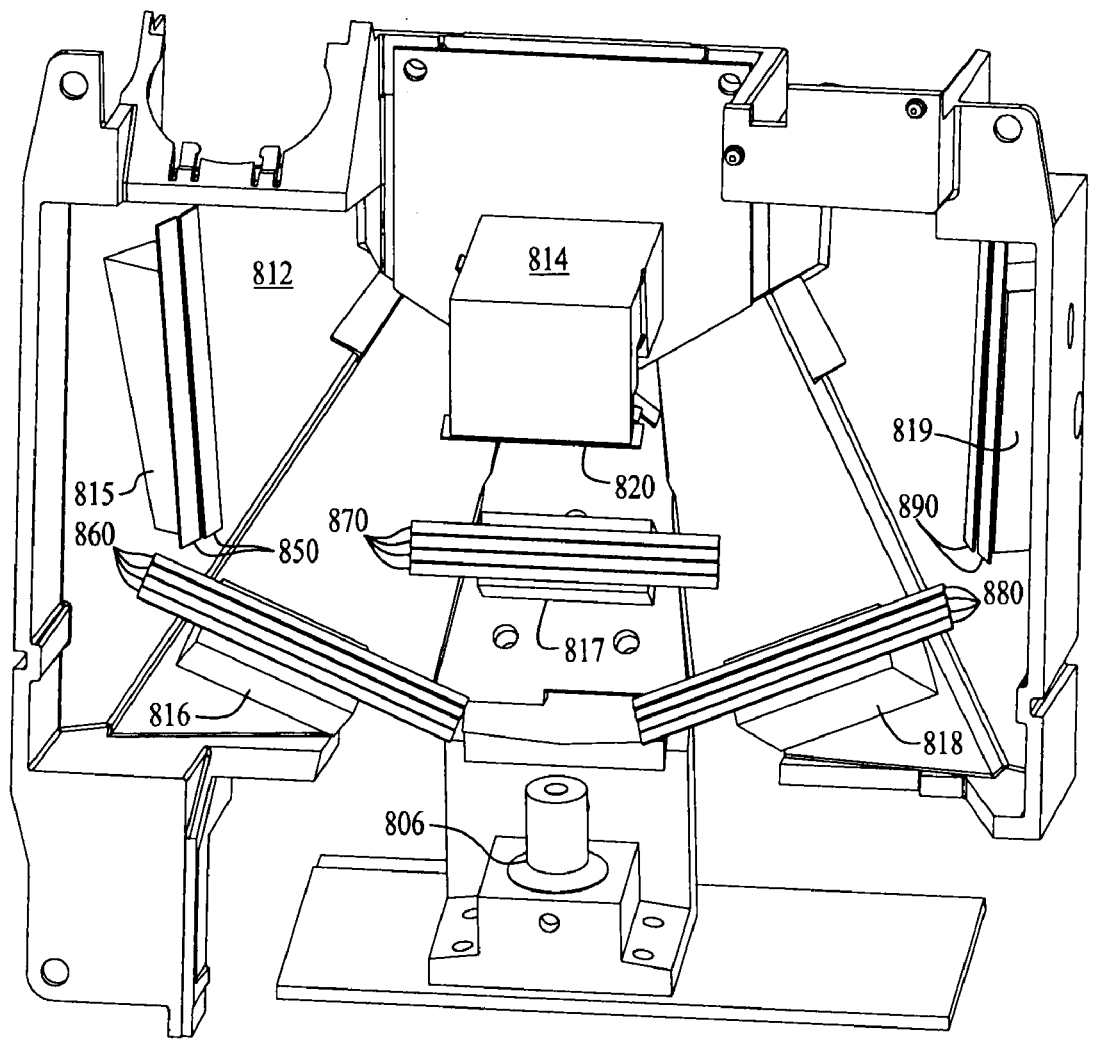
FIG. 9 is a an isometric view of the imager-based reader of FIG. 8 without the enclosure.
Figure 10:
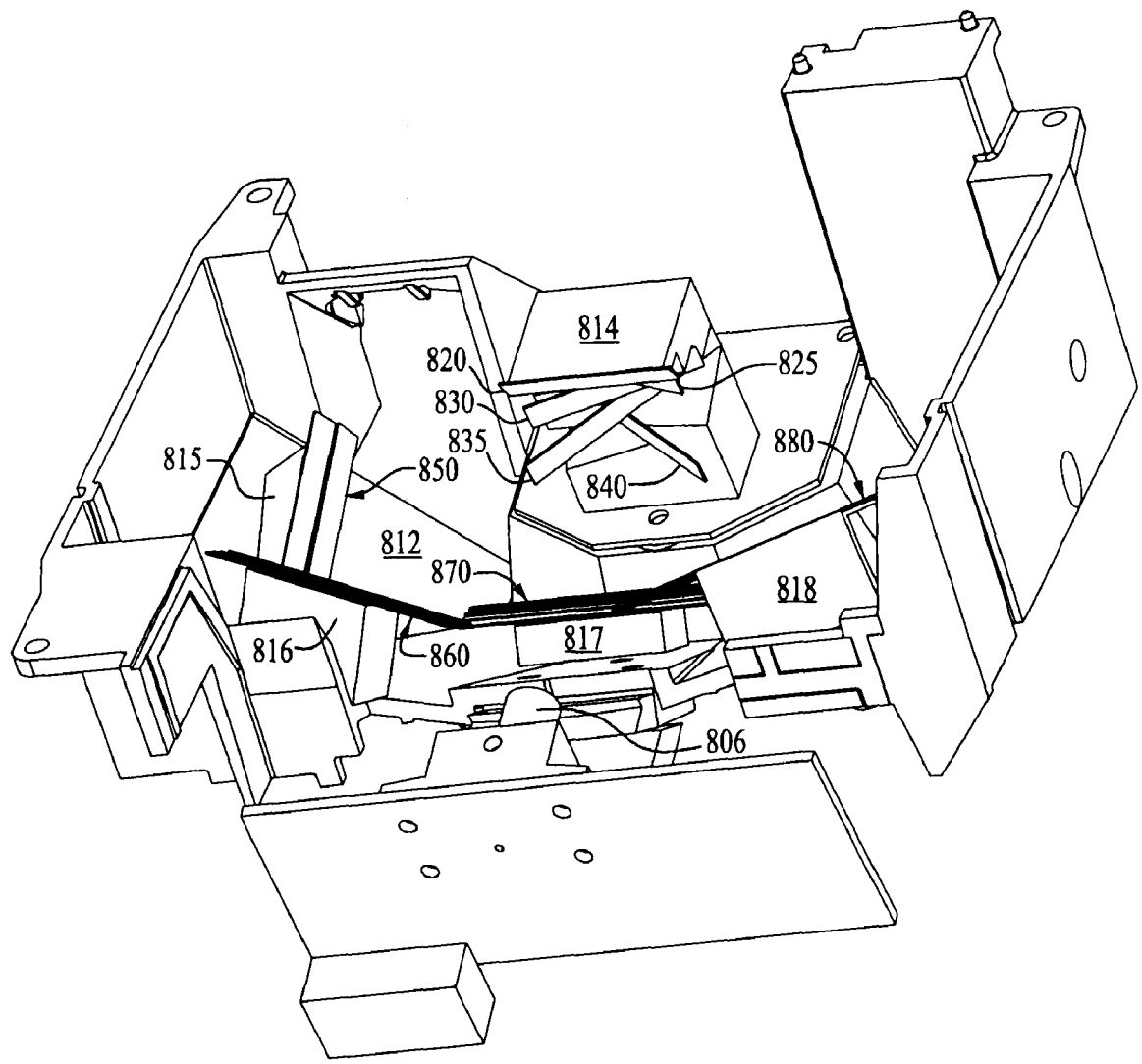
FIG. 10 is another isometric view of the imager-based reader of FIGS. 8-9 without its enclosure, from a different perspective.

Also behind the window 804, the reader 800 further comprises a basket 812, which can be seen more clearly in FIGS. 9-10, which are two different isometric views of internal components of the imager 800, without the enclosure 802.

Other internal components include a mounting block 814 for redirection mirrors, as well as mounting blocks 815-819 for pattern mirror sets. The mounting blocks 814-819 may be separable pieces connected or affixed to the basket 812 or may be integrally formed on or as part of the basket 812. The mounting blocks 814-819 are shaped, positioned, and oriented so as to position the mirrors in suitable locations to achieve desired operational characteristics.

Mounted to the mounting block 814 are redirection mirrors 820, 825, 830, 835 and 840. Each of the redirection mirrors 820, 825, 830, 835 and 840 is oriented to reflect one of the pattern mirror sets 850, 860, 870, 880 and 890 into a desired section of the camera's imaging plane. These mirrors may be constructed from any suitable mirrored or reflective material. For example, a reflective coating may be applied to the pertinent faces of the mirror block 814, or physically separate mirror pieces (made from, e.g., diced coated silicon wafer pieces) may be attached thereto. According to one example, the redirection mirrors 820-840 may be silicon mirrors having a rectangular shape having dimensions 36 mm×4.2 mm. As shown, the redirection mirror 820 is directed at the pattern mirror set 870, the redirection mirror 825 is directed at the pattern mirror set 860, the redirection mirror 830 is directed at the pattern mirror set 880, the redirection mirror 835 is directed at the pattern mirror set 890, and the redirection mirror 840 is directed at the pattern mirror set 850. Other orderings or arrangements of the redirection mirror 820, 825, 830, 835 and 840 are possible, as are other pairings of the redirection mirrors with pattern mirror sets. A desirable arrangement of the redirection mirrors provides an unobstructed view of each set of pattern mirrors, as seen from the imager. In general, depending on the arrangement, it is possible that one or more redirection mirrors or its mount may occlude the view seen via another redirection mirror. Some partial occlusion is tolerable, provided that enough of the partially occluded view comes through to the imager 808 to enable it sufficiently often enough to successfully decode an optical code seen from that point of view. A reader built as generally shown in FIGS. 8-11 should have acceptable self-occlusion caused by the mounting block 814 and the redirection mirrors 820, 825, 830, 835, and 840. Other designs may be more or less tolerant of self-occlusion.

Figure 11:
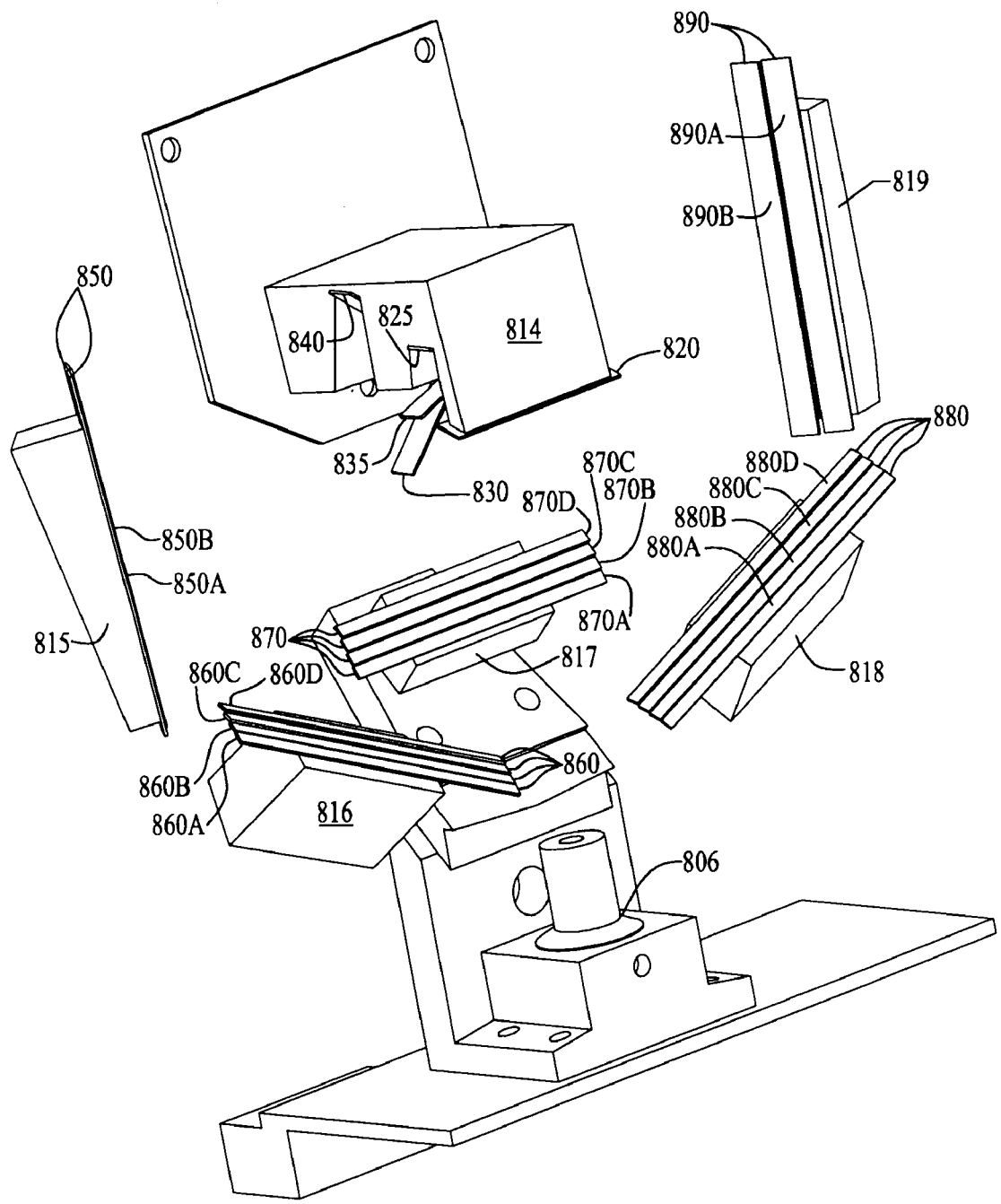
FIG. 11 is an isometric view of select internal parts of the imager-based reader of FIGS. 8-10 without the enclosure or support basket.

FIG. 11 is an isometric view of selected internal parts of the reader 800 without its enclosure 802 or basket 812. The pattern mirrors 850A and 850B; 860A, 860B, 860C, and 860D; 870A, 870B, 870C, and 870D; 880A, 880B, 880C and 880D; and 890A and 890B in the sets 850, 860, 870, 880 and 890, respectively, are individually labeled in FIG. 11. In this embodiment, each of the mirror sets 860, 870, and 880 has four pattern mirrors, while the sets 850 and 890 each has two pattern mirrors. The number of pattern mirrors per set is arbitrary within constraints such as acceptability or desirability of the resulting pseudo-scan line coverage pattern; occlusion issues; and minimum strip height to yield a decodable image section (e.g., sufficient height to fit a two-dimensional optical code, if that be the application). Decodability of image data may depend, in turn, on the camera's resolution, the decoding algorithm employed, as well as other factors. According to one example, the pattern mirrors may be silicon mirrors having a rectangular shape with dimensions 43 mm×1.7 mm.

Figure 12A:
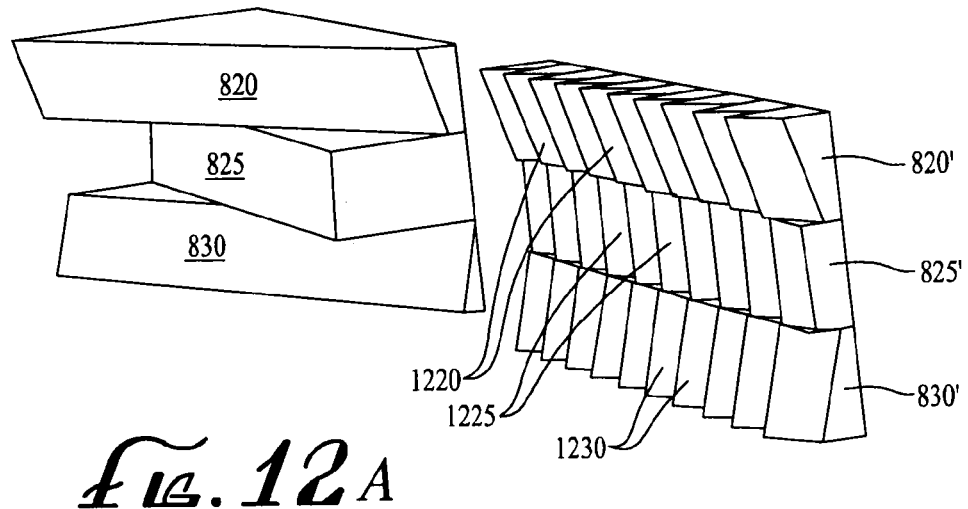
FIGS. 12A, 12B and 12C are isometric views of alternative redirections mirrors based on Fresnel prisms for use in the imager-based reader of FIGS. 8-11.
Figure 12B:
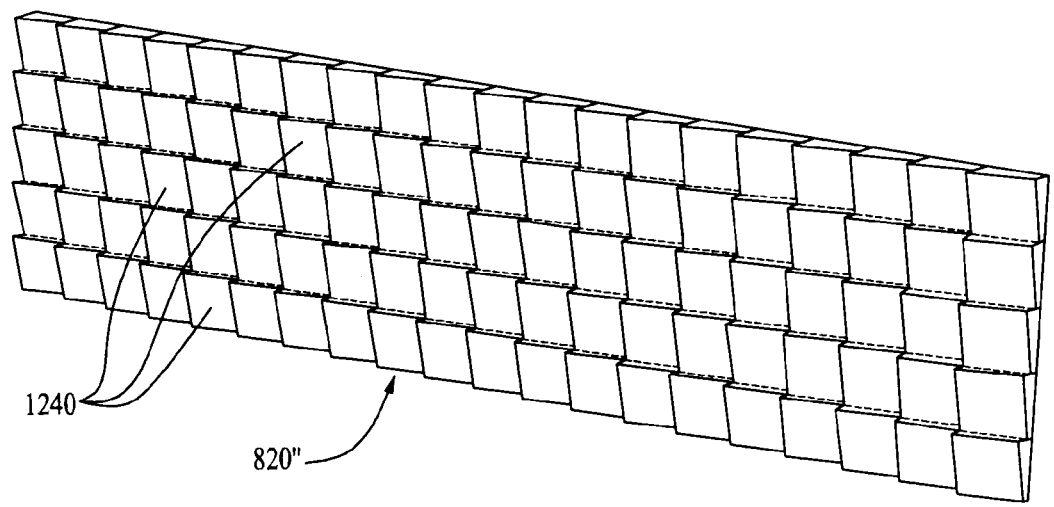
Figure 12C:
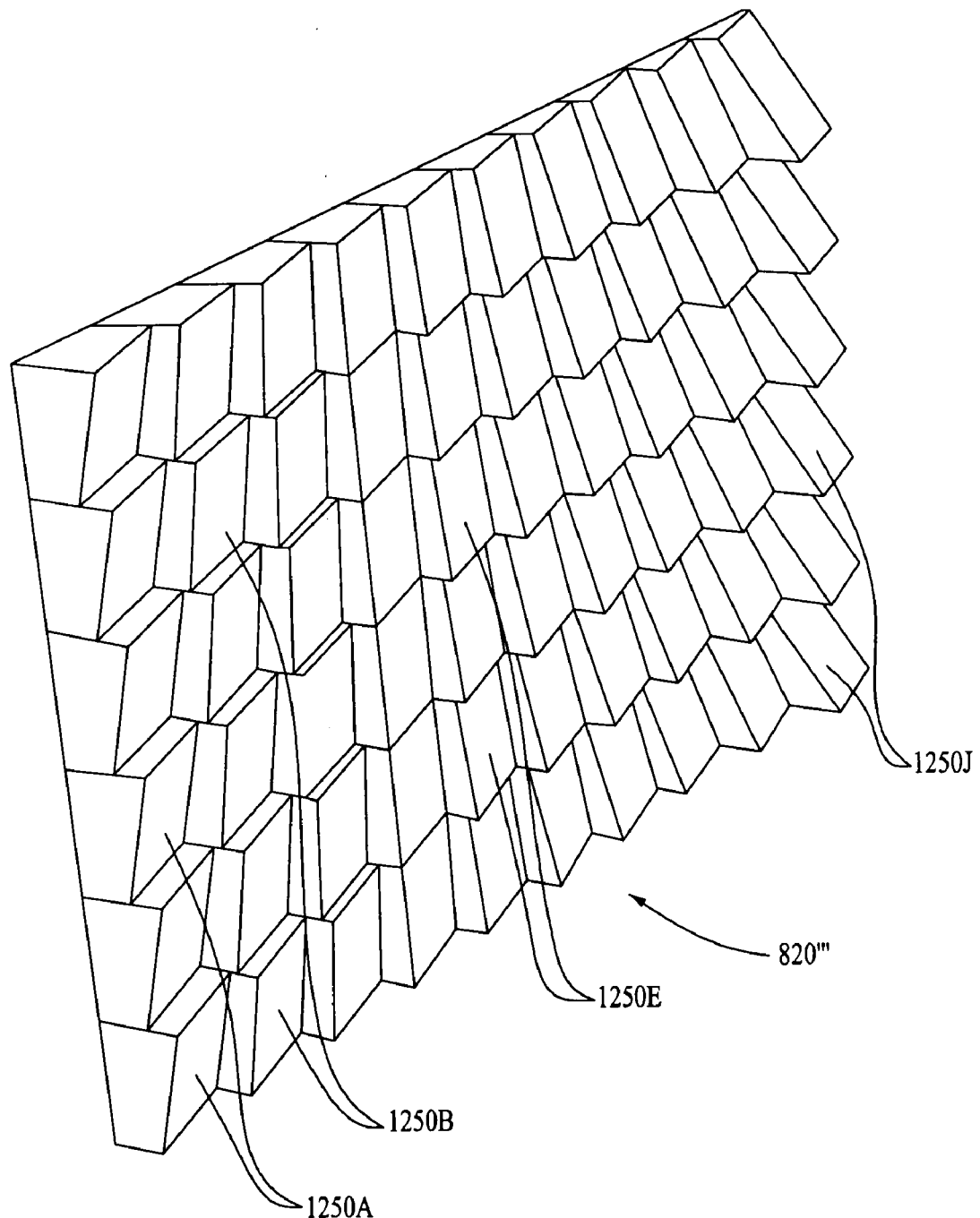

As an alternative to the flat planar redirection mirrors 820-840, it is possible to utilize Fresnel prisms instead, as generally illustrated in FIGS. 12A-12C. FIG. 12A shows three of the redirection mirrors 820, 825 and 830 on the left, and three respective alternative Fresnel prisms labeled 820', 825' and 830'. A possible disadvantage associated with the flat planar redirection mirrors 820-840 is that they can occlude each other's fields of view. For example, the right portion of the redirection mirror 825, as shown, appears in a portion of the field of view of the redirection mirror 820 above it, as well as in a portion of the field of view of the redirection mirror 830 below it. Although such occlusion or shadowing might be minimized or avoided by careful design of the redirection mirror array, the occlusion problem can be significantly mitigated by use of Fresnel prisms. As illustrated on the left side of FIG. 12A, each Fresnel prism consists of a set of smaller mirrors 1210 lined up in a row and pointing in a common direction. In other words, the larger redirection mirror 820 is broken up into many facets 1220 that are facing the same direction; those facets 1220 together constitute the Fresnel prism 820', which approximately duplicates the function of the redirection mirror 820. Similarly, the Fresnel prism 825', consisting of the facets 1225, behaves like the redirection mirror 825, and the Fresnel prism 830', consisting of the facets 1230, behaves like the redirection mirror 825. The shadowing of each section is typically negligible, and any shadowing is common from facet to facet, leading to a reduction in total efficiency but not in a shadowing of a large section of an image. Furthermore, the Fresnel mirror array is thin and can lend itself to low-cost fabrication.

FIG. 12B illustrates another alternative Fresnel prism 820''' for use in place of one of the redirection mirrors, such as, by way of example, the redirection mirror 820. Unlike the Fresnel prism 820', which is split horizontally only, the Fresnel prism 820''' is fractured horizontally and vertically into facets 1240.

It is believed that the optimum size of facets for a Fresnel prism is about half the size of the projected imager pixel at the location of the mirror array. If the facet size is greater than the projected pixel size, then some of a facet will redirect the image from several pixels with high efficiency but then a pixel with low efficiency due to the step change at the edge of the facet. If the facet size is less than the projected pixel size, then each pixel will reflect at a lower efficiency, but the efficiency will be constant across the entire array. Constant efficiency is preferred. As the prism pitch (i.e., the size of the facets) becomes even smaller, the efficiency becomes worse and diffraction effects start to occur as well. As an example, a Fresnel prism placed in the camera's field of view where the image is 25.6 mm wide, and the resolution of the imager is 1280×1024 pixels will have a projected pixel size 20 μm wide. A prism spanning one-half of a pixel would be 10 μm×10 μm. Diffractive optics manufacturers can make features smaller than that. For example, MEMS Optical, Inc., Huntsville, Ala., can make 3 μm gray scale features, and Tessera (formerly known as Digital Optics Corp.), Charlotte, N.C., can achieve binary to 64 phase levels with 0.5 μm feature sizes.

Yet another alternative Fresnel prism 820''' is illustrated in FIG. 12C. The Fresnel prism 820''' comprises a column of vertically aligned facets 1250A pointed in a first common direction, another column of vertically aligned facets 1250B pointed in a second common direction slightly offset from the first direction, and so on, as shown. Unlike the Fresnel prisms 820' and 820", the Fresnel prism 820''' rotates the field of view. A horizontal slice of an image from a camera, imaged through the Fresnel prism 820''' looks out at diagonally oriented region. The Fresnel prism 820''' performs image rotation without distortion, unlike a contiguous mirror, which would be shaped like a helix and would distort the image.

Figure 13A:
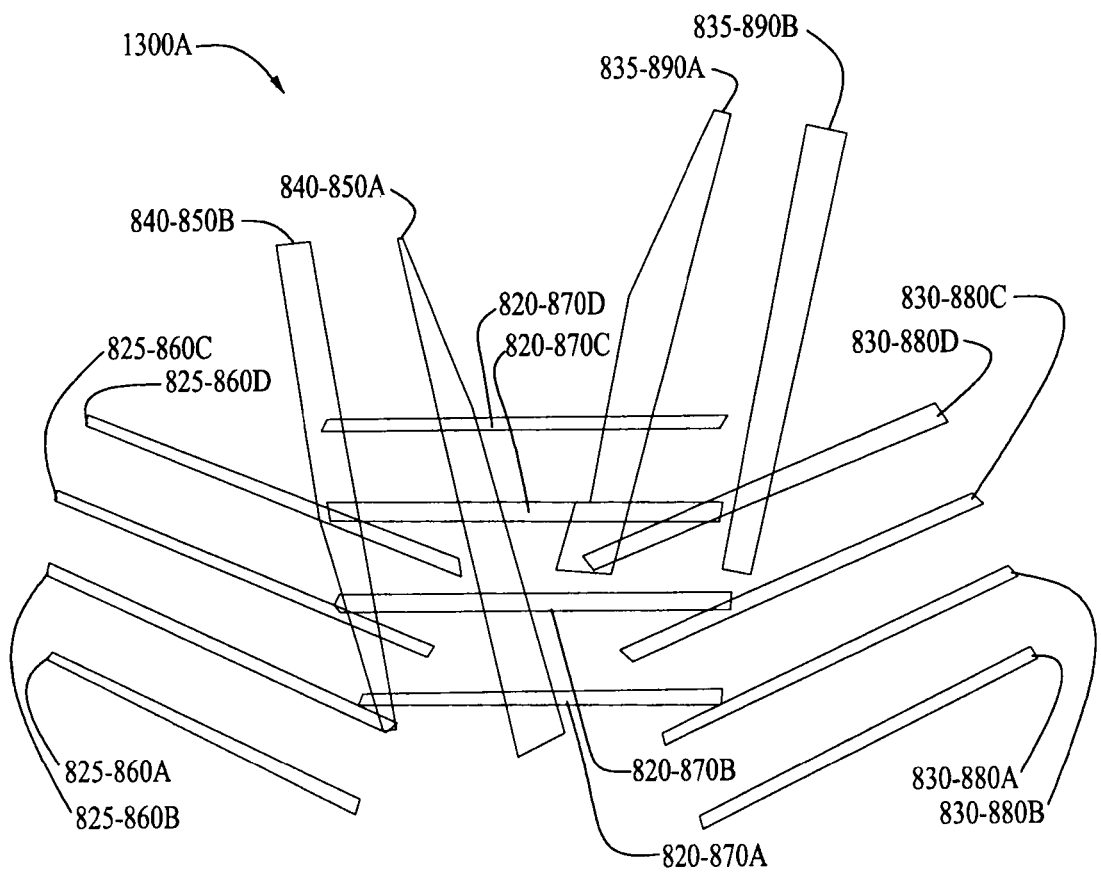
FIGS. 13A and 13B are depictions of the pseudo scan line pattern for the imager of FIGS. 8-11.
Figure 13B:
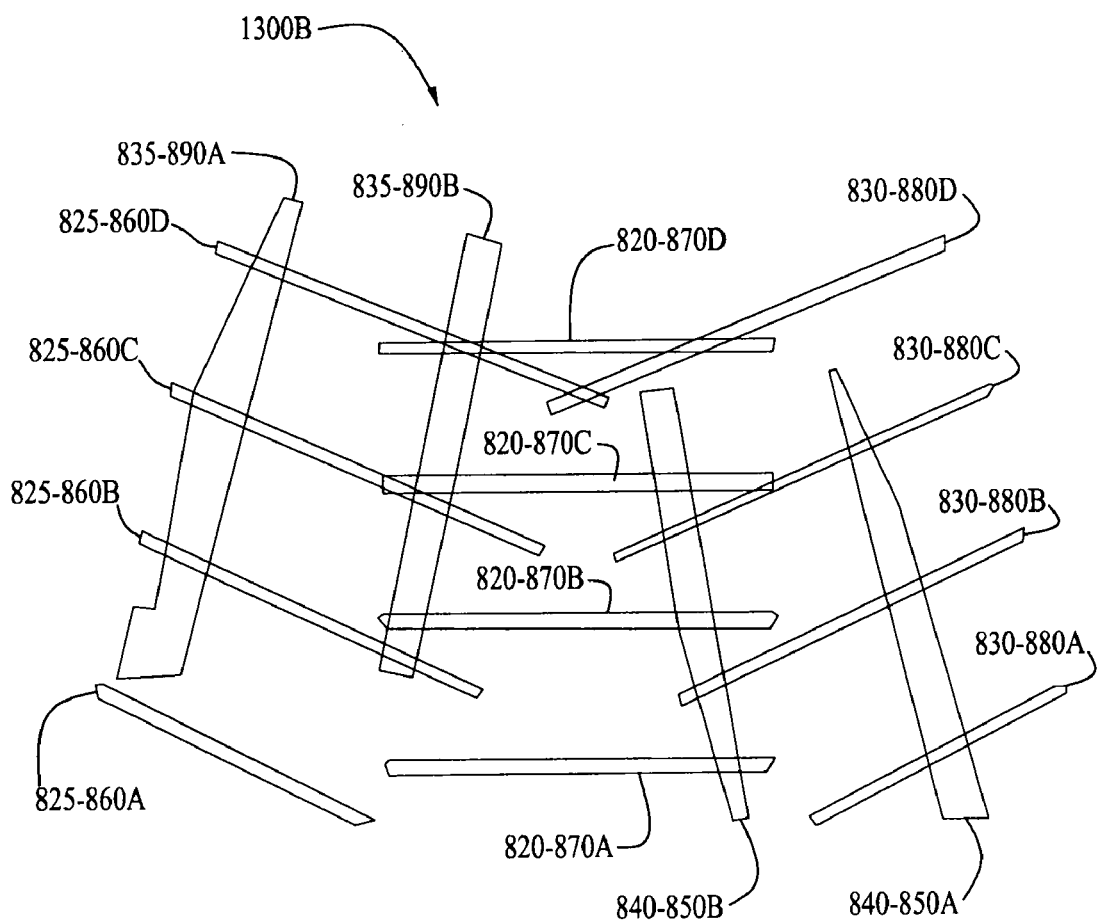

FIGS. 13A and 13B depict pseudo scan line patterns 1300A and 1300B, respectively, for the imager 800. The pseudo scan line pattern 1300A in FIG. 13A is at the window 804, while the pseudo scan line pattern 1300B in FIG. 13B is at a plane parallel to and four inches away from the window 804. Each pseudo scan line in FIGS. 13A and 13B is labeled with the sequence of mirrors for that viewing section, starting from the imager 808. For example, the pseudo scan line labeled "840-850B" is produced by redirection mirror 840 and pattern mirror 850B in series. As can be seen, the pseudo scan lines spread out from each other as the distance from the window 804 increases, due to the fact that views are taken at non-normal angles looking through the window 804. FIGS. 13A and 13B also show that the pseudo scan lines from the mirror 850 and the mirror 890 cross. This crossing is due to the fact that those two mirrors are pointed somewhat across the viewing volume from generally opposite sides of the reader.

Figure 13C:
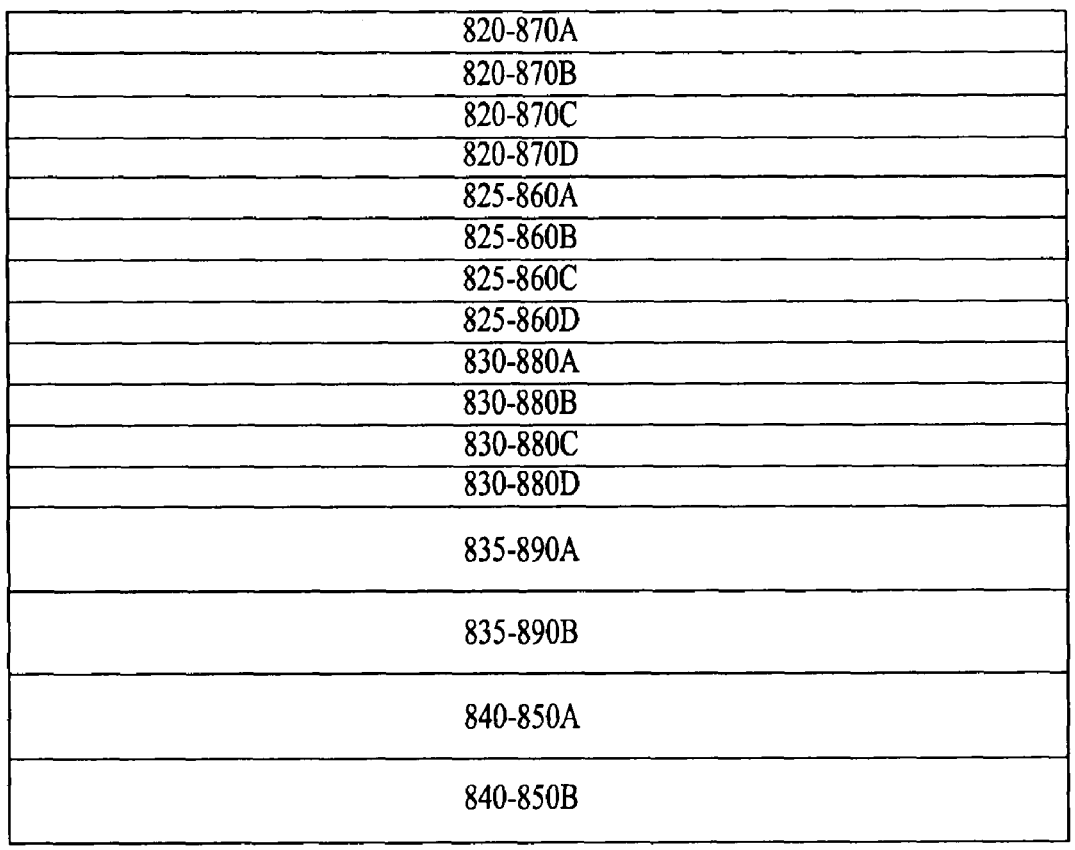
FIG. 13C is a face-on view of the face of the imager (or an image generated by the imager) of the imager-based reader of FIGS. 8-11, labeled to show the sequence of mirrors "seen" by each section of the imager.

FIG. 13C is a plan or face-on view of the imaging plane or face 400 of the imager 808, which is part of the camera 806 including the imager 808 and the lens 810 (or an image 400 generated by the camera 806). The imaging face 400 is divided into a number of strips, which in this case extend horizontally across the imaging face. Each strip in FIG. 13C is labeled with a reference number that denotes the sequence of mirrors "seen" by each section of the camera 806. For example, in the first (topmost as illustrated) strip, the camera 806 sees the redirection mirror 820 and its constituent reflections from the pattern mirror 870A in the first horizontal strip, and that strip is therefore labeled with the reference number "820-870B." The next three strips see the reflections of the pattern mirrors 870B, 870C, and 870D, respectively, in the lower three-fourths of the redirection mirror 820. Below that, in the next four strips, the camera 810 sees the redirection mirror 825 and the pattern mirrors 860A-860D therein. Below that, in the next four strips, the camera 806 sees the redirection mirror 830 and the pattern mirrors 880A-880D therein. Next, the reflections of the pattern mirrors 890A and 890B are projected via the redirection mirror 835 into the next two strips. Finally, the reflections of the pattern mirrors 850A and 850B, in that order, are redirected into the final two strips by the redirection mirror 840 on the bottom of the stack of redirection mirrors. The bottom four strips in FIG. 13C are larger in the vertical direction than the strips above them due primarily to the heights of those pattern mirrors. The distances between the lens 810 and a redirection mirror, as well as the distance between a redirection mirror and its pattern mirrors, can also affect the height of a strip on the face 400 of the imager 808.

Figure 14:
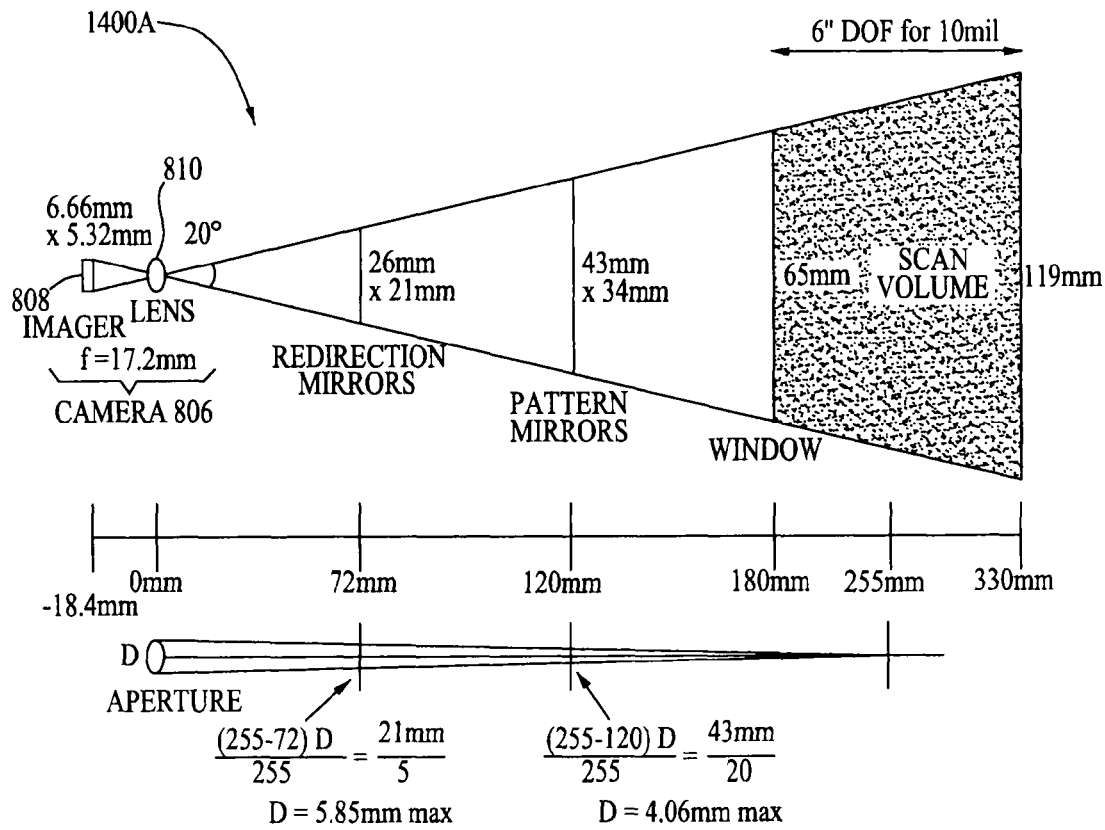
FIG. 14 is an optical track diagram for vignetting analysis, according to one embodiment.

FIG. 14 is an optical track diagram 1400 for vignetting analysis for the imager-based reader 800. As a starting point in the analysis, it can be assumed that a desired length of a horizontal pseudo-scan line (e.g., one of the pseudo-scan lines, such as 820-870A in FIG. 12B, which are analogous to one of the scan line 175D in FIG. 3) is about 2.5" (inches) or 65 mm (millimeters or 10-3 meters). Based on rough estimates for the placement of the camera's imager 808 and lens 810, the redirection mirror 820, and the set 870 of pattern mirrors for a given form factor of the enclosure 802, the total path length from the window 804 to the lens 810 by way of those mirror is approximately 7.2" or 180 mm. Using well-known trigonometric relations, that yields a 200 (degrees) full field angle. In the case in which the imager 808 has 1280 pixels×1024 pixels that are each 5.2 μm (micrometers or $10^{-6}$ meters) square, as is the case with the model MT9M001 CMOS imager, manufactured by Micron Tech., Inc., Boise, Id., the imaging area is 6.66 mm×5.32 mm. The back focal length would then be 18.4 mm to achieve this geometry. The camera's field of view on the plane of the redirection mirrors 820-840 would be 26 mm×21 mm, so the five redirection mirrors 820-840 would be 26 mm wide×4.2 mm tall each, corresponding to about 3.20 each. If tilted, a redirection mirror could be wider. Because having the redirection mirrors somewhat wider than needed is generally not problematic, the pattern mirrors can all be made the same approximate dimensions for simplicity. The pattern mirrors, in this case, can be made in sets of 4 narrow mirrors of approximate size of 43 mm×1.7 mm.

The lens 810 can be designed for maximum collection and for a 6" (or 150 mm) depth of field for 10 mil labels (i.e., the unit width being 10 mils or 10 thousandths of an inch) starting at a near field distance at the window 804, which is 180 mm from the lens 810. The lens 810 may be sharply focused or not (e.g., having spherical, chromatic or other aberration). Assuming a focus position at about 3" from the window (255 mm from the lens 810), the thin lens equation yields a 17.2 mm focal length for those conjugates (255 mm and 18.4 mm). This configuration is shown graphically in FIG. 14, including a first order vignetting analysis, which reveals that the limiting aperture is at the pattern mirror plane. A 4 mm lens aperture is approximately the maximum size that avoids vignetting, which is f/4.3, under the assumptions made herein. Different assumptions can alter the analysis and its results. A desirable range for the lens aperture (not considering vignetting) is between about f/4 and about f/8 in order to achieve the desired depth of field. One suitable lens that is commercially available is a model UKA227 lens, available from Universe Kogaku America, Oyster Bay, N.Y., having a focal length of f=17.65 mm and an aperture diameter of 3.16 mm, yielding an f-number of f/6 at the image conjugates to achieve the proper focus (19 mm and 250 mm). Better modulation can be achieved with an f/8 system (lens aperture being 2.375 mm), which also reduces vignetting effects but reduces the collected signal.

The reader 800 is just one example, having five redirection mirrors and four or two pattern mirrors per pattern mirror set, with each image section generated by reflection off two mirrors. In the reader 800, the five redirection mirrors 820-840 segment the imager's field of view into five orientations. The pattern mirrors 850-890 further segment the imager's field of view into two or four different orientations in an orthogonal direction for each redirection mirror. There are many different mirror arrangements that may achieve useful results. The imager's field of view can be segmented into fewer or more segments, as appropriate. Each segment may be created by a single mirror, or by multiple mirrors, or even no mirror at all (such as a gap between mirrors). Mirrors may reflect multiple segments, as shown with the redirection mirrors 820-840, or the entire field of view (as needed to make a more compact unit), or may reflect a single segment, such as mirrors the pattern mirrors 850-890. The reader 800 shows the redirection mirrors 820-840 directing the segments generally left and right of the imager's viewing direction. Alternatively, the mirrors could direct the segments generally up and down from the imager's viewing direction, perhaps preventing occlusion of other image segments. One could say that each redirection mirror corresponds to one viewing angle into the viewing volume, whereas each pattern mirror within a set produces a different, offset pseudo-scan line into the viewing volume at, about or near that viewing angle. In other words, each redirection mirror corresponds to a gross or large-scale viewing angle into the viewing volume, while the different pattern mirrors generally cause a divergence of a multitude of pseudo-scan lines from roughly the same gross viewing angle. The slightly different orientations of the pattern mirrors within a set causes some difference in viewing angle into the viewing volume. Regardless of those differences (which may or may not be negligible in a given design), the number of redirection mirrors may be more or less depending upon how many different gross viewing angles into the viewing volume are desired. Moreover, the number of pattern mirrors within a set can be varied to provide a desired number of pseudo-scan lines for a given gross viewing/imaging angle. Finally, the optical path from the viewing volume to the imager may contain additional intermediate mirrors, only a single mirror, or even no mirrors.

The reader 800 is also just one example of the physical layout of an imager-based reader. Other placements of the components are possible.

III. Illumination

This subsection describes one example of an illumination capability that can optionally be added to a multi-perspective imager-based reader. The example described in this subsection builds on the example imager 800 described in the previous subsection.

In some applications ambient light can be sufficient for imaging. In other applications, additional illumination can be added to enhance imaging and/or decoding performance. The wavelength or frequency of the induced illumination may be visible or non-visible and may be monochromatic, bi-chromatic, or polychromatic. For example, the dual-frequency illumination technique taught in U.S. Pat. No. 7,224,540, hereby incorporated by reference in its entirety, can be utilized with the imager-based readers disclosed herein. Added or artificial illumination can have various directionality properties. For example, added illumination may be broad-field into all or a substantial portion of the viewing volume or focused into some subset of the entire viewing volume, such as only the pseudo scan line regions where views are taken or specific row lines therein. It may be desirable to synchronize the timing of the added illumination with the imager, so that the illumination is strobed at approximately the same time as when the pertinent pixels of the imager are exposing. In the case of a global-reset imager, the entire viewing volume or all pseudo scan line regions can be illuminated together when the imager is exposing. In the case of a rolling-reset imager, illumination can be flashed into or in the vicinity of only those portions of the viewing volume from which a view is being directed into the particular portion of the imager being exposed at the time of the flash.

Figure 15:
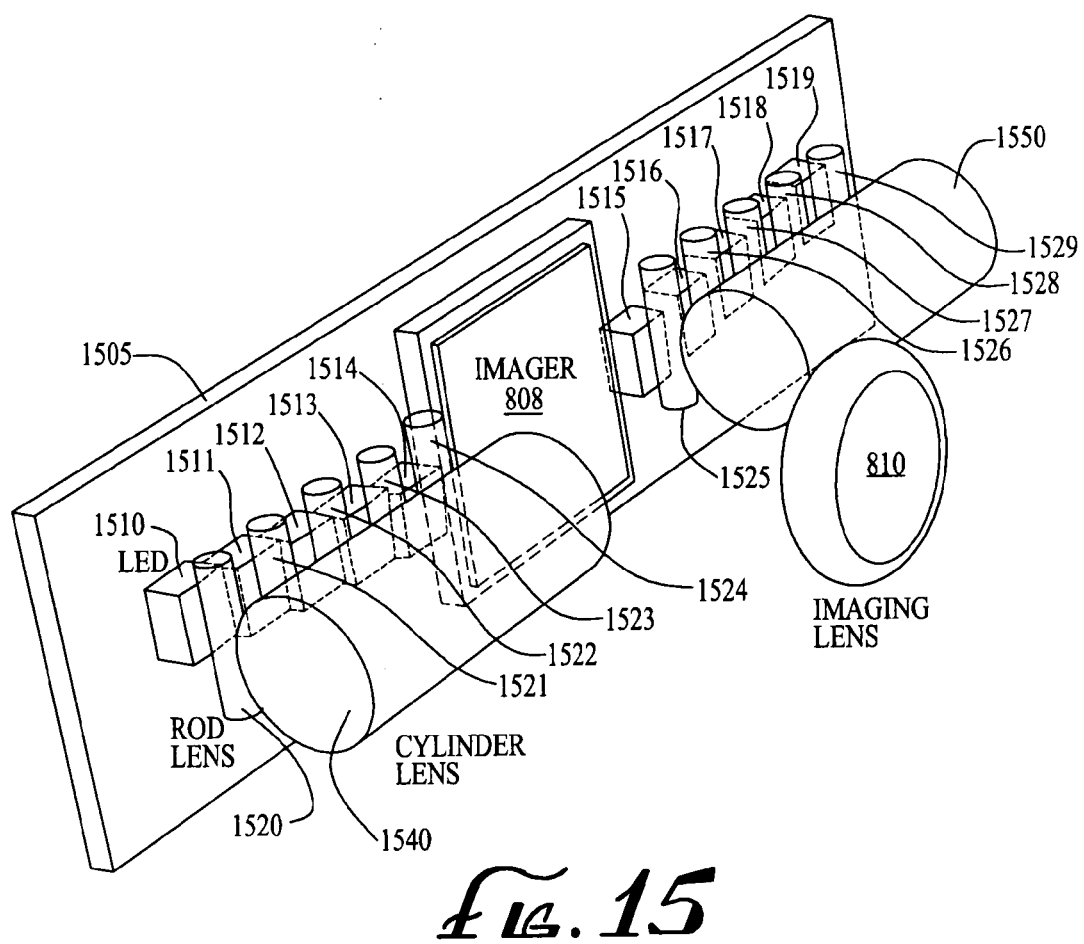
FIG. 15 is an isometric view of imaging and illumination components, according to one embodiment.
Figure 16:
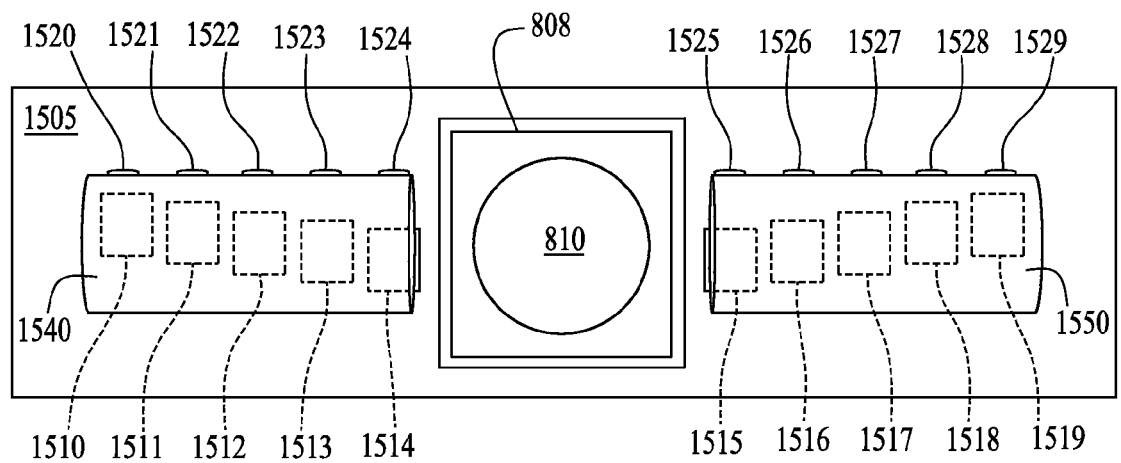
FIG. 16 is a face-on front view of the imaging and illumination components shown in FIG. 15.

FIG. 15 is an isometric view of one arrangement of imaging and illumination components, according to one embodiment, and FIG. 16 is a face-on side view of the same components. Those components include a backplane 1505, which may be a circuit board. Attached to the circuit board 1505 is the imager 808 and a number of light sources. In this example, the light sources are LEDs (light emitting diodes) 1510-1519, five of which are flanked on each side of the imager 808. The LEDs 1510-1519 are staggered vertically as shown for reasons discussed below. In front of each LED 1510-1519 is a rod lens 1520-1529, and in front of each group of rod lenses 1510-1514 and 1515-1519 is a cylinder lens 1540 and 1550, respectively. Any suitable type of LED can be used for the LEDs 1510-1519; one suitable type of LED is the model LR G6SP available from OSRAM Opto Semiconductors GmbH, Regensburg, Germany.

An ideal rod-shaped or cylindrical lens focuses light into a line, or equivalently magnifies a points source into a strip in the direction of the rod or cylinder's axis. Because the LEDs 1510-1519 are lensless, each LED emits light generally omni-directionally in the hemisphere into which it is facing. Each of the rod lenses 1520-1529 focuses its LED's light into a column-like strip along the length of the rod 1520-1529. The LEDs are staggered vertically along the rod's axes to match the different sections of the redirection mirror set. The cylinder lenses 1540 and 1550 each provide magnification in the direction transverse to their axes (vertically as shown in FIGS. 15-16) to provide the desired field-of-view divergence. The cylinder lenses 1540 and 1550 may also alter the illumination pattern to be more generally horizontally strip-shaped, so as to better match the shape of the redirection mirrors or the pertinent part of which where image data of interest is found (e.g., where a virtual scan line is taken). The length of the rods 1520-1529 and the size and shape of the cylinder lenses 1540 and 1550 can cooperate so that the illumination light from each LED approximately matches the height of the redirection mirror to which it is directed at that particular distance from the rods. Taking, for example, the LED 1510, the rod lens 1520, and the cylinder lens 1540, the rod and cylinder lenses act as a cross cylinder arrangement, also known as an anamorphic lens system. The rod lens 1520 sets the horizontal magnification of the LED 1510. The cylinder lens 1540 sets the vertical magnification of the LED 1510. Both lenses are focused to approximately the far field distance of the imaging device, in order to provide a reasonably crisp image of the LED emitter, in order to maximize illumination intensity. The image of the LED emitter 1510 will be rectangular, due to the different magnification of the rod lens 1520 and the cylinder lens 1540. The LEDs 1510-1519 are preferably turned on in pairs to illuminate fields of view corresponding to one of the redirection mirrors 820-840. The height of the LED image is set to correspond to the height of the field of view of the imager through one redirection mirror. The width of the LED image is set to approximately half of the width of the field of view of the imager, so that the pair of LEDs will illuminate the entire width of the field of view. The LEDs 1514 and 1515 illuminate the field of view of the redirection mirror 820, and the LEDs 1513 and 1516 illuminate the redirection mirror 825. Similarly, the LEDs 1512 and 1517 illuminate the redirection mirror 830, the LEDs 1511 and 1518 illuminate the redirection mirror 835, and the LEDs 1510 and 1519 illuminate the redirection mirror 840. The offset of the LEDs in vertical and horizontal position (as shown in FIG. 16) allow the image of the LED to illuminate the proper portion of the field of view, and thus aim the illumination to the proper location. Different arrangements of LEDs and assignment of LEDs to different fields of view of the imager are possible and may lead to increased efficiency.

Figure 17:
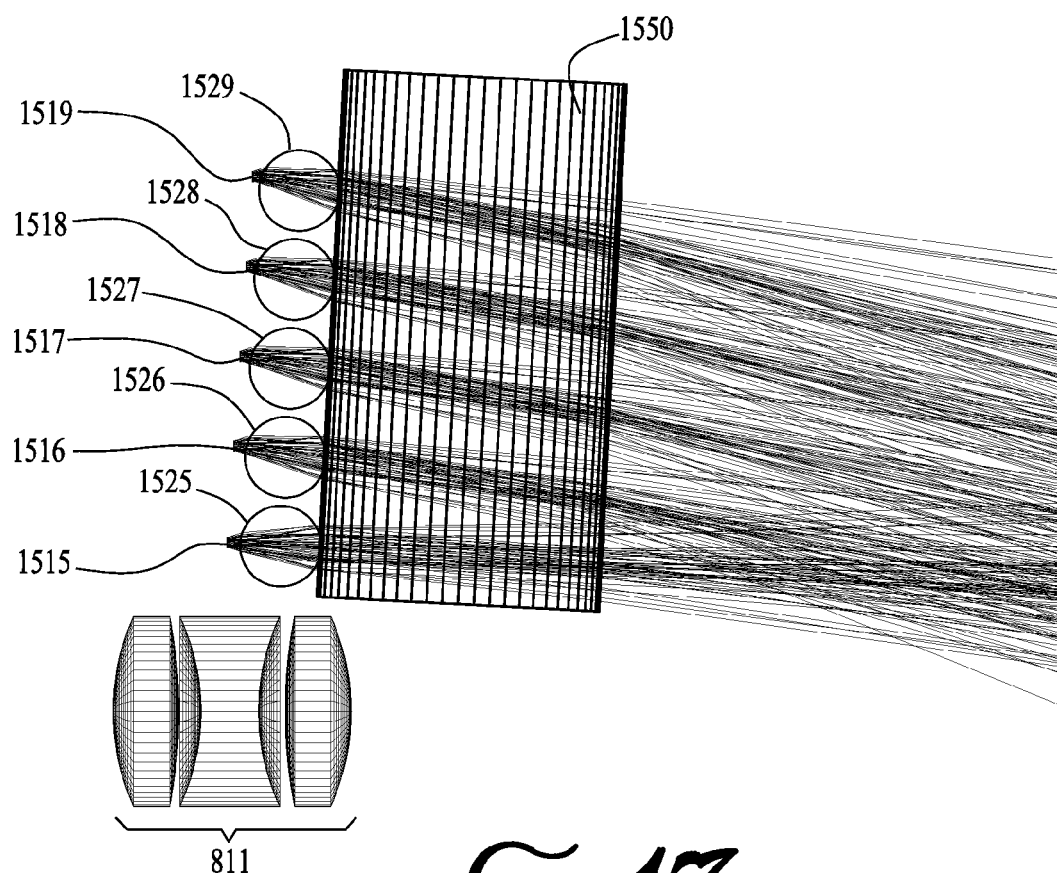
FIG. 17 is a top view ray trace diagram of the imaging components and one side of the illumination components shown in FIGS. 15-16.

FIG. 17 is a top view ray-trace diagram of one set of rod lenses 1525-1529 and a cylinder lens 1550, according to one embodiment. In this embodiment, unlike the embodiments illustrated in FIGS. 5-6, 8-11 and 14-16, the imaging lens is a multi-piece lens assembly 811 positioned toward the imager 808, but the exit aperture of the lens assembly (not shown) is generally near the axis of the cylinder lens 1550. FIG. 17 illustrates how the light from each of the LEDs 1515-1519 is focused through its respective rod lens 1525-1529 and the cylinder lens 1550.

Depending on the spatial and optical design, an LED on one side of the imager 808 may illuminate a portion of (e.g., the left or right half) of a redirection mirror (e.g., the LED 1515 illuminates the left side of the redirection mirror 540 or 840), while the LED 1514 illuminates another portion of the same redirection mirror (e.g., the right side of the redirection mirror 540 or 840, as viewed from the direction from which the redirection mirror is illuminated). Alternatively, both LEDs in each pair straddling the imager 808 for a given redirection mirror may illuminate the entire width of their redirection mirror or may illuminate the field of view on the opposite side from where the LED is located.

The LEDs need not be staggered in the symmetrical pattern shown in FIGS. 15 and 16. For example, in an alternative embodiment, the staggering may be monotonically downward as the distance from the imager increases, or varied in some non-monotonic way. Moreover, the placement of LEDs need not be symmetrical about the imager, as shown. Tabulated below are useful assignments of LEDs to redirection mirrors:

| Redirection Mirror | LED Assn. 1 | LED Assn. 2 |
| --- | --- | --- |
| 520 | 1513, 1516 | 1512, 1517 |
| 525 | 1510, 1519 | 1511, 1518 |
| 530 | 1514, 1515 | 1514, 1515 |
| 535 | 1511, 1518 | 1513, 1519 |
| 540 | 1512, 1517 | 1510, 1516 |

In one version, adjustability of the LEDs and lenses can be provided. For example the LEDs 1510-1519 can affixed (e.g., by gluing or adhesive means) to their respective rod lenses 1520-1529, and the rod lenses 1520-1529 can be rotated (e.g., by screws attached to the tops or bottoms of the rods, or by other means) to provide a mechanism to adjust the direction in which the LED illumination is pointed. Variations in point direction can be seen, for example, from the top-view perspective of FIG. 17. Additionally, adjustability by way of vertically translating the rods up or down can be provided. To facilitate movement of the rods and LED, the LEDs are not physically mounted on a circuit board but only electrically connected via its leads. Adjustability, such as these types of adjustability, can be useful in aligning the components for proper operation, especially in a prototype device. In production devices, such adjustability may not be necessary or desirable, although that may not always hold true.

The rod lenses 1520-29 and the cylinder lenses 1540 and 1550 constitute just one example of lenses for the LEDs 1511-1519. In general, any suitable lens that shapes, focuses and/or magnifies an LED's illumination pattern as desired (e.g., to match a particular redirection mirror, a particular pattern mirror, or a particular portion therein, such as narrow slits corresponding to the particular lines read out from the imager) may be used in this example version of an imager-based reader with illumination capability. Other versions of an imager-based reader, of course, may have different illumination focusing needs. Another design may include an array of LED emitters, bonded onto a common substrate, with a lens array affixed above the LED emitters. The lens array can be a molded part, made, for example, of acrylic or polycarbonate plastic. The LED emitter and lens array can be designed so that no further alignment is necessary.

Figure 18:
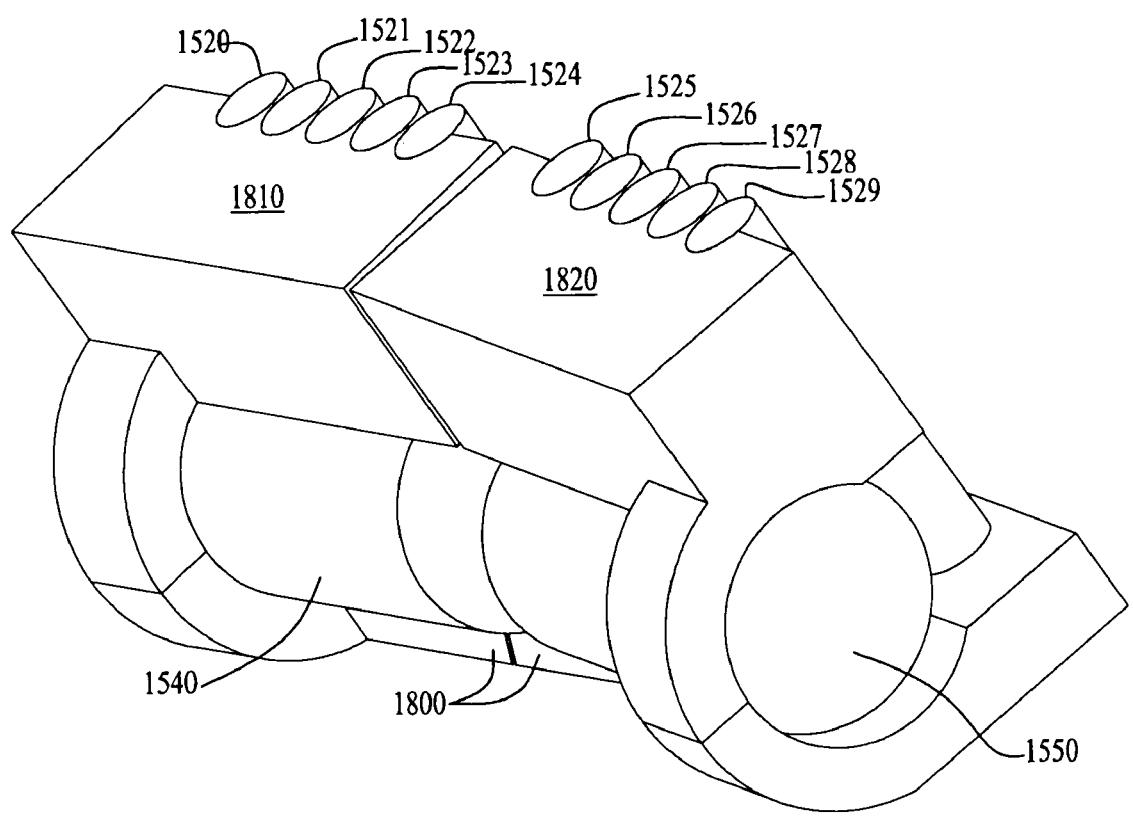
FIG. 18 is an isometric view of the illumination components of FIGS. 15-17 in a mount.

FIG. 18 is an isometric view of the rod lenses 1520-1529 and the cylinder lenses 1540 and 1550 in one example of a lens mount 1800. The lens mount 1800 may comprise two half-side lens mount members 1810 and 1820, which may be separate pieces, separable, or integrally formed with one another. The mount 1800 provides spaces for holding the cylinder lenses 1540 and 1550 in place and may provide the ability to move the cylinder lenses 1540 and 1550 back and forth for adjustments. Similarly, the mount 1800 provides spaces for holding the rod lenses 1520-1529 and may provide freedom to rotate the rods and/or translate the rods up and down.

Figure 19:
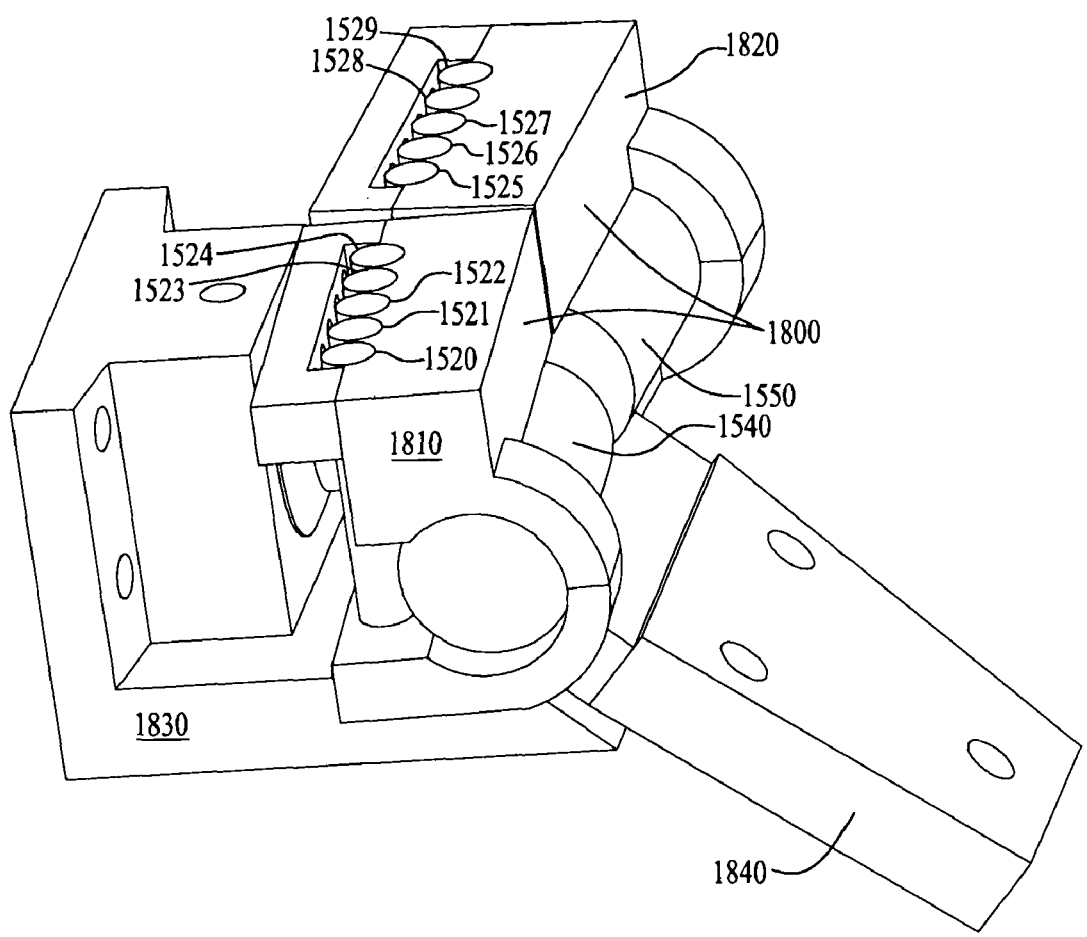
FIG. 19 is an isometric view of the imaging and illumination components of FIGS. 15-17 in mounts.
Figure 20:
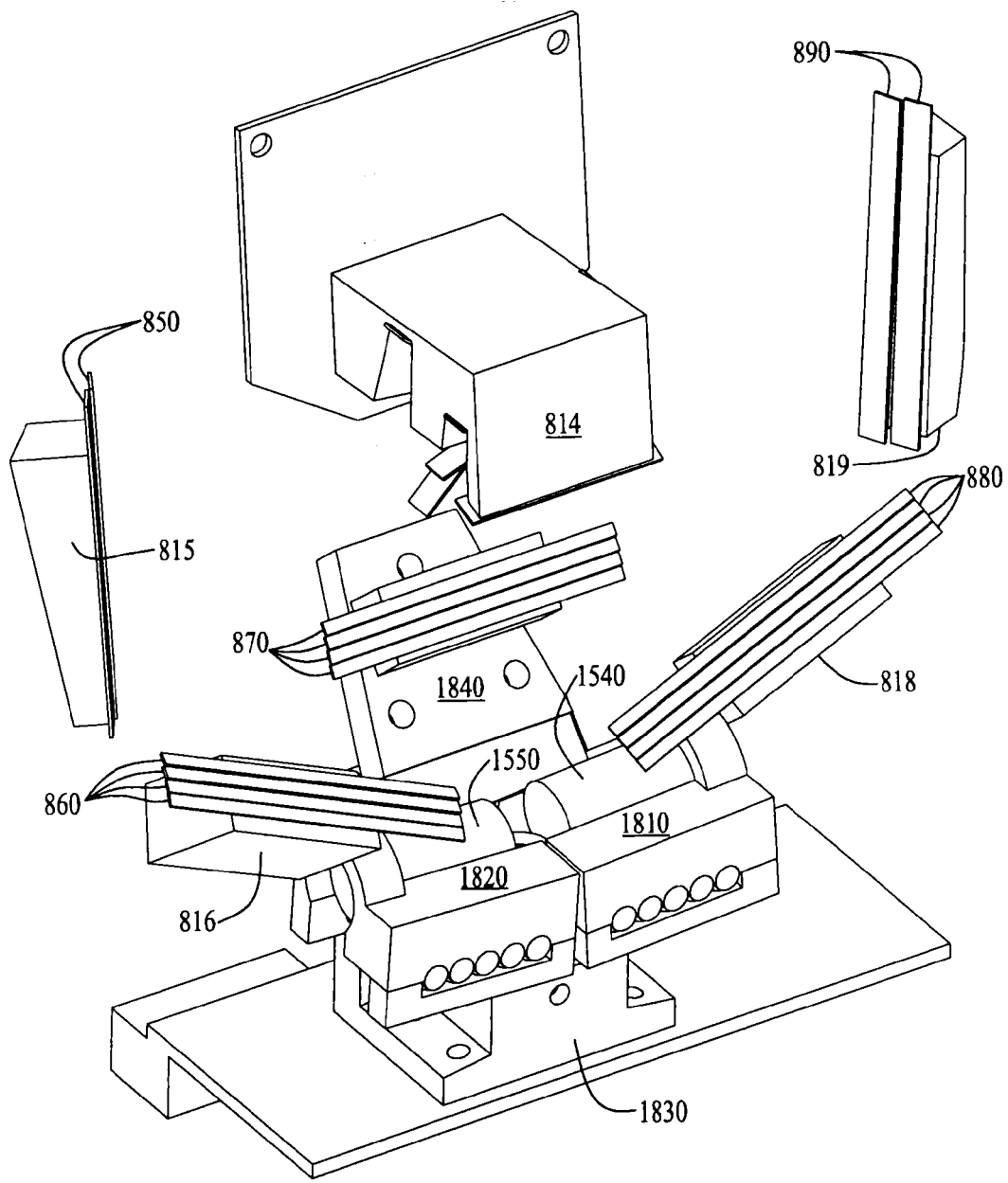
FIG. 20 is an isometric view of internal parts of a imager-based reader with illumination, according to one embodiment.
Figure 21:
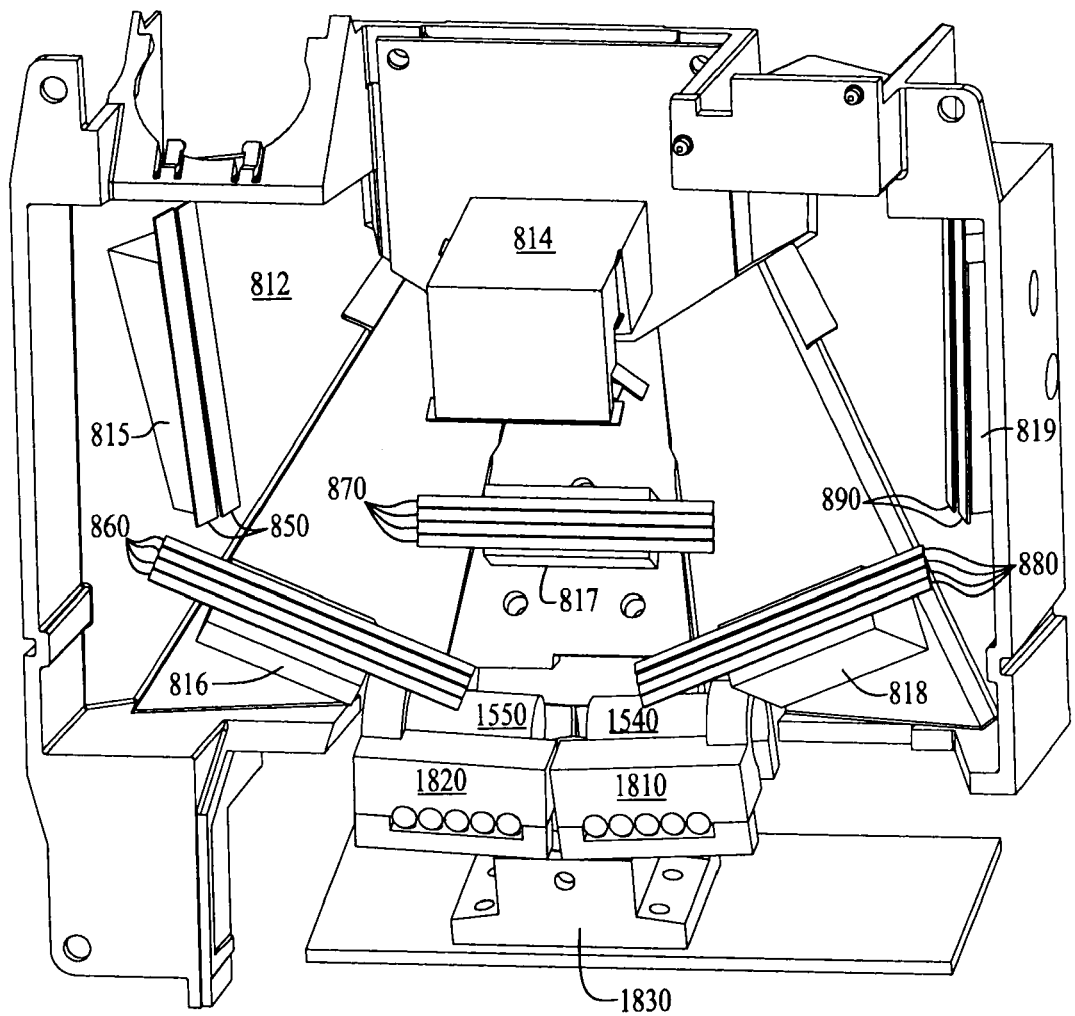
FIG. 21 is another isometric view of internal parts of the imager-based reader of FIG. 20 additionally showing a basket.
Figure 22:
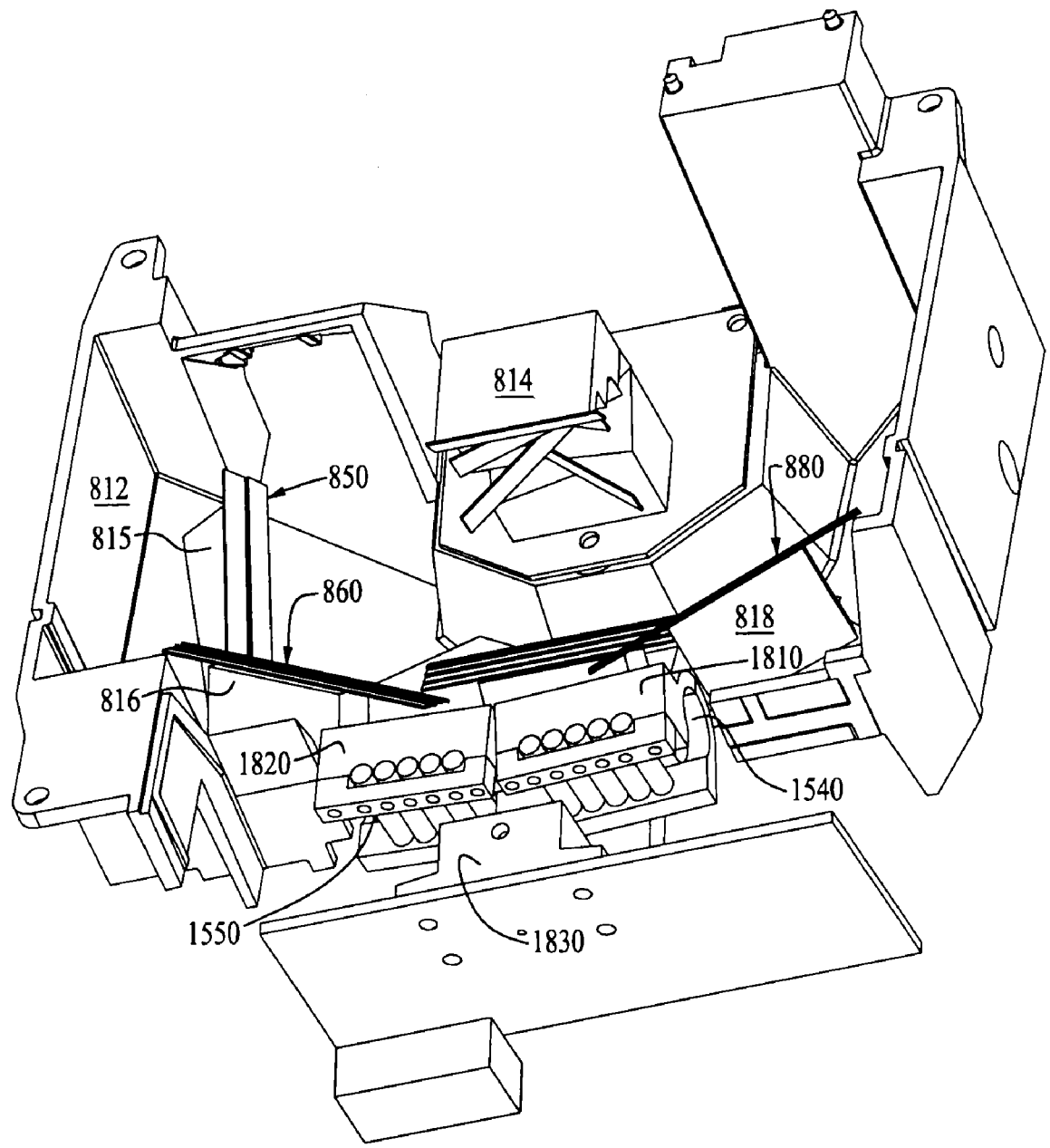
FIG. 22 is a an isometric view of the imager-based reader of FIG. 21 from a different perspective.
Figure 23:
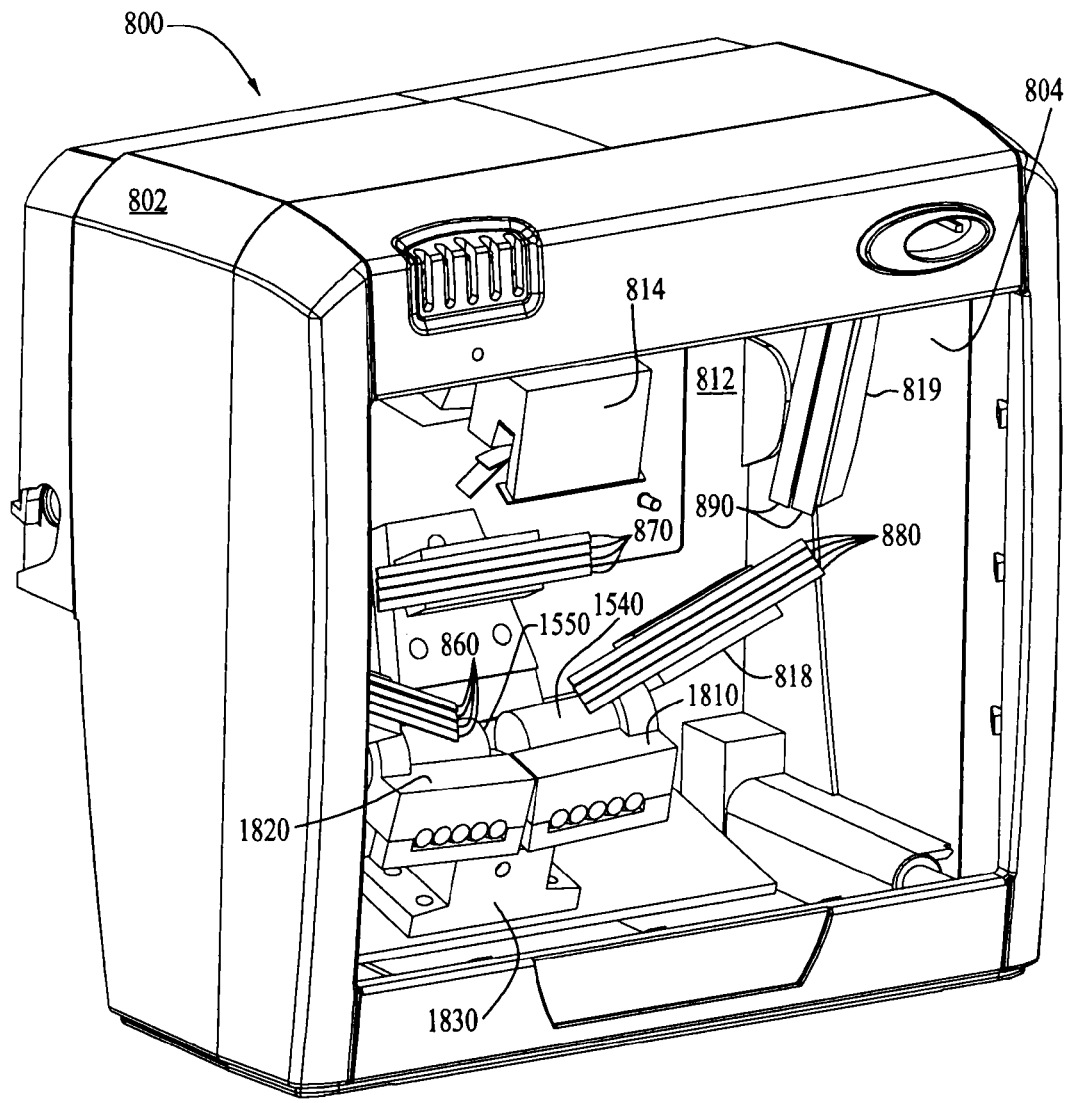
FIG. 23 is an isometric view of the imager-based reader of FIGS. 20-22 additionally showing an enclosure.

FIG. 19 is an isometric view of the lens mount 1800 along with a camera mount 1830 and a basket connector mount 1840, according to one embodiment. The camera mount 1830 holds the lens 810 and/or lens assembly constituting the same. The camera mount 1830 may also be configured to hold the imager 808 on or near is left side, as depicted in FIG. 19. The camera mount 1830 preferably connects to the lens mount 1800 directly or indirectly so as to hold the illumination lenses in a desired position relative to the camera. The basket connector mount 1840 can be used to connect the lens mount 1800 and/or the camera mount 1830 to basket or other part of the reader's frame, chassis, or enclosure.

FIGS. 20-23 are various isometric view of internal parts of a imager-based reader with illumination capability, according to one example. This example is like the reader shown illustrated in FIGS. 8-11 but with the addition of illumination components and their supporting mounts. The progression of drawings from FIG. 20 to FIG. 23 successively depicts additional components, to clearly illustrate the construction of a multi-perspective composite-imaging reader with illumination.

Figure 24:
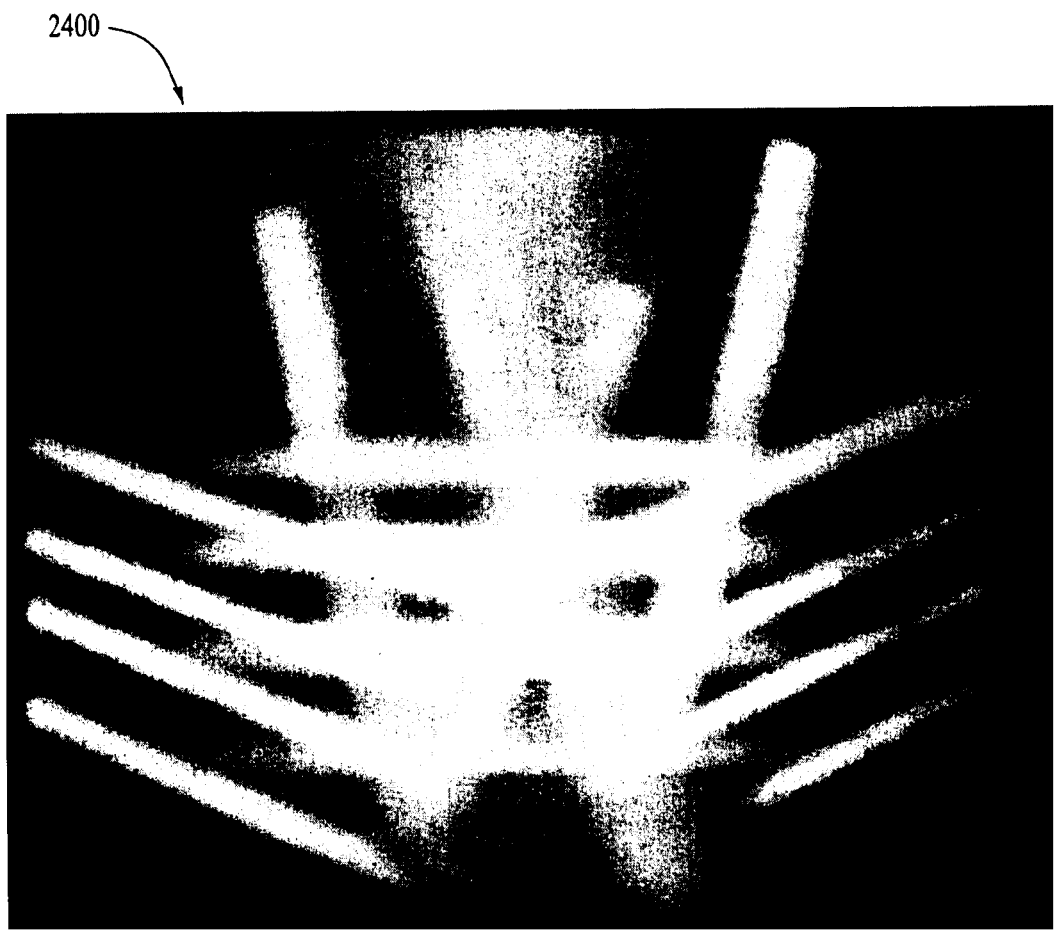
FIG. 24 is a depiction of the pseudo scan line pattern for the imager of FIGS. 20-23.

FIG. 24 is a depiction of a pseudo scan line illumination pattern 2400 for the imager of FIGS. 20-23. In this figure, the pseudo scan line strips can be seen by virtue of their associated illumination. That is, an illumination pattern is illustrated. Because the illumination pattern 2400 in this example is generated using the same mirrors as the imaging, and because the illumination source is approximately collocated with the imager (or displaced in a way that can be compensated), the illumination pattern 2400 approximately matches the imaging pattern. This class of illumination-enabled imager-based readers utilizes the same mirror or mirrors both to direct the scene-to-be-imaged into the imager and to direct illumination onto the scene.

Although the light source(s) is conveniently provided from or near the same point of view as the camera used for imaging, as illustrated in FIGS. 15-24, the light source(s) may be located elsewhere. For example, other possible locations for light sources include at or near the redirection mirrors 820-840 and pointed at the pattern mirrors, or at or near the pattern mirrors and pointed in the directions they face. In the case in which the illumination sources are located near the camera, the illumination sources may be located and arranged differently from the arrangement shown in FIGS. 15-24. Other example arrangements include aligned vertically rather than horizontally and surrounding the camera.

Figure 25:
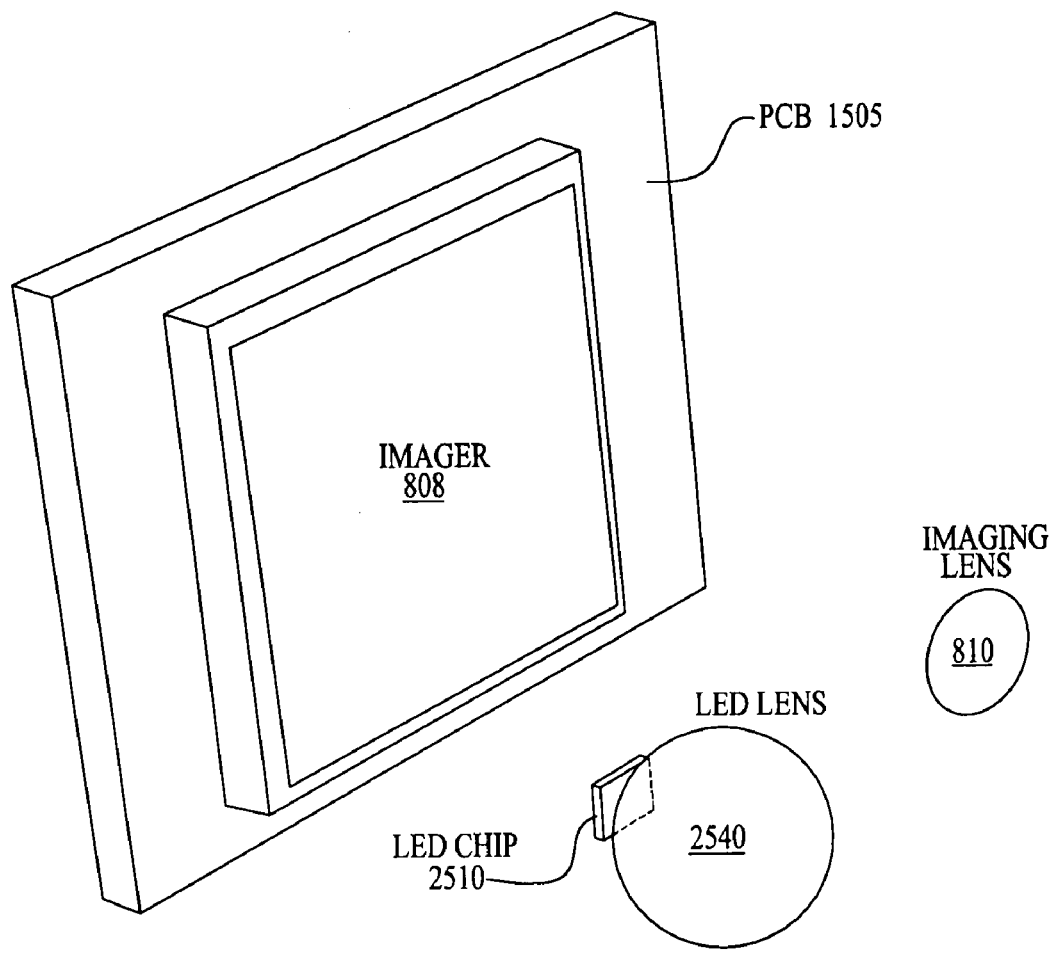
FIG. 25 is an isometric view of a camera and illumination source according to one embodiment.

Illumination efficiency may be enhanced by using an LED or other light source with the same form factor as the target illumination zone. A custom LED chip may provide the desired form factor. One example of a custom LED chip 2510 and LED lens 2540, along with the imager 808 and the lens 810, is illustrated in FIG. 25. The LED lens 2540 may be a high numerical aperture ball lens, for example. The LED lens 2540 may be a separate piece or integrated with the LED chip 2510. One alternative arrangement is to have two identical custom LED chips on opposite sides of the imager 808. The LED lens 2540 is in the same plane as the imaging lens 810 according to this example.

The custom LED chip 2510 may be divided into a number of different sections. According to one arrangement, there is one section per redirection mirror. For example, with reference to the redirection mirrors 820-840, there would be five sections of the LED chip 2510, and those five sections can be activated one at a time in a repeating sequence. According to another arrangement, there is one section per pseudo scan line. For example, there would be one section per pattern mirror or per image strip in FIG. 13C. The height of the illumination zone may be the entire height of a pattern mirror or a shorter height directed at the area corresponding to the particular line or lines readout from the imager 808 within each strip.

Figure 26:
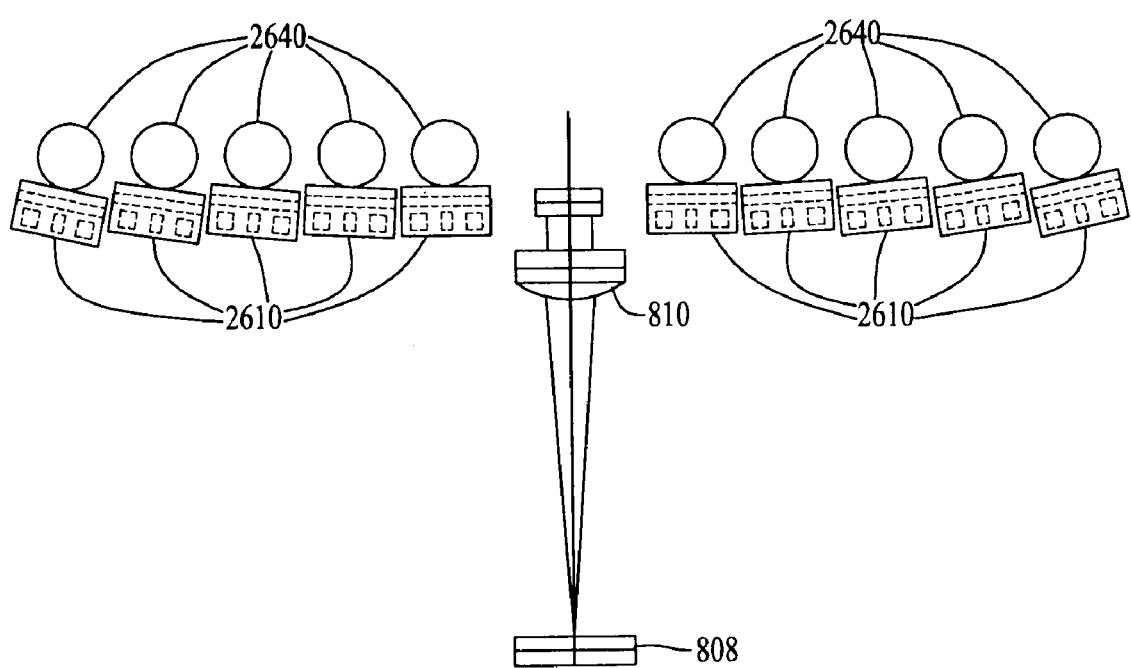
FIG. 26 is a plan view of a camera and illumination source according to one embodiment.

Simplified illumination approaches can be taken if a global-reset imager is used in place of a rolling-reset imager as the imager 808. One example of a global-reset imager is the Micron® MT9V022 WVGA imager. Because of the different form factor of that imager, compared to the MT9M001 imager, four zones and thus four redirection mirrors conveniently are accommodated. Redirection mirrors having a height of 3.3 mm and pattern mirrors having a height of 1.4 mm can be used. A Computar® 12 mm lens with an f/6 aperture achieves a satisfactory depth of field and field width as the imaging lens 810. Illumination of the entire field of view can be provided using one or more LEDs with 2.5 mm ball lenses. The number of LEDs can be selected to provide an adequate illumination level. For example, ten LEDs 2610, such as OSRAM® LRG6SP LEDs, can be used, as shown in FIG. 26, each with a ball lens 2640. The LEDs 2610 can be set at different rotations—offset by 900, 1800, and 2700 so that any obscuration effects of the LED's contact or due to other geometry-dependent causes are distributed among the four corners of the illumination zone.

IV. Electronics and Image Processing

Figure 27:
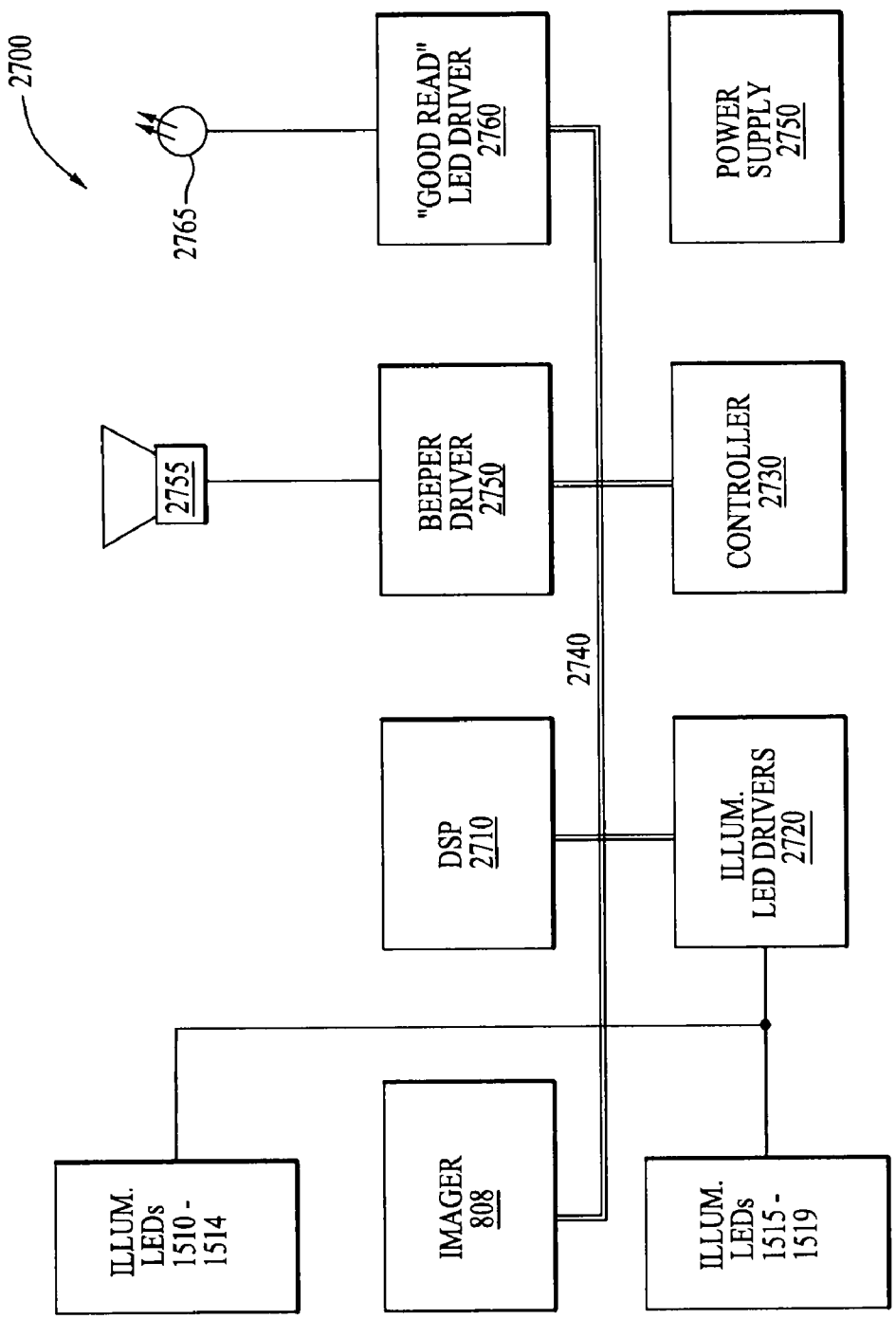
FIG. 27 is a block diagram of an electrical hardware subsystem according to one embodiment.

FIG. 27 is a block diagram of one example of an electronic hardware system 2700 that can be used according to one embodiment. The electronic hardware system 2700 includes the imager 808 described above or other camera, and optionally the illumination LEDs 1520-29 or other light source(s). For convenience, the electronic hardware system 2700 will be described with reference to the imager 808 and the illumination LEDs 1510-19, but it should be understood that other camera devices or light sources can be employed. The electronic hardware system 2700 also comprises a DSP (digital signal processor) 2710 and illumination LED drivers 2720. The DSP 2710 may be, for example, a true DSP architecture, such as the Blackfin® processor family from Analog Devices, Norwood, Mass., or a microcontroller, such as the high speed ARM® processor family from ARM Ltd., Cambridge, United Kingdom. The DSP 2710 is interfaced to the imager 808 in such a way as to read image data from the imager. Briefly stated, the DSP 2710 processes the image data so as to attempt to decode a readable bar code image in any one the imager's sections. The DSP 2710 may additionally or alternatively perform or facilitate other functions, such as recording frames of imager data for later analysis or testing. Additional details of image processing and decoding are described below. The illumination LED drivers 2720 apply signals to the illumination LEDs 1510-19 to strobe the LEDs at desired times or to light the LEDs constantly for a period of time. Additional details of illumination timing will be described below.

The DSP 2710 and the illumination LED drivers 2720 connect to a controller 2730, which may be, for example, a processor, microprocessor, controller, microcontroller, or the like. The connection may be via a bus 2740 or other communication mechanism, such as direct connections of a serial, parallel, or other type. The controller 2730 generally controls and coordinates the operation of other devices to which it is connected, including one or more of the imager 808, the DSP 2710, the illumination LED drivers 2720, a beeper driver 2750, and a "good read" LED driver 2760. The beeper driver 2750 may optionally be included to drive a beeper 2755 (or buzzer, speaker, or other audible indicator) to produce an audible "beep" or other indication when an optical code is successfully read, and/or the good-read LED driver 2760 may optionally be included to drive an LED 2765 or other visual indicator when a code has been successfully read. Other devices or subsystems not shown, such as a cash register or electronic scale, may also be connected to the controller 2730. Moreover, the DSP 2710, the controller 2730 and/or the bus 2740 may interface with other controllers or computers, such as a cash register system or check-out terminal.

The electrical hardware system 2700 also includes one or more power supplies 2770, which provide electrical power to the various components of the system 2700 via power connections not shown.

Figure 28:
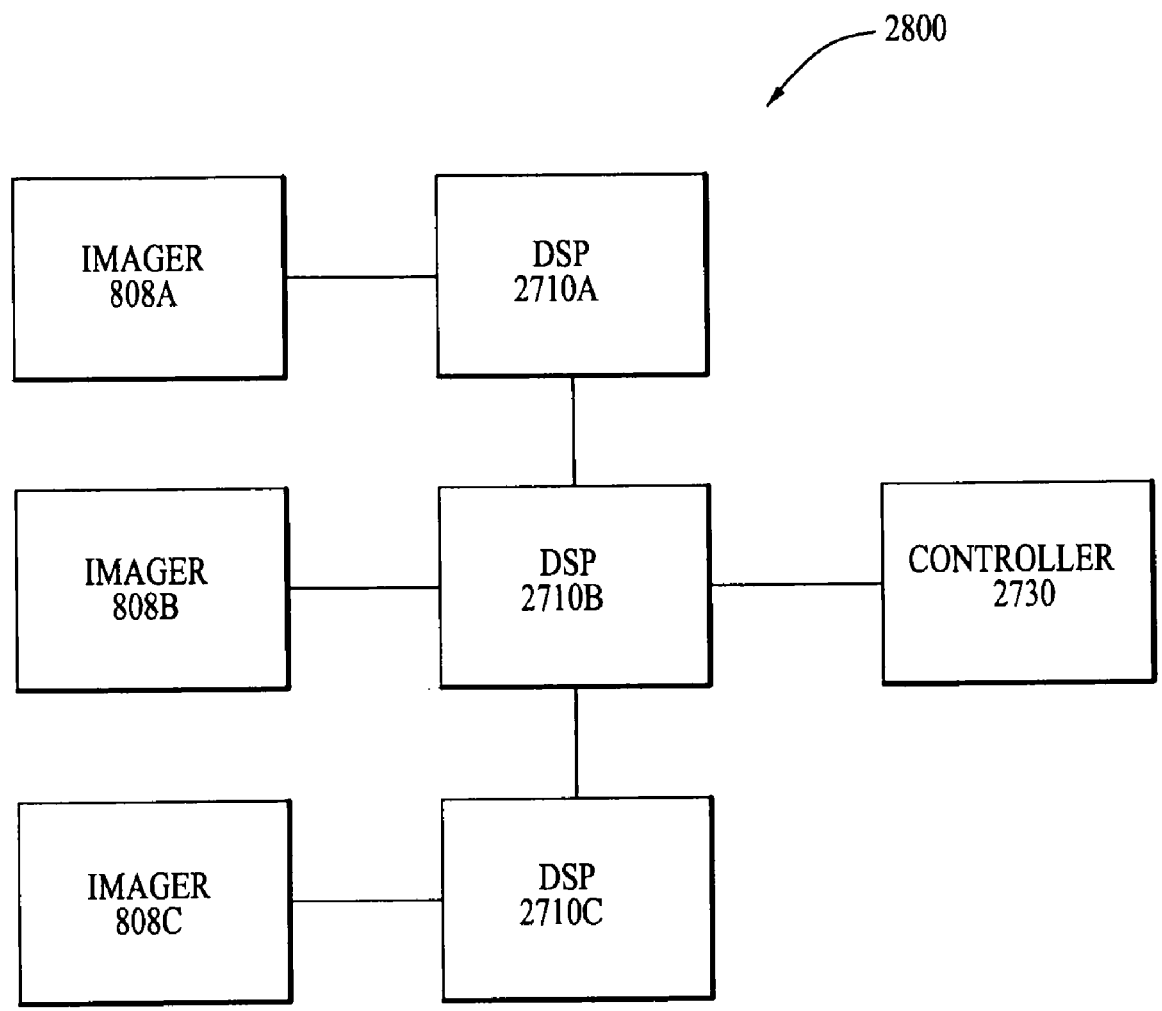
FIG. 28 is a block diagram of an electrical hardware system according to another embodiment.

The electrical hardware system 2700 may optionally be provided with a capability to be extended to connect to one or more of the same or similar systems as part of a multi-imager reader, such as a bi-optic reader. For example, FIG. 28 shows a simplified block diagram of a multi-imager reader's electrical hardware system 2800, wherein separate DSPs 2710A, 2710B, and 2710C are provided for each imager channel (corresponding to respective imagers 808A, 808B, and 808C, as shown). Interconnection is via the DSPs 2710A, 2710B, and 2710C in this example. The DSPs 2710A, 2710B, and 2710C may be connected via serial port channels, for example. The processing workload can be distributed among the DSPs 2710A, 2710B, and 2710C in various ways. For example, each of the DSPs 2710A and 2710C can perform local decoding of its own imager channel, while the DSP 2710B performs local decoding of its own imager channel as well as selection of a best decoded result or may combine results from the different imaging channels, in a process known as label stitching. For example, the UPCA barcode symbology can be decoded in pieces (such as the left side and right side of the label), which can be combined together to decode the label via label stitching. Label pieces from different cameras can be combined, thus obviating the need for any one imager to see the entire barcode label. As another example, a single DSP may be sufficient to operate with multiple imagers. For example, multiple distinct imagers interfaces can be provided on the same DSP, or a single interface may be time-shared among multiple imagers, such as via a multiplexor.

The electrical hardware systems 2700 or 2800 may be on one circuit board or multiple circuit boards. For example, with reference to the electrical hardware system 2700, the imager 808 and the DSP 2710 may be on a second circuit board, while the other components are on a first circuit board.

With reference to FIG. 27, for example, the interface between the imager 808 and the DSP 2710 will now be described in greater detail. A memory (not illustrated) may be incorporated on-chip as part of the DSP 2710 or may be a physically separate device, in order to store image data from the imager 808. A direct memory access (DMA) scheme can be utilized to capture the image data from the imager 808 and then to store and/or process the data.

For the sake of illustration, consider an example in which the imager-based reader 800 or 2000 operates at a 100 Hz frame rate (i.e., 100 frames per second). Assume that this imager has 1280 pixels per row and that there are 244 blanking pixels per row. At a data capture rate of 48 MPS (megapixels per second), then the time required to capture one row is 31.75 µs, calculated as follows:

48 MPS/(1280 pixels/row+244 blanking pixels/row)=31.75 µs/row.

Assume further that this imager has 1024 rows and can be run in a mode in which every fourth row is read, yielding 256 rows read out per frame. If possible with the imager utilized, it may be faster and more efficient to read only those rows that are to be decoded (e.g., the particular rows that are to be used as virtual scan lines); however, that it not possible with all imagers. In the case in which an capture-every-fourth-row mode is available according to this example, to achieve a frame capture time of 10 ms, corresponding to a frame rate of 100 Hz, the number of vertical blanking rows can be selected as follows:

31.75 µs/row×(1024/4 rows+59 blanking rows)= 10 ms.

The captured image is divided into different views by the pattern mirrors. The smallest imager section for a view is about one twentieth of the imager height. Because 256 rows are read out and 256/20≈13, there are about 13 rows read out of the imager 808 corresponding to the same pattern mirror. Only one of these rows needs to be chosen (although more may be taken into account, if desired). In other words, the DSP 2710 need process only every thirteenth row that is read out of the imager 808. That yields a processing rate of 2.56 million pixels per second, calculated as follows:

(1280 pixels/row)×(20 rows/frame)× (100 frames/sec)=2.56×10$^6$ pixels/sec.

The number of bits per pixel may be ten, for example, being stored in memory as two bytes. For reading binary or monochromatic optical codes, monochromatic or gray-scale imaging is sufficient, in which case the bits for a given pixel encode intensity or brightness information. The Micron® MT9M001 imager noted earlier is consistent with the assumptions made in the this example. If reading color information is needed, then a color imager can be utilized.

Continuing this example further, a DMA scheme can be employed to capture each of the 20 rows of interest from the imager 808 into a memory buffer. Because of the small amount of memory required (20 rows×1280 pixels/row×2 bytes/pixel=51 kB), on-chip cache memory in the DSP 2710 may be used, eliminating the need for an external memory. Alternatively, the entire 256 rows may be read into memory if desired. Alternatively, a single row of interest may be stored and processed in real time before the next row arrives, reducing memory requirements significantly, as no frame buffer is necessary. The DSP 2710 can execute an interrupt service routine (ISR) that generates an interrupt every thirteenth row. According to one implementation, for example, two buffers can be utilized: a capture buffer that captures every one of the 256 rows per frame, and a working buffer, into which every thirteenth row from the capture buffer is copied. According to this implementation, a counter in the ISR increments as each row is captures. When the counter reaches 13, the row data is transferred into the working buffer, a signal is sent to the decoder module or routine in the DSP 2710 to signify that a new row is ready to be processed, and the counter is reset. The counter could also be cleared upon vertical sync (i.e., at the end of a frame).

The data that is captured from one row of the imager 808 has similar characteristics to data captured from a single-line imager, such as from a handheld CCD scanner. Consequently, any image processing and decoding algorithm that is appropriate for linear imaging signals can be applied to the signals from imager 808. For example, a row can processed by edge detection, followed by low- and high-level decoding. If desired, a deblurring filter or equalizer can be utilized in the edge detector, in conjunction with an aberration (spherical, chromatic, or other) designed into the lens 810, as taught in U.S. Pat. No. 7,215,493, which is incorporated by reference herein in its entirety, in order to increase the depth of field.

Figure 29:
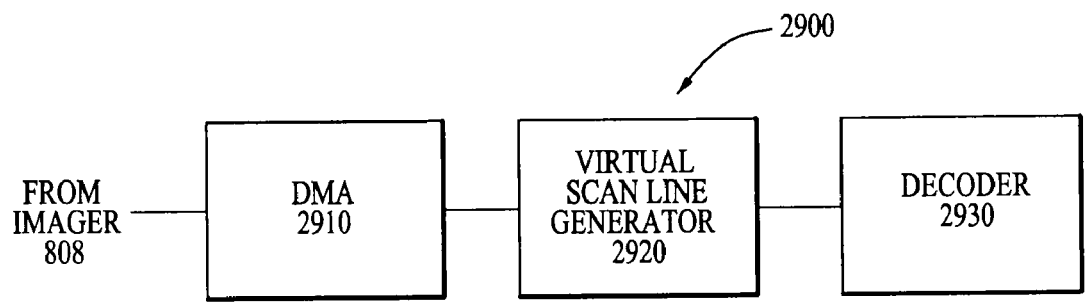
FIG. 29 is a functional block diagram of a software architecture according to one embodiment.

More generally, a functional block diagram of a software architecture 2900 for the DSP 2710 is shown in FIG. 29, suitable for processing a linear optical code. According to this software architecture 2900, an image data capture module 2910 captures all or a subset (e.g., every Nth row) of the pixels in a frame of the imager 808. A virtual scan line generator module 2920 generates at least one scan line for each section of the image. In the case where the sections span several rows across the imager 808, then the scan line generator module 2920 can be as simple as a row picker or row averager or row summer. In the case of a simple row picker, the row that is picked for each strip can be a programmable parameter, which may be stored in a table, for example. Good row-pick choices for each strip may be empirically determined, for example, or determined by analysis to be the row that is best illuminated, best focused, or a combination of both. For the reader 800 or 2000, for example, twenty rows are chosen that are approximately evenly spaced across the height of the imager 808. Given that every fourth row is read out of imager 801, the virtual line generator 2920 chooses every 13th row from the 256 rows read out of the imager 808. Row-pick parameters may be determined by an adaptive or learning algorithm in a set-up, configuration, service, or like mode, in which decoding of each row is attempted for various test reads. The row that most often yields successful decodings may be selected. Alternatively, rows other than the chosen one may also be decoded occasionally or regularly to test whether a better choice is available.

It may be advantageous to design the heights of the various views projected onto the imager 808 to be different heights. As shown in FIG. 13, for example, the view 835-890A is taller than the view 820-870A. It is possible to decode stacked barcodes such as PDF-417 or even matrix codes, such as Datamatrix, within a small 2-D window of an image, such as the view 835-890A. If reading these types of codes is desired, then views onto the imager 801 can be made sufficiently tall to allow decoding of these types of symbols. Thus, the benefit of high speed sweeping of linear barcodes can be achieved while also reading stacked and matrix codes.

Figure 30:
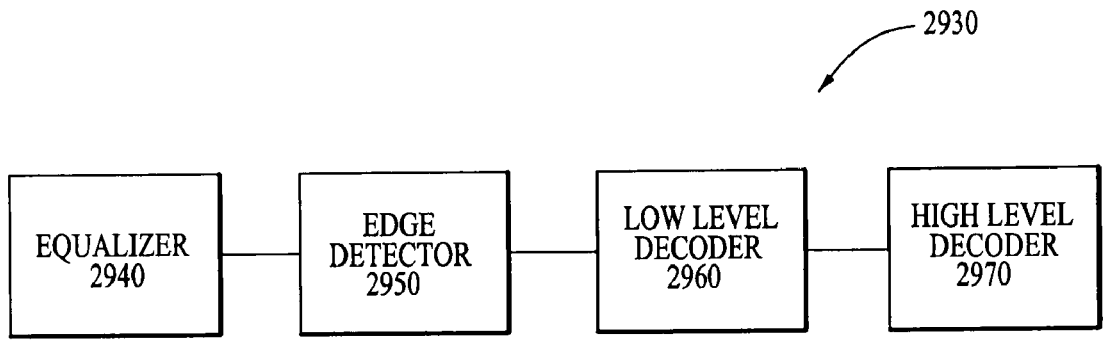
FIG. 30 is a functional block diagram of one example decoder in the software architecture of FIG. 29.

Virtual scan lines can be passed to a decoder module 2930, which, as noted above, may be of any type suitable for decoding barcodes in linear array images. One example of the decoder module 2930 is shown in FIG. 30, comprising an equalization filter 2940 for deblurring, an edge detector 2950, a low level decoder 2960, and a high level decoder 2970.

Illumination can be added to the preceding example. Assuming, by way of example, that it is desirable to accommodate a sweep speed of 100 inches/sec for an object through the viewing volume, and further assuming that the minimum feature size for the optical code is 10 mil, then the duration of an illumination strobe should be no more than 100 µs, to ensure that the optical blur during the exposure time is no more than the width of the smallest element of the barcode. A convenient way to pulse the LEDs 1510-1519 is to count rows of the imager 808. Three row capture times according to the previous example is close to the 100 µs maximum (3×31.75 µs=95.25 µs, to be exact). An LED can be turned on when a particular row is being read out of the imager 808 and turned off when a predetermined number of row times has elapsed from that point. The amount of current driving the LEDs can be set based on the duty cycle of the LEDs and their maximum current rating. The LED pulse width is minimized, and thus the sweep speed is maximized, when the LEDs are pulsed near their maximum allowable pulse current.

Related to the illumination pulse width is the notion of imager exposure time. In the case that the imager 808 is a rolling-reset or rolling-shutter imager, in which the rows are exposed or integrate light sequentially in order from top to bottom and then repeating, then the exposure time can be expressed as a number of rows. For example, if the exposure time is set to ten rows, then the first row of the imager 808 will start exposing ten rows before it is time to read out this row. The second row will start exposing one row after the first row started and will be read out right after the first row. If an LED is pulsed for one row time somewhere during the time when both of these rows are integrating (there are nine row periods where they are both integrating), then both rows would get exposed equally by the LED pulse. If the LED pulse lasts 3 row times, then there are 7 row periods where both rows could get exposed equally, and so on. Using the "capture-every-fourth-row" mode of the imager, there may be 315 rows being read out per frame (256 active rows plus 59 blanking rows). For a single LED pulse to expose all of the rows of the imager, the exposure time must be set to at least 256 rows (the entire span of the imager) plus the number of rows that the LED pulse is on but less than 315, the total number of rows plus blanking being read out or the frame rate will change to accommodate the additional rows of exposure. But such a long exposure time could create an ambient light sensitivity issue. Decreasing the exposure time may avoid saturation due to ambient light. If the exposure time were reduced to 256/5≈51 rows, for example, to reduce ambient light sensitivity, it can be seen that a single LED pulse during the frame time would expose only one-fifth of the image. Five LED pulses would be required during a frame in order to expose all rows of the imager, and the ambient light sensitivity would be reduced by a factor of five. A more optically efficient scheme would be to pulse five different LEDs during the frame time; each LED would illuminate one-fifth of the field of view, corresponding to the portion of the imager that is integrating during this time period. Further improvement in ambient light tolerance can be obtained by using more LEDs, such as 20 LEDs for a total of 20 LED pulses per frame. The imager exposure time could then be set to 256/20=13 rows, thus obtaining an ambient light immunity that is a factor of 20 better than a full frame exposure. The exposure times corresponding to these numbers of rows of exposure are tabulated below, assuming an LED pulse of 3 rows. The ambient light sensitivity will depend on the f/# of the camera lens and the chosen exposure time.

| Exposure Rows | Time | Pulses/Frame |
|---|---|---|
| 256 + 2 = 258 | 8.2 ms | 1 |
| 256/5 + 2 = 53 | 1.7 ms | 5 |
| 256/20 + 2 = 15 | 0.5 ms | 20 |

In the case in which the illumination hardware is as depicted in FIGS. 15-23, then the sequencing of the flashing of the LEDs 1510-1519 can be accomplished in concert with the exposure of the imager 808 as follows. Each LED pair (e.g., 1512 and 1517) is pulsed for three row times, once per frame. The exposure time of the imager is set to 63 rows, or 2 ms, so that all of the rows corresponding to a given redirection mirror (e.g., one of the mirrors 820-840) are exposed equally by one LED pulse—for the LED pair directed at that mirror. This exposure corresponds to the case in the middle row of the table above. A pulse occurs during the overlap period of all of the imager rows in the field of view of one redirection mirror. That pulsing could be accomplished, for example, with a software lookup table that turns on LED pair Z (where Z=1, 2, 3, 4, or 5) when the row counter in the ISR described above hits a count of Y, for example. The table values (Y) can be adjusted during development to ensure that all LEDs pulse at the appropriate time. The result of this table-based pulse triggering scheme is that each pair of LEDs pulse at 100 Hz, which is above the flicker fusion frequency, and five sets of LEDs sequence once per frame. The illumination intensity is equivalent to using a global-shutter CMOS imager that has all ten LEDs 1510-1519 pulsed once per frame.

Figure 31:
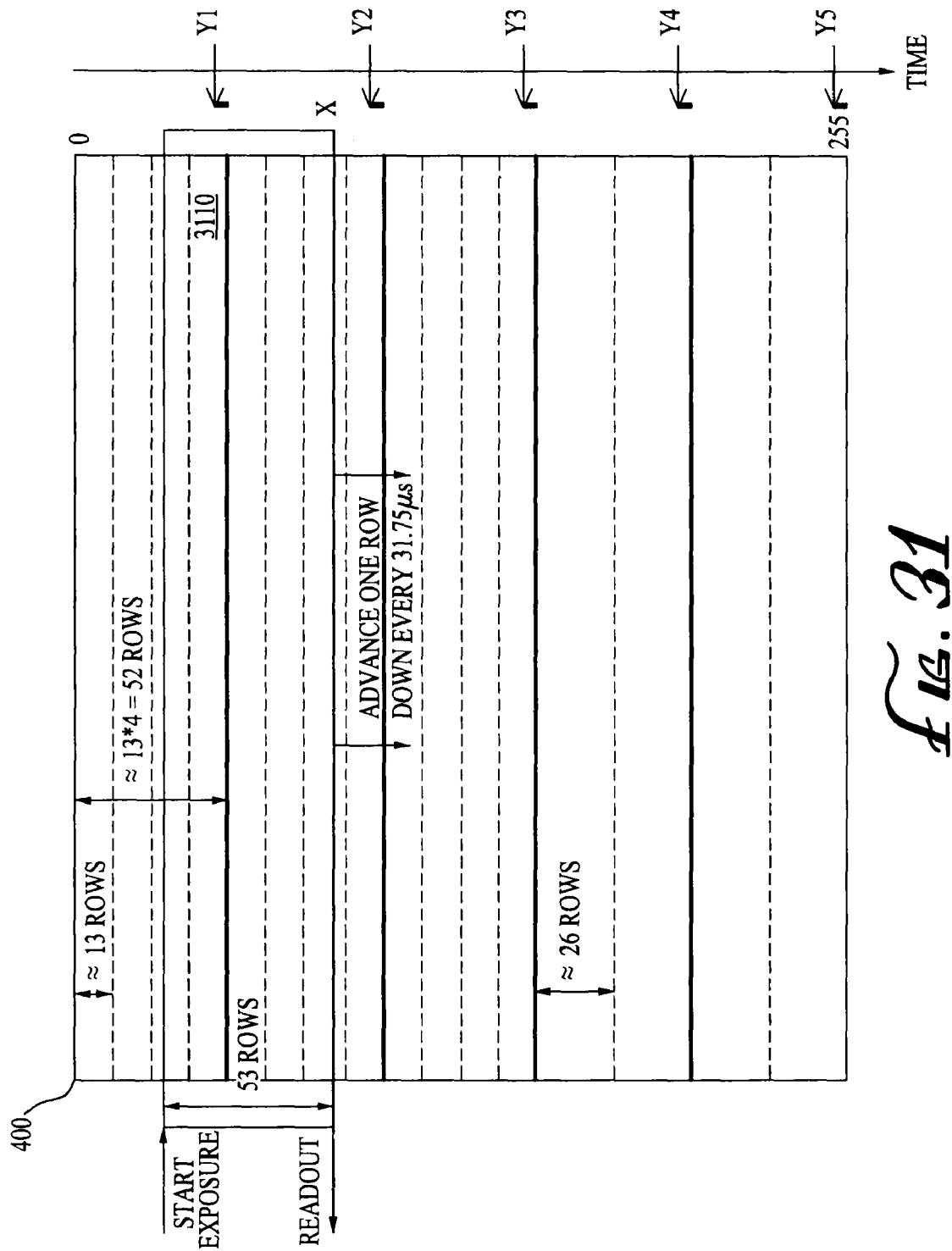
FIG. 31 is a diagram illustrating timing of illumination and imager exposure, according to one embodiment.

FIG. 31 depicts graphically the timing of illumination and imager exposure described above, with reference to the face 400 of an imager 808 (or a resulting image). A sliding exposure window 3110 can be conceptually visualized as advancing down the imager face 400. The exposure window 3110 moves down one row every 31.75 µs in the above example. The exposure window is 53 rows tall in this example, corresponding to the exposure time. This exposure-readout scheme can be visualized as the top edge of the exposure window 3110 signifying the start of pixel exposure for that row, while the bottom row of the exposure window 3110 is the row that is read out. The readout row is denoted as row number X, which increments every 31.75 µs. The exposure window 3110 can thus be defined as the 53 contiguous rows ranging row number X-52 to row number X. The row counter variable X cycles from −52 to a maximum number (e.g., 255) and repeats. The negative values of X correspond to rows during the previous frame's vertical blanking time.

When the exposure window 3110 covers a portion of the imager face 400 corresponding to one redirection mirror (e.g., the sections between the darker solid horizontal lines), then all of the pixels directed at that redirection mirror are simultaneously exposing. That instant is an appropriate time to flash illumination at that redirection mirror. In FIG. 31, Y1, Y2, Y3, Y4, and Y5 represent times at which a flash begins. Each flash lasts some time, which may be a whole number of row times (e.g., three row times in the above example), as represented by the short symbols beginning at each of Y1, Y2, Y3, Y4, and Y5. Thus, when X=Y1, Y1+1, and Y1+2, then illumination directed toward the first redirection mirror is enabled, according to the above example; when X=Y2, Y2+1, and Y2+2, then illumination directed to the second redirection mirror is enabled, according to the above example; etc.

Figure 32:
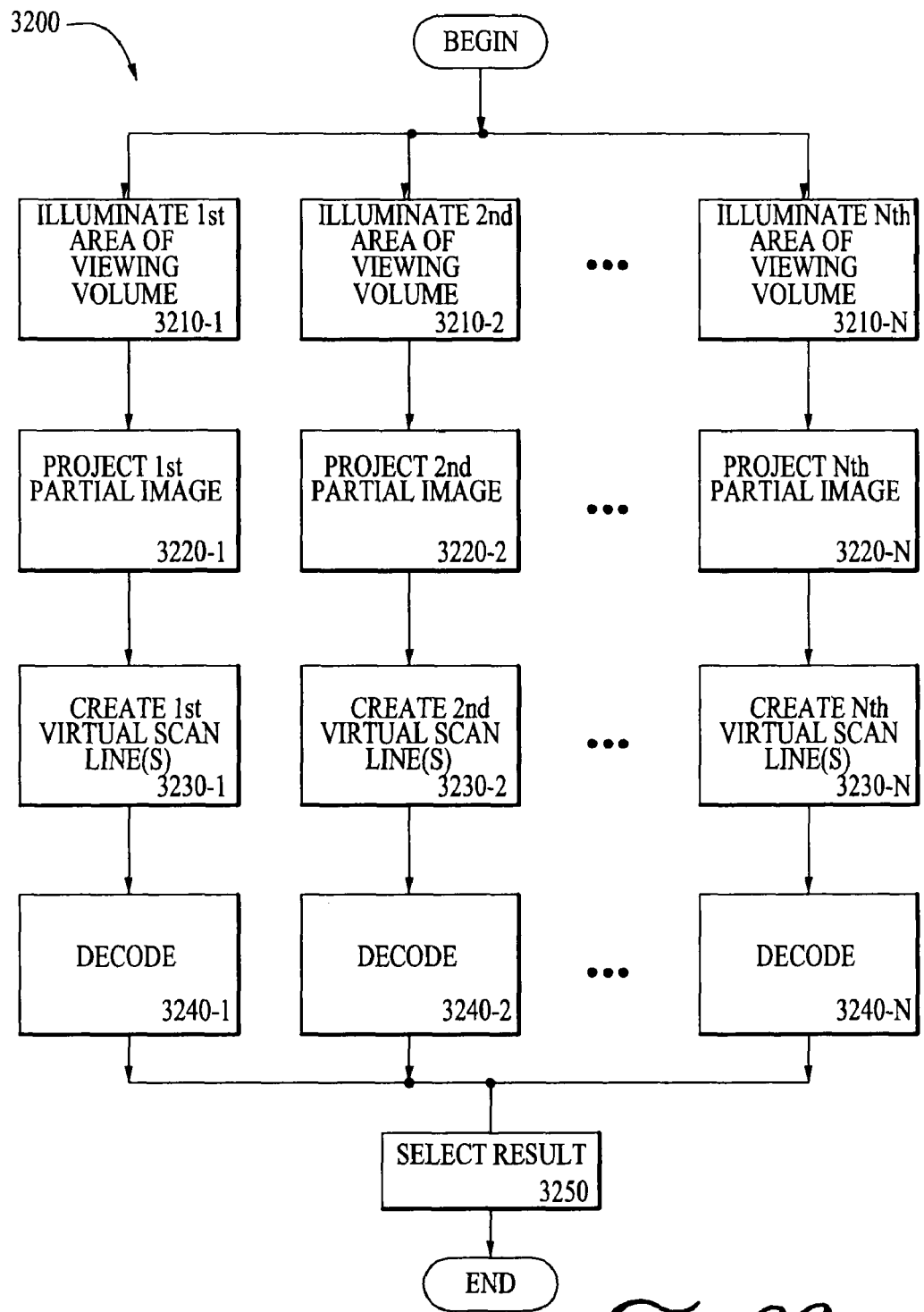
FIG. 32 is a flowchart of a method according to one embodiment.

FIG. 32 is a flowchart of a method 3200 according to one embodiment. The method 3200 is especially useful for generating decodable image data (i.e., image data that can be processed for eventual decoding) for a one-dimensional optical code on an object in a viewing volume using an imager and a set of fixed, static, or non-moving mirrors. The method 3200 can proceed generally in N parallel paths, where N is the number of different partial images taken of an object in the viewing volume. Typically N corresponds to the number of different perspectives into the viewing volume, although it is possible to account for multiple views from the same perspective separately. In each path, the method 3200 optionally illuminates the respective area in the viewing volume where a partial image is taken, as illustrated by steps 3210-1, 3210-2, ..., 3210-N, which may be performed, for example, simultaneously or sequentially. Generally, simultaneous illumination is more appropriate for a global-rest image, while sequential illumination can be advantageous with a rolling-reset imager.

The method also projects onto a portion of the imager a partial image of the viewing volume (or an object therein, depending on its size and location) from a perspective, and does so N times, as illustrated by steps 3220-1, 3220-2, ..., 3220-N. The portions may be strip-shaped across the imager or have other shapes. The perspectives from which a view or image is projected may be the same as that from which illumination is directed into the viewing volume. Each of the projecting steps 3220-1, 3220-2, ..., 3220-N can be performed at approximately the same time as its corresponding illuminating step 3210-1, 3210-2, ..., 3210-N, although the initiation of the projecting step may be before or after that of the illuminating step. As with the illumination steps, the projecting steps 3220-1, 3220-2, ..., 3220-N can be performed simultaneously or sequentially, for example. Simultaneous projection is generally more appropriate for a global-rest image, while sequential illumination can be advantageous with a rolling-rest imager. Some or all of the projecting steps 3220-1, 3220-2, ..., 3220-N may comprise reflecting an image off two or more mirrors, which may be the same mirrors used to direct illumination into the viewing volume. Some or all of the projecting steps 3220-1, 3220-2, ..., 3220-N may also comprise focusing the partial image onto the imager.

At this point, after the projecting steps 3220-1, 3220-2, ..., 3220-N, the method 3200 has generated image data that is decodable, processable, or otherwise useful. Optionally, the method 3200 may continue to process image data and eventually to decode the optical code therein, as illustrated and next described. In the case in which the optical code is a linear optical code, the continued processing may involve selecting, determining, or otherwise creating a virtual scan line. In the case in which the optical code is a two-dimensional or stacked code, then other suitable decoding techniques can be applied to the partial images. In that case, it is desirable that the height of each partial image is great enough to fit a two-dimensional or stacked code, and that a memory be provided to store an adequate number of rows for each partial image to decode the entire two-dimensional or stacked code. A suitable two-dimensional or stacked decoding technique, for example, may involve multiple virtual scan lines.

Assuming by way of example that virtual scan lines are to be extracted, the method 3200 can create virtual scan lines, as illustrated by steps 3230-1, 3230-2, ..., 3230-N. In the case in which the different portions of the imager are strips of one or more rows across the imager, the creating steps 3230-1, 3230-2, ..., 3230-N can be as simple as picking one or more of the rows in a strip as the virtual scan line(s). In a more complicated version, the creating steps 3230-1, 3230-2, ..., 3230-N may involve averaging the intensity of the rows pixel-by-pixel to generate a virtual scan line that represents an average for the strip, may involve adding the intensity of the rows pixel by pixel to increase the signal-to-noise ratio, or may involve otherwise jointly processing several rows of data. Averaging may be appropriate if the optical code can assumed to be adequately still as the rows in the strip are exposed. In a more general case, to account for the possibility of motion in the long direction of a strip, different rows in the strip could be correlated to determine a horizontal offset and then offset-compensated lines could be averaged.

However the virtual scan lines are created, the method 3200 next decodes those virtual scan lines, as illustrated by steps 3240-1, 3240-2, ..., 3240-N, in an attempt to extract the information in the optical code. In one version of the method 3200, each of the virtual-scan-line-creating steps 3230 creates one virtual scan line for its corresponding view or section of the imager, and that single virtual scan line is simply decoded. In another version, a virtual-scan-line-creating step 3230 generates multiple virtual scan lines, and each is decoded singly or jointly. For example, multiple scan lines from the same view or image can be decoded independently to confirm correct decoded. The different decoding operations may utilize the same or different decoding algorithm. Decoding different virtual scan lines of the same section by different methods may enhance the likelihood of a successful read in some instances.

Regardless how the decodings are obtained, the method 3200 may perform a selecting step 3250 to select which decoding is utilized as the overall result. Depending on the number of and the spatial relationships among the various perspectives into the viewing volume, only one or a small number of the decoding steps may yield a successful decoding. The selecting step 3250 may be as simple as taking the first successful decoding. For confirmation, the selecting step 3250 may optionally check for other successful decodings. In the case in which one or more of the decoding steps 3240-1, 3240-2, . . . , 3240-N produce partial decodings of less than an entire optical code, then the selecting step may attempt to combine partial decodings to generate a full decoding of the entire optical code, in a process known as stitching, which is described in detail in, for example, U.S. Pat. No. 5,929,421, which is incorporated by reference herein in its entirety.

The overall result output from the selecting step 3250 for a frame of image data may be an incomplete decoding, in which case stitching techniques can be applied to the overall results of several consecutive frames to yield a completely decoded code.

In one embodiment the steps are performed serially on an area-by-area or partial-image-by-partial-image basis (i.e., the following order of steps: 3210-1, 3220-1, 3230-1, 3240-1, 3210-2, 3220-2, 3230-2, 3240-2, . . . , 3210-N, 3220-N, 3230-N, 3240-N). In other embodiments, the N steps of the same type may be combined together and performed jointly. For example, the partial images resulting from the projecting steps 3220-1, 3220-2, . . . , 3220-N may be processed jointly to create one or more virtual scan lines. For example, image stitching techniques can be applied to stitch together multiple partial images, if desired. As another example, the decoding steps 3240-1, 3240-2, . . . , 3240-N can be performed together as part of a joint decoding process, typically combined with the selecting step 3250. Other combinations are possible.

The method 3200 is generally performed once per frame of image data, although it may alternatively be performed any whole number of times per frame. The method 3200 may comprise resetting the imager at or near the beginning or end of each iteration of the method 3200, or may comprise resetting the imager on a rolling basis gradually as each iteration is performed.

Figure 33:
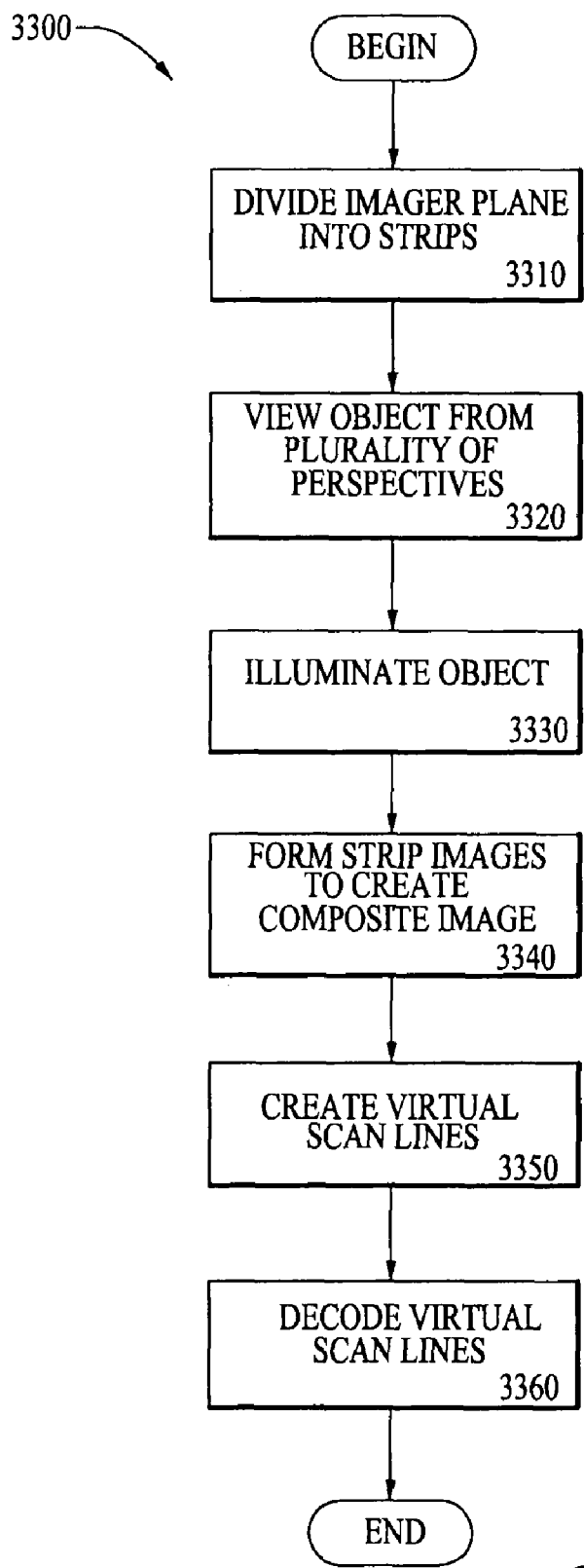
FIG. 33 is a flowchart of a method according to another embodiment.

FIG. 33 is a flowchart of another method 3300 according to one embodiment. The method 3300 is suitable for reading a linear optical code on an object in a viewing volume. The method 3300 divides (step 3310) an imager plane into a plurality of strip-shaped sections. The dividing step 3310 may be performed inherently by virtue of the design of the reader performing the method 3300, may be performed at setup, initialization or other off-line time, or may be performed in the process of reading the optical code. The method 3300 also views (step 3320) the object from a plurality of perspectives, which may differ in location and/or direction). The method 3300 may optionally illuminate (step 3330) the object in any way suitable or desired. Such illumination may be provided from the same plurality of perspectives from which the object is viewed, onto the areas where the plurality of viewing operations are directed, and in synchronicity with the viewing operations. Next, the method 3300 forms (step 3340) a plurality of strip-shaped images, in the image plane, corresponding to the plurality of perspectives, respectively. The method 3300 thereby creates a composite image containing date from a plurality of perspectives.

At this point (after completion of the forming step 3340), the method 3300 has generated useful image data for reading an optical code. Optionally, the method 3300 may decode or attempt to decode the optical code embedded in the image data. Specifically, according to one example, the method 3300 may create (step 3350) one or more virtual scan lines across some or all of at least one of the strips and decode (3360) those virtual scan lines to ascertain the optical code. In one version of the method 3300, the image comprises a rectangular array of pixels arranged as horizontal rows and vertical columns, the imager is a row-wise rolling-reset imager, and the strip-shaped sections are N (N≧1) contiguous rows of pixels. In this version, the forming step 3340 may comprise sequentially forming the strip-shaped images on successive sets of N contiguous rows. Optionally, the forming step may be repeated a whole number of times per frame.

V. Variations

Figure 34:
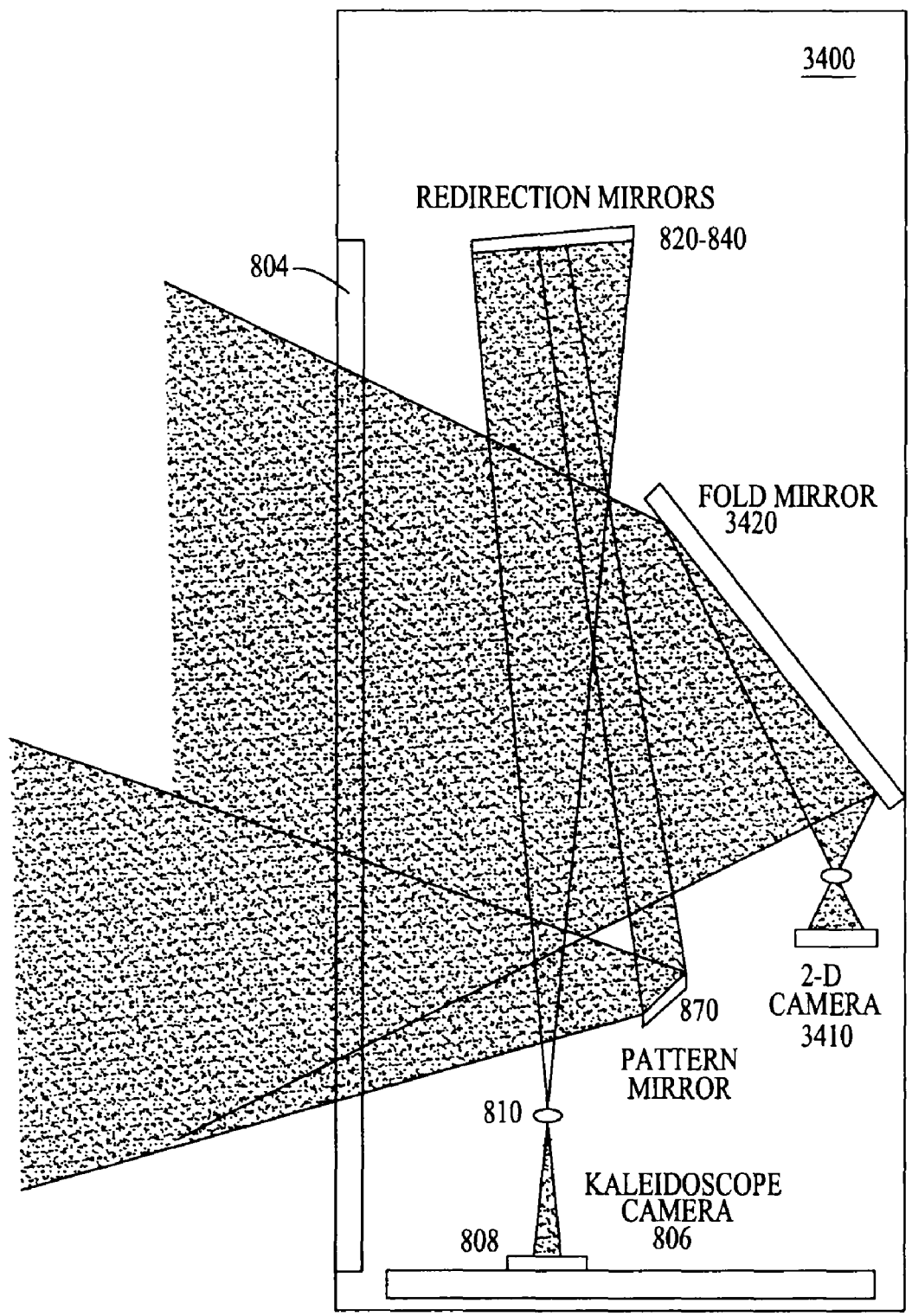
FIG. 34 is a partial cut-away view of a two-camera embodiment.

Many variations, enhancements and modifications of the imager-based optical code reader concepts described herein are possible. For example, one enhancement is the addition of a second camera for reading two-dimensional or stacked codes. An example of a second-camera system 3400 is illustrated in FIG. 34, in which a second camera 3410 views the viewing volume via a fold mirror 3420. Depending on the physical arrangement of components within the enclosure, the fold mirror 3420 may not be necessary, as the second camera 3410 may be oriented to look directly into the view volume. The second camera 3410 can add the functionality to read two-dimensional symbologies at relatively slow sweep speeds, while the camera 806 reads linear symbologies at relatively high sweep speeds. The processing capabilities for the second camera 3410 can be incorporated into the same processing circuitry used with the camera 806, thereby providing a less expensive upgrade than for a laser-based scanner, which would otherwise not have that processing capability. Two-dimensional processing of the second camera 3410's image data could occur in the background until a two-dimensional code has been detected, then most of the processing could be diverted to process the image from the second camera 3410.

Figure 35:
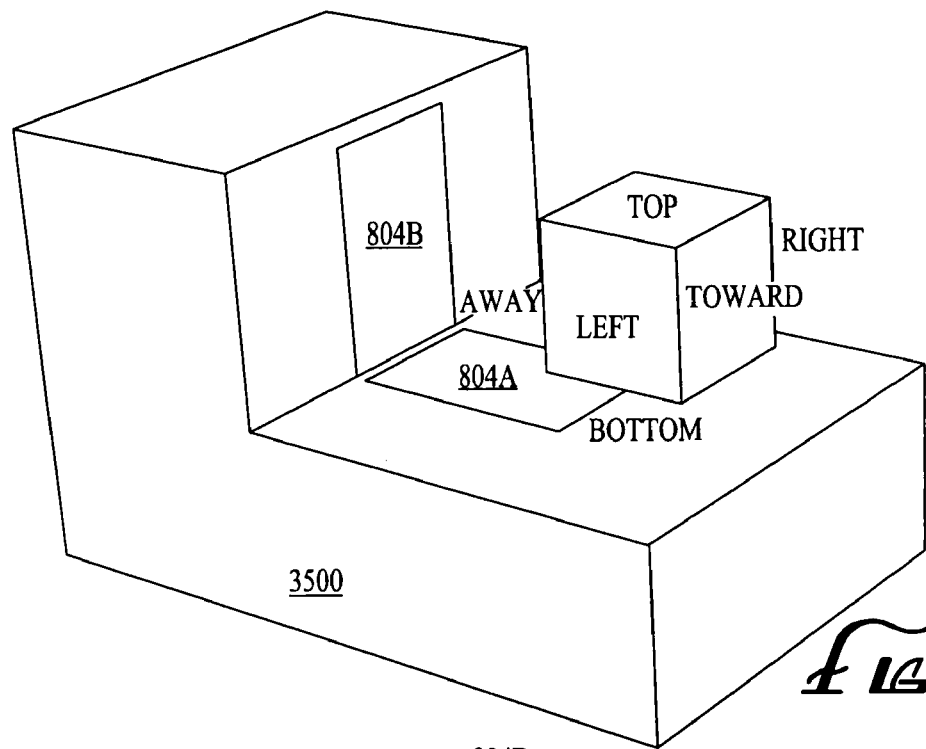
FIG. 35 is an isometric view of a bioptic reader according to one embodiment.

Another variation is a multiplane reader to simultaneously or alternately attempt to read an object from two or more viewing planes. Two or more of the single-window imager-based imagers described herein, such as the imager 800 illustrated in FIGS. 8-11, can be combined and utilized together to make a multiplane (e.g., bioptic or two-window) reader. A typical bioptic arrangement has the two windows arranged with one edge of one window in proximity to one edge of the other window, and with a desired angular relation (e.g., 90°) of the windows about that approximate common edge. For example, U.S. Pat. No. 7,198,195, which is incorporated by reference herein in its entirety, describes a laser-based scanner having two scanning planes or windows. FIG. 35 also illustrates a bioptic reader 3500 having a horizontal viewing window 804A and a vertical viewing window 804B. The same or similar multi-plane designs can be accomplished using two of the imager-based readers described herein. Combinations of three or more readers are also possible.

Figure 36A:
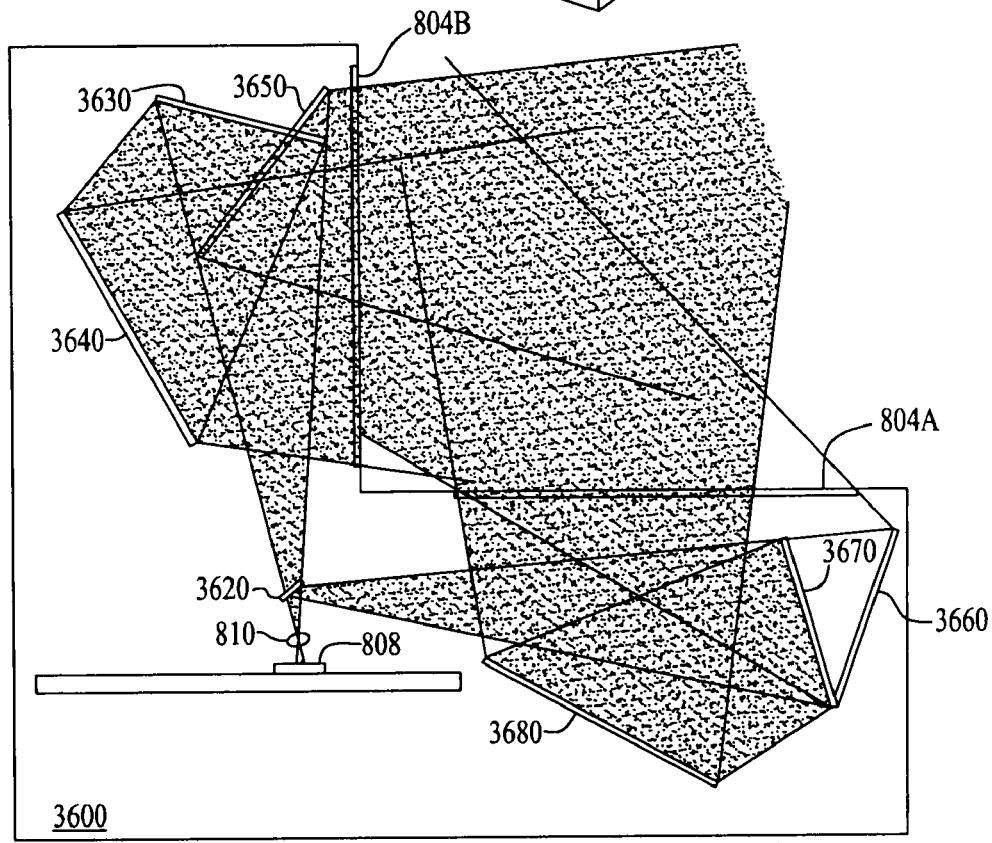
FIG. 36A is a partial cut-away view of one example of a bioptic reader according to one embodiment.
Figure 36B:
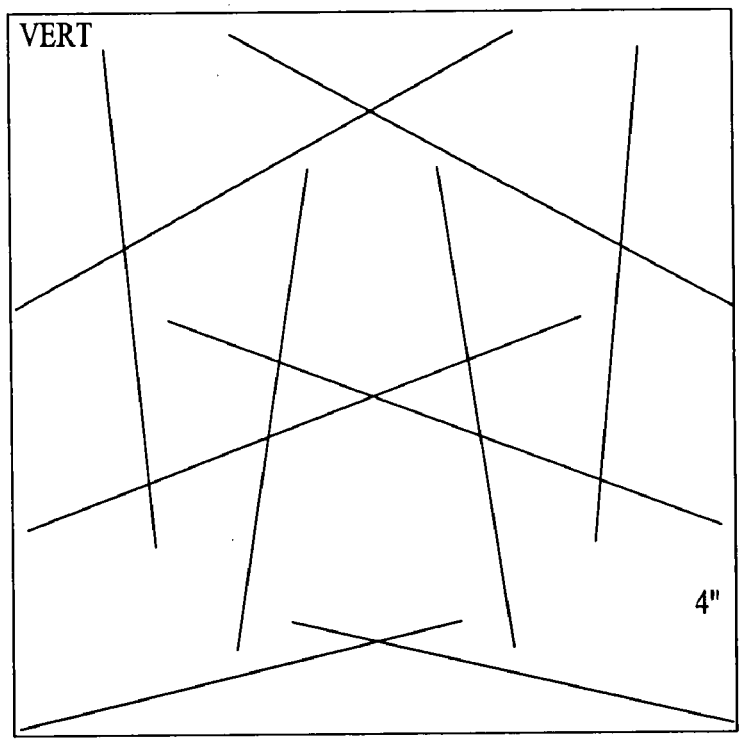
FIGS. 36B and 36C are illustrations of pseudo scan lines for the bioptic reader of FIG. 36A.
Figure 36C:
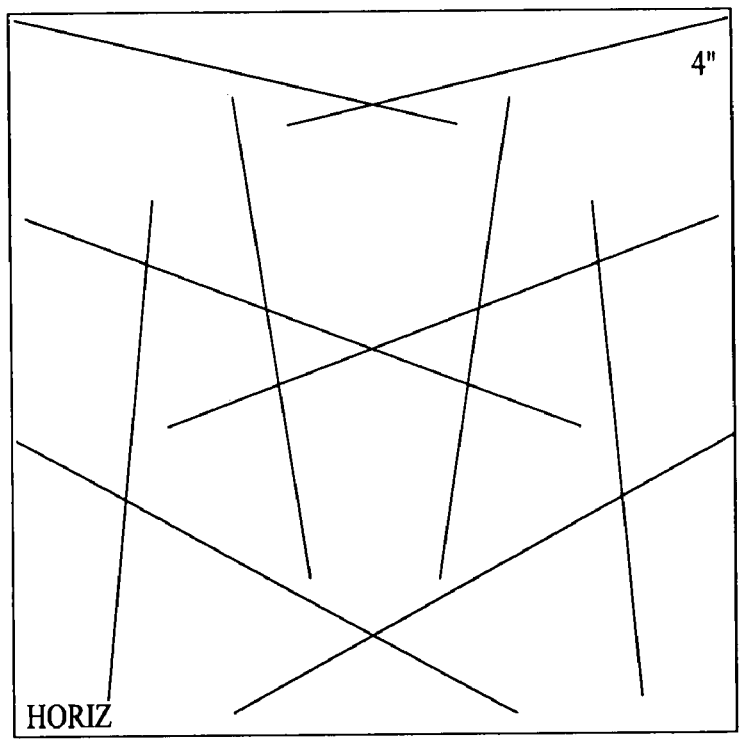
Figure 36D:
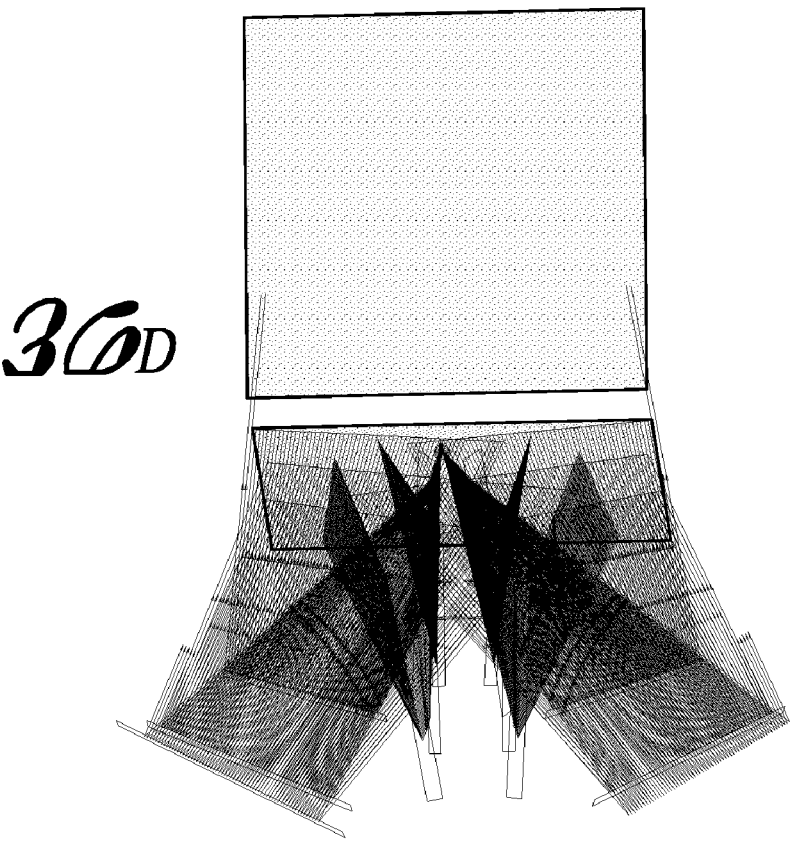
FIGS. 36D, 36E, 36F, and 36G are illustrations of the bioptic reader of FIG. 36A.
Figure 36E:
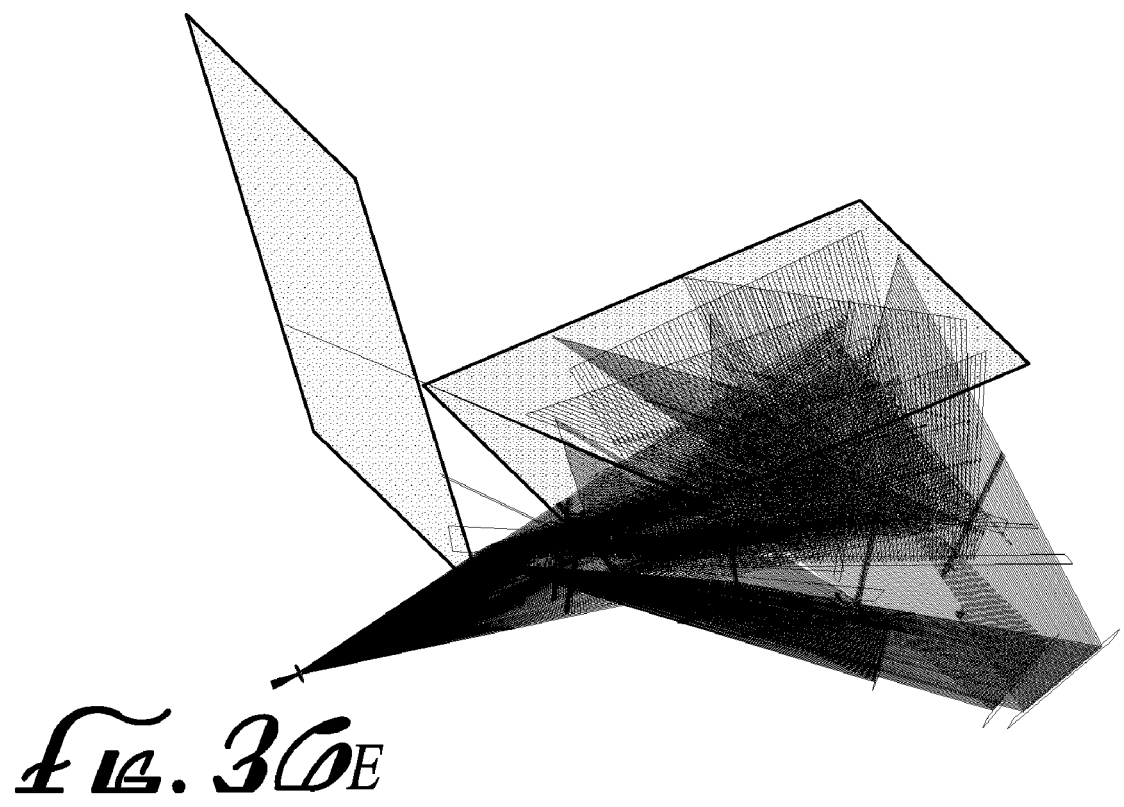
Figure 36F:
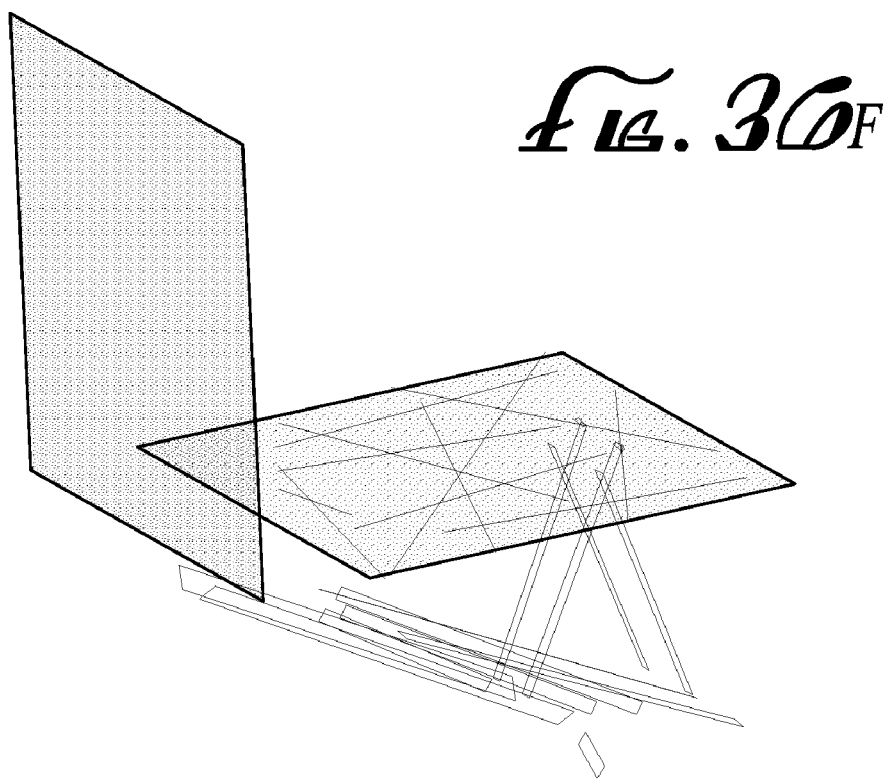
Figure 36G:
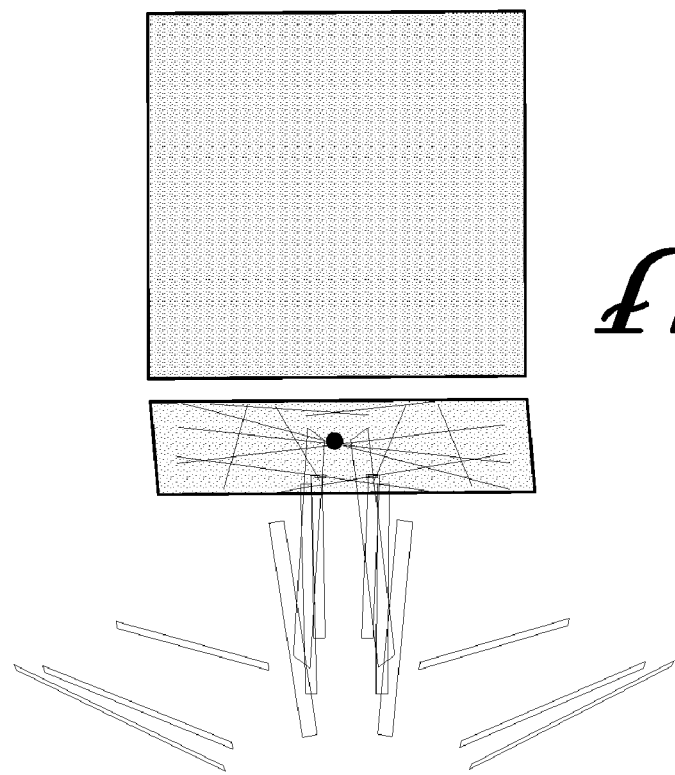

Another variation is a bioptic reader using a single imager, whose field of view is split into two portions—one of each window of the reader—and further split into a number of pseudo scan lines emanating from each window. FIGS. 36A-36G illustrate an example of this type of single-imager-based bioptic reader 3600 having the same form factor as in FIG. 35. FIG. 36A is a side cut-away view of the reader 3600, having an imager 808, lens 810, bi-optic splitting mirror 3620, and some representative pattern mirrors and/or redirection mirrors 360-3680. The bi-optic splitting mirror 3620 is disposed to redirect half of the imager's field of view to the horizontal window 804A portion of the reader 3600, while the other half of the imager's field of view services the vertical window 804B. Examples for the vertical and horizontal pseudo scan line patterns are illustrated in FIGS. 36B and 36C. An example of pattern mirror placement to produce the horizontal pseudo scan line pattern in FIG. 36C is illustrated in various ways in FIGS. 36D-36G.

Additional examples of arrangements of fixed mirrors for use with an imager for the purpose of reading optical codes are disclosed in the assignee's U.S. patent application Ser. No. 11/765,345, entitled "Imaging Scanner With Multiple Image Fields," filed Jun. 19, 2007, which is hereby incorporated by reference herein in its entirety.

VI. Conclusion

The terms and descriptions used above are set forth by way of illustration only and are not meant as limitations. Those skilled in the art will recognize that many variations can be made to the details of the above-described embodiments without departing from the underlying principles of the invention. The scope of the invention should therefore be determined only by the following claims and their equivalents.

The invention claimed is:

1. An imaging system for forming image data from an object bearing an optical code in a viewing volume, the imaging system comprising:
   a camera comprising an imager and a lens, wherein the imager comprises a set of pixel imaging elements arranged in a two-dimensional imaging plane, and wherein the lens is positioned in front of the imager so as to focus a field of view onto substantially all of the pixel imaging elements of the imager;
   a first set of a plurality of fixed mirrors comprising at least a first set first mirror and a first set second mirror placed in the field of view, wherein the mirrors in the first set split the field of view into different first and second imager portions of the pixel imaging elements of the imager and redirect said first and second imager portions in different directions away from the first set of mirrors;
   a second set of fixed mirrors comprising at least
   (a) second set first mirror subset of mirrors placed in said first portion of the field of view as redirected by the first set first mirror and positioned to redirect said first portion of the field of view into the viewing volume from at least first and second perspectives, to thereby provide 2D images of at least first and second portions of the object from said first and second perspectives on the first imager portion of the pixel imaging elements of the imager and
   (b) second set second mirror subset of mirrors placed in said second portion of the field of view as redirected by the first set second-mirror and positioned to redirect said second portion of the field of view into the viewing volume from at least third and fourth perspectives, to thereby provide 2D images of at least third and fourth portions of the object from said third and fourth perspectives on the second imager portion of the pixel imaging elements of the imager; and
   a decoder interfaced to the camera and configured to decode the optical code imaged by the imager.

2. An imaging system according to claim 1, wherein the imager is a rolling-reset imager.

3. An imaging system according to claim 1, wherein the mirrors in the first set of mirrors split the field of view into plural portions that comprise parallel strips across the imaging plane.

4. An imaging system according to claim 1, wherein the second set first mirror subset comprises a plurality of fixed mirrors placed in a portion of the field of view as redirected by the first set first mirror, respectively, and positioned to redirect the respective portion of the field of view into the viewing volume from a plurality of perspectives, to thereby provide an image of at least a portion of the object from a plurality of said perspectives on a respective portions of the pixel imaging elements of the imager.

5. An imaging system according to claim 1, further comprising: an illumination source configured to illuminate the viewing volume by way of reflection via at least one mirror in the first set of mirrors and at least one mirror in the second set of mirrors.

6. An imaging system according to claim 1,
   wherein the first set of mirrors comprise at least three mirrors, namely the first set first mirror, the first set second mirror and a first set third mirror,
   wherein the second set of mirrors comprises at least three second set mirror subsets, the second set mirror subsets comprising
   the second set first mirror subset comprised of at least three parallel strip pattern mirrors, placed in the first portion of the field of view as redirected by the first set first mirror,
   the second set second mirror subset comprised of at least three parallel strip pattern mirrors, placed in the second portion of the field of view as redirected by the first set second mirror,
   second set third mirror subset comprised of at least three parallel strip mirrors, placed in third portion of the field of view as redirected by the first set third mirror.

7. An imaging system according to claim 6, wherein the second set mirror subsets are arranged in a semi-circular pattern about the first set of mirrors.

8. An imaging system for forming image data from an object bearing an optical code in a viewing volume, the imaging system comprising:
   an imager comprising a set of pixel imaging elements arranged in a two-dimensional imaging plane having N different regions; and
   a set of non-moving mirrors arranged to collect N two-dimensional views of the viewing volume from different perspectives and to reflect the N two-dimensional views onto the imaging plane, wherein each of the N two-dimensional views is reflected onto, and a two-dimensional view thereof is acquired by, a corresponding one of the N different regions of the imaging plane, wherein N>8.

9. An imaging system according to claim 8, wherein the imager is a rolling-reset imager characterized by the set of pixel imaging elements being arranged in a rectangular array having rows and columns.

10. An imaging system according to claim 8, wherein each view of the viewing volume reflects off two different mirrors before reaching the imaging plane.

11. An imaging system according to claim 8, wherein the set of non-moving mirrors comprises:
   a first set of mirrors configured to collect the N two-dimensional views of the viewing volume; and
   a second set of mirrors oriented to reflect the N two-dimensional views from the first set of mirrors to the imaging plane.

12. An imaging system according to claim 8, further comprising: a lens positioned in front of the imager.

13. An imaging system according to claim 8, further comprising: an illumination source.

14. An imaging system according to claim 8, further comprising:
a signal processing unit operatively connected to the imager to receive image data.

15. An imaging system according to claim 11, wherein at least three of the N distinct portions are oriented in a common direction across the imaging plane regardless of a perspective from which a corresponding view is taken.

16. An imaging system according to claim 8, wherein said different perspectives are comparable to a set of perspectives of scan lines in a laser-based optical code scanner.

17. An imaging system according to claim 8, wherein at least one of the non-moving mirrors comprises a Fresnel prism.

18. An imaging system according to claim 8, wherein the N two-dimensional views and the N distinct portions of the imaging plane comprise (1) a first two-dimensional view reflected onto and acquired by a corresponding first distinct portion of the imaging plane, (2) a second two-dimensional view reflected onto and acquired by a corresponding second distinct portion of the imaging plane, and (3) a third two-dimensional view reflected onto and acquired by a corresponding third distinct portion of the imaging plane,
wherein the set of non-moving mirrors comprises
(1) a first set of mirrors comprising at least three mirrors, namely a first set first mirror, a first set second mirror and a first set third mirror,
(2) a second set of mirrors comprising at least three second set mirror subsets, namely (a) a first mirror subset comprised of at least three parallel strip pattern mirrors, placed in a first portion of the field of view as redirected by the first set first mirror, (b) a second mirror subset comprised of at least three parallel strip pattern mirrors, placed in a second portion of the field of view as redirected by the first set second mirror, and (c) a third mirror subset comprised of at least three parallel strip mirrors, placed in a third portion of the field of view as redirected by the first set third mirror.

19. An imaging system according to claim 18, wherein the second set mirror subsets are arranged in a semi-circular pattern about the first set of mirrors.

20. An imager-based reader having illumination capability for machine vision of an object in a viewing volume, the reader comprising:
a solid state imager comprising a surface having a plurality of closely spaced pixel imaging elements;
a set of fixed mirrors positioned in a field of view of the imager and arranged to divide the imager's field of view into multiple distinct pieces and to direct each of the multiple distinct pieces to portions of the viewing volume from different directions, the imager acquiring, onto corresponding different regions of the imager, two-dimensional images of the multiple distinct pieces; and
an illumination source configured to shine light into the viewing volume by way of reflection via at least one mirror in the set of fixed mirrors.

* * * * *

UNITED STATES PATENT AND TRADEMARK OFFICE
CERTIFICATE OF CORRECTION

PATENT NO. : 8,353,457 B2  Page 1 of 1
APPLICATION NO. : 12/370497
DATED : January 15, 2013
INVENTOR(S) : Bryan L. Olmstead It is certified that error appears in the above-identified patent and that said Letters Patent is hereby corrected as shown below:

In the Specification

In column 8, line 16, replace "potion" with --portion--.

In column 12, line 59, replace "200" with --20°--.

In column 13, line 50, delete "mirrors".

In column 16, line 22, after "can" insert --be--.

In column 18, line 45, after "any one" insert --of--.

In column 17, line 4, replace "is" with --its--.

In column 25, line 62, replace "date" with --data--.

In column 28, line 13, before "respective" delete "a".

Signed and Sealed this
Eleventh Day of November, 2014

Michelle K. Lee
*Deputy Director of the United States Patent and Trademark Office*